United States Patent
Lee et al.

(10) Patent No.: US 12,267,334 B2
(45) Date of Patent: Apr. 1, 2025

(54) SELF-MANAGED TRUST IN INTERNET OF THINGS NETWORKS

(71) Applicant: QUALCOMM Incorporated, San Diego, CA (US)

(72) Inventors: Soo Bum Lee, San Diego, CA (US); Mark Bapst, South Barrington, IL (US); Gavin Bernard Horn, La Jolla, CA (US); Jay Rodney Walton, Waban, MA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 17/458,012

(22) Filed: Aug. 26, 2021

(65) Prior Publication Data

US 2022/0070178 A1 Mar. 3, 2022

Related U.S. Application Data

(60) Provisional application No. 63/072,031, filed on Aug. 28, 2020, provisional application No. 63/072,040, filed on Aug. 28, 2020.

(51) Int. Cl.
*H04L 9/40* (2022.01)
*H04L 9/32* (2006.01)
*G16Y 30/10* (2020.01)

(52) U.S. Cl.
CPC ............ *H04L 63/126* (2013.01); *H04L 9/321* (2013.01); *G16Y 30/10* (2020.01)

(58) Field of Classification Search
CPC .............................. H04L 63/126; H04L 9/321
See application file for complete search history.

(56) References Cited

U.S. PATENT DOCUMENTS 10,826,684 B1 * 11/2020 Winter .................. H04L 9/3239
11,128,438 B1 * 9/2021 Konda ................ H04L 63/0263
(Continued)

FOREIGN PATENT DOCUMENTS

WO    2017196440 A1    11/2017

OTHER PUBLICATIONS

Payment Card Industry (PCI), "Contactless Payments on COTS (CPoC™)", Security and Test Requirements, Version 1.0, Dec. 2019, 162 pages.
(Continued)

*Primary Examiner* — Thaddeus J Plecha
(74) *Attorney, Agent, or Firm* — Procopio, Cory, Hargreaves & Savitch

(57) ABSTRACT

Apparatus, methods, and computer-readable media for facilitating self-managed trust in Internet-of-Things networks are disclosed herein. An example method of trust management at a network manager includes enrolling a network endpoint with a network managed by the network manager. The example method also includes receiving trusted reference information for the network endpoint based on enrolling the network endpoint. Additionally, the example method includes performing verification of the network endpoint based on at least one of the trusted reference information or an attestation received from the network endpoint. Further, the example method includes enforcing policies to the network endpoint based on a result of the verification. Such trust management may improve privacy and security at the network, as well as reduce latency in responding to trust incidents.

26 Claims, 26 Drawing Sheets

(56) References Cited

U.S. PATENT DOCUMENTS

| | | | |
|---|---|---|---|
| 2007/0143629 A1 | 6/2007 | Hardjono et al. | |
| 2018/0063079 A1* | 3/2018 | Ding | H04L 63/0464 |
| 2019/0165941 A1 | 5/2019 | Ray | |
| 2020/0012548 A1* | 1/2020 | Escutia Garcia ... | G06F 11/3409 |
| 2020/0358754 A1* | 11/2020 | Nair | H04L 63/083 |
| 2022/0303282 A1* | 9/2022 | Barriga | H04L 63/0281 |

OTHER PUBLICATIONS

Payment Card Industry (PCI), "Software-based PIN Entry on COTS", Security Requirements, Version 1.0, Jan. 2018, 102 pages.

Payment Card Industry (PCI), "Software-based PIN Entry on COTS (SPoC)™", Security Requirements, Version 1.1, Jun. 2020, 108 pages.

International Search Report and Written Opinion—PCT/US2021/048059—ISA/EPO—Nov. 23, 2021.

TCG: "TCG Trusted Network Connect TNC Architecture for Interoperability Specification Version 1.3 Revision 6", Apr. 28, 2008 (Apr. 28, 2008), Specification Version 1.3, Revision 6, Apr. 28, 2008 Published, 42 Pages, XP055010385, Retrieved from the Internet: URL: https://trustedcomputinggroup.org/wp-content/uploads/TNC_Architecture_v1_3_r6.pdf, [retrieved on Oct. 25, 2011] Sections 3 and 4.

* cited by examiner

SELF-MANAGED TRUST IN INTERNET OF THINGS NETWORKS

CROSS REFERENCE TO RELATED APPLICATION(S)

This application claims the benefit of and priority to U.S. Patent Provisional Application Ser. No. 63/072,031, entitled "SELF-MANAGED TRUST IN INTERNET OF THINGS NETWORKS," and filed on Aug. 28, 2020, and claims the benefit of and priority to U.S. Patent Provisional Application Ser. No. 63/072,040, entitled "METHODS AND APPARATUS TO FACILITATE SURROGATE-BASED ACCESS MANAGEMENT USING ATTESTATION RESULTS", and filed on Aug. 28, 2020, which are each expressly incorporated by reference herein in their entirety.

TECHNICAL FIELD

The present disclosure relates generally to communication systems, and more particularly, to communication systems including trust management and/or access management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for trust management at a network manager are provided. An example apparatus enrolls a network endpoint with a network managed by the network manager. The example apparatus also receives trusted reference information for the network endpoint based on enrolling the network endpoint. Additionally, the example apparatus performs verification of the network endpoint based on at least one of the trusted reference information received from the one or more trusted third parties, or an attestation received from the network endpoint. The example apparatus also enforces policies to the network endpoint based on a result of the verification.

In another aspect of the disclosure, a method, a computer-readable medium, and an apparatus for trust management at a network endpoint are provided. An example apparatus provides a temporary credential for the network endpoint to a network manager. In some examples, the temporary credential may be based on a permanent credential for the network endpoint. Additionally, the example apparatus receives, from the network manager, access or authorization for services or resources. In some examples, the access or authorization may be based on a device verification based on the temporary credential of the network endpoint.

In another aspect of the disclosure, a method, a computer-readable medium, and an apparatus for trust management at a network manager are provided. An example apparatus enrolls a network endpoint with a network managed by the network manager. The example apparatus also receives trusted reference information for the network endpoint based on enrolling the network endpoint. Additionally, the example apparatus queries the network endpoint for device information in accordance with a network manager policy enforced by the network manager. The example apparatus also performs one or more trust event remedies in accordance with the network manager policy when a trust event occurs, the occurrence of the trust event based on a comparison of the device information and the trusted reference information for the network endpoint.

In an aspect of the disclosure, a method, a computer-readable medium, and an apparatus for access management at a trust agent are provided. An example apparatus receives attestation information from a device requesting access to services or resources provided by a service managing entity. The example apparatus also evaluates the attestation information for the device based on an updateable policy. Additionally, the example apparatus enforces the updateable policy to the device for the services or resources provided by the service managing entity based on the evaluation of the attestation information.

In another aspect of the disclosure, a method, a computer-readable medium, and an apparatus for access management at a device are provided. An example apparatus provides attestation information associated with the device to a trust agent when requesting access to services or resources provided by a service managing entity. Additionally, the example apparatus receives access to the services or resources provided by the service managing entity from the trust agent based on an evaluation of the attestation information to an updateable policy.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
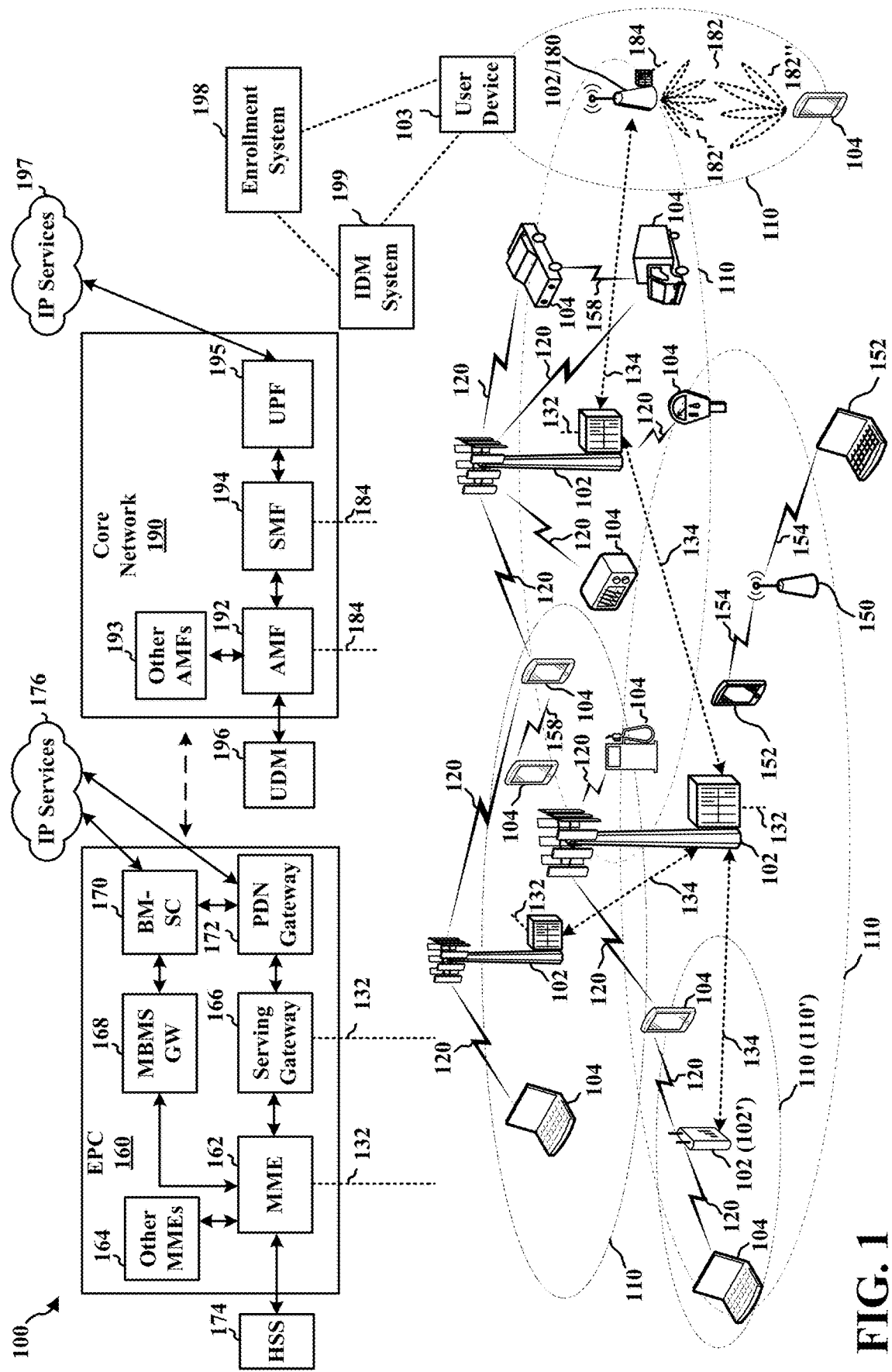
FIG. 1 is a diagram illustrating an example of a wireless communications system and an access network.

Aspects presented herein provide a system that enables a device (e.g., a user device, a UE, a network endpoint, etc.) to access a service or device based on identity information and/or credentials associated with the device. Some aspects presented herein may be accomplished via a wireless communication system.

In remote attestation, a relying party (e.g., a service provider) may require evidence produced by a remote peer entity (e.g., a device or human) to assess the trustworthiness of the remote peer entity. In general, trustworthiness refers to a quality that is assessed via evidence. For example, based on the type of evidence produced by the remote peer entity, the relying party may be able to determine whether the remote peer entity is the entity they claim to be and/or whether to trust the remote peer entity. In some examples, performing remote attestation includes a verifier that appraises the evidence produced by the remote peer entity via appraisal policies and creates an attestation result to support the relying party in their decision.

For example, a network, such as an IoT network, may include one or more network endpoints that access a service (e.g., wireless communication, Internet access, messaging, networking, etc.) provided by a service provider (e.g., a gateway, a router, an access point, a base station, etc.). To protect the integrity of the network, the service provider may utilize remote attestation procedures to determine whether the one or more devices are in-compliance with access to the network. For example, the service provider may request a device provide information about itself (e.g., evidence) that the service provider can use to determine the trustworthiness of the device. A verifier (e.g., a trusted third party, such as the manufacturer of the device) may assess the evidence (e.g., using appraisal policies) to create an attestation result to support the service provider in making their determination of the trustworthiness of the network endpoint (e.g., an IoT device, etc.). In some examples, the network endpoint may send the evidence to the verifier. In some examples, the network endpoint may send the evidence to the service provider, which then forwards the evidence to the verifier.

However, it may be appreciated that in some examples, performing remote attestation may entail privacy concerns, management concerns, and/or scalability issues. For example, each time remote attestation is performed, information (e.g., evidence) is transmitted from the network (e.g., the network provided by the service provider) to a verifier via a remote network (e.g., an IoT framework) that facilitates managing the network endpoint of the network.

Example techniques disclosed herein utilize a surrogate device located within a network to facilitate self-managed trust for the network (e.g., an IoT network). For example, disclosed techniques can facilitate reducing information that is transmitted from the network to a remote network (e.g., an IoT framework) by configuring a network health manager (e.g., the surrogate device) to manage the health and trust of network endpoints connected to the network. The network health manager may leverage information provided by one or more trusted third parties to assume the role of verifier. Thus, the network health manager may operate as the service provider and the verifier and limit information that is transmitted from the network to the remote network.

Aspects presented herein provide a system that enables a network endpoint to access a service or device based on identity information and/or credentials associated with the network endpoint. Some aspects presented herein may be accomplished via a wireless communication system.

As used herein, the term "trusted third party" is not limited to an entity that created the network endpoint (e.g., the manufacturer of the network endpoint) and may include any entity that provides one or more resources or services for the operation of the network endpoint, as presented herein. For example, a trusted third party may include the manufacturer of the network endpoint, a cloud-based device management service (e.g., an IoT framework), an entity (e.g., a web server) hosting policies for enforcing against the network endpoint, an entity (e.g., a web server) hosting device verification information, an entity configured to perform device attestations associated with the network endpoint, etc.

In some examples, service access may be based on verifying information about an entity. For example, before a service managing entity provides access to a device (e.g., a user device, a UE, a network endpoint, etc.), the service managing entity may verify that the device is trustworthy. However, in some examples, access to the service may be based on verification of various information about the service accessing entity (e.g., the device). In some such examples, the service managing entity may verify the various information about the device via one or more verification entities.

Example techniques disclosed herein utilize a surrogate device to manage access to services provided by the service managing entity. For example, disclosed techniques may configure a device to operate as an agent for the service managing entity and to manage access to the services based on a plurality of attestable parameters. In some examples, the agent may facilitate verifying attestable information for a device corresponding to the attestable parameters. The example agent may then evaluate a trust score for the device based on respective verification results and enforce a policy to the device based on the trust score.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102, 180 and UEs 104. The example of the wireless communications system (also referred to as a wireless wide area network (WWAN)) includes the base stations 102, the UEs 104, an Evolved Packet Core (EPC) (e.g., an EPC 160), and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area. There may be overlapping geographic coverage areas. For example, the small cell 102' may have a coverage area 110' that overlaps a geographic coverage area 110 of one or more macro base stations. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE to a base station and/or downlink (DL) (also referred to as forward link) transmissions from a base station to a UE. The communication links 120 may use multiple-input and multiple-output (MIMO) antenna technology, including spatial multiplexing, beamforming, and/or transmit diversity. The communication links may be through one or more carriers. The base stations 102/the UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In some scenarios, one or more of the UEs 104 may communicate with each other using device-to-device (D2D) communication link, such as the D2D communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (e.g., STAs 152) via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station, whether a small cell 102' or a large cell (e.g., macro base station), may include and/or be referred to as an eNB, gNodeB (gNB), or another type of base station. Some base stations, such as base station 180 (e.g., a gNB) may operate in a traditional sub 6 GHz spectrum, in millimeter wave frequencies, and/or near millimeter wave frequencies in communication with the UEs 104. When the base station 180 operates in millimeter wave or near millimeter wave frequencies, the base station 180 (e.g., a gNB) may be referred to as a millimeter wave base station. The millimeter wave base station may utilize beamforming 182 with the UEs 104 to compensate for the path loss and short range. The base station 180 and the UEs 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) (e.g., an MME 162), other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway (e.g. a PDN Gateway 172). The MME 162 may be in communication with a Home Subscriber Server (HSS) (e.g., an HSS 174). The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) (e.g., an AMF 192), other AMFs 193, a Session Management Function (SMF) 194, and a User Plane Function (UPF) (e.g., a UPF 195). The AMF 192 may be in communication with a Unified Data Management (UDM) (e.g., a UDM 196). The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base stations 102 provide an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

As illustrated in FIG. 1, the communication system and access network 100 may include one or more devices (e.g., user devices, UEs, network endpoints, etc.) that enable access to a service or device based on an identity or credentials associated with a user device 103. In some examples, the user device 103 may be the UE 104. In some examples, a user and/or the user device 103 may enroll the user device 103 with an enrollment system 198. The enrollment system 198 may generate an electronic identifier (eID) and provide the eID to an identity management (IDM) system (e.g., an IDM system 199). The user device 103 may then perform device attestation, feature activation, credential provisioning, access to services, etc. via the IDM system.

Identity and associated credential(s) can be important aspects for an electronic transaction ecosystem. Different identifier (ID) types have different requirements. For example, in order to obtain a government issued ID, a person may provide or show proof of a birth certificate, a social security number, proof of residency, a fingerprint, among other items. For a banking ID, a person may provide a government issued ID, a social security number, proof of residency or address, among other items. For a payment system ID, a person or entity may provide or show proof of a bank account, a credit card number, a contact number, such as a telephone number or mobile phone number, among other items. In order to obtain an insurance ID, a person may provide or show a government issued ID, a social security number, etc. For a health record ID, a person may provide or show a government issued ID, a social security number, etc. Obtaining each of these IDs incudes an enrollment phase in which the person provides proof of one or more identifiers in order to obtain the specific ID. The enrollment process for the various IDs can include fragmented and time-consuming procedures. Different security items/proof of identity may be required for different types of IDs. Although there may be common items for security/proof of identity across different systems, the items/proof are not shared. In many examples, a human presence is needed in order to establish the ID, e.g., to extract biometric information. Other IDs may not include such requirements. The ID may not be interoperable between systems. The lack of interoperability may be due to security, privacy, compatibility, etc. Aspects presented herein enable a mobile system that enables consolidation of ID information and procedures through the use of a mobile user device. The mobile device and the security features of the mobile device (e.g., based on a hardware root of trust) may provide a central aspect of the electronic transaction system.

Aspects presented herein provide a general purpose framework to enable a user and/or a user device to access a service and/or device based on various different types of identity and credentials. Different levels of security may be provided for different levels of access. Levels may be defined based on a policy or a level of sensitivity of the service being accessed. The service may decide the level of access to allow to user devices, e.g., based on a certification associated with the user device. Functional elements and technology may be provided inside of the user device to improve security, such as an enhancement of authentication (e.g., a liveness test, a continuous authentication), access/admission control, or credential management and protection. Elements and technology may also be provided at a cloud level.

Aspects presented herein may enable the user device to be a trusted device that provides a more secure gatekeeper to access services. The user device may be used to provide information to enable access to services, e.g., health care, government, financial, etc. Different levels of trust may be provided based on particular user device capabilities. The user device may provide a supplement to legacy systems to provide an additional type of secure access to services.

Trust in the device may be based on hardware security aspects (e.g., certification at T=0). Such hardware security aspects may be tamper-resistant, tamper evident, side-channel resistant, isolated execution and hardware crypto modules along with certification (e.g., Common Criteria Evaluation Assurance Level (CC EAL)).

Trust in the device may also be based on device attestation (i.e., at T>0), such as based on measurement and report of a device state (e.g., one or more of device software, firmware, operating systems, application programs, a user authentication result, a current location of the user device, one or more hardware states, etc.) using a device key.

Aspects presented herein provide secure provisioning and storage of cryptographic keys/credentials. The keys or credentials may include device keys, a user's biometric credential (e.g., fingerprint, facial ID, iris, etc.), application keys/access tokens, and/or a trust list (e.g., with trusted certificates).

One example of an eID is a mobile driver's license. The driver's license may be used to provide proof of a driving privilege, an age verification, proof of a name, access to airport security checkpoints, etc. While a simple image of a license may not be trustworthy on its own, mechanisms may be provided at a user device to obtain trustworthy data from a mobile driver's license associated with a user device. For example, data may be obtained under control of the mobile driver's license holder that enables a verifier to appraise the validity of the data (e.g., a user identity or information provided in the mobile driver's license) and to generate an attestation result indicating whether the verifier is able to vouch for the data and the mobile driver's license. As an example, an official issuing the mobile driver's license may electronically sign the data and may ensure that it is provisioned to the proper device.

A system for an eID may include various participants. For example, the participants may include a device (e.g., a user device, a UE, a network endpoint, etc.). In some examples, the device may be a UE 104, as illustrated in FIG. 1. Among others, examples of user devices include, e.g., wearables, sensors, IoT devices, smartphones, V2X devices. The user device may create and store a user ID and credentials locally. The user device may enroll the user ID and credentials with an Identity Management (IDM) System. The user device may enable use by one or more owners/users. The user device may provide a root of trust for crypto operations, credentials, device attestation (e.g., measurement and report of device states).

Another participant in the eID system may be the device owner. The device owner may control the access mode (open or closed) of the user device and the user group (for closed access mode). The device owner may be different than the device user in some examples. The device owner may control user devices remotely. For example, the user device(s) may be managed and/or transactions may be performed without the presence of the device owner.

Another participant in the eID system may be the device user (e.g., the eID holder). The device user may be different than the owner of the device in some examples.

Another participant in the eID system may be the IDM system. The IDM system may manage identity and credentials of users, authenticate users and authorize user access to associated resources, and/or protect IDs, credentials and transactions (e.g., immutable records).

Another participant in the eID system may be services that are accessed by a user device. The eID system may be used by the services to verify the identity of users. The services may obtain authorized access to user information via the IDM.

ID types that may be associated with the eID system may include, among others, a certificate ID, an email, a phone number, a permanent ID, a pseudonym, a certified ID (such as a social security number, a driver's license number, etc.).

Among others, examples of a credential type for the eID system may include a public-private key pair, a certificate, a token, biometric information, a password, or a personal identification number (PIN). An ID card may include a digital ID containing the user information such as ID number, legal name, date of birth, photo, issuer, issue/expiration date, issuer eID, etc. Biometric information may include a facial ID, a fingerprint, an iris biometric information, etc. A biometric template may include feature extracts. The biometric information may be transformed (e.g., encrypted) so that privacy is maintained. Credentials can be linked to a user's additional resources, e.g., device security info (such as at an EAL level or tamper-resistance), service contract signed by a service provider, etc.

The eID system may include an ID to credential relation. For example, each credential may be associated with a unique ID. Each credential may be associated with or include a set of resources (e.g., a social security number, a legal name, a date of birth, an age, etc.). A new credential may be created using the existing credentials and subset of resources. The resources to be disclosed to a service may be controlled by a user. Multiple IDs may be associated with a single credential. For example, the user may associate additional IDs to the credential, i.e., multiple personas without enrolling multiple credentials. Each ID may be associated with multiple credentials (e.g., for multi-factor authentication (MFA)). The credential to be used may be determined based on service requirements.

Figure 2:
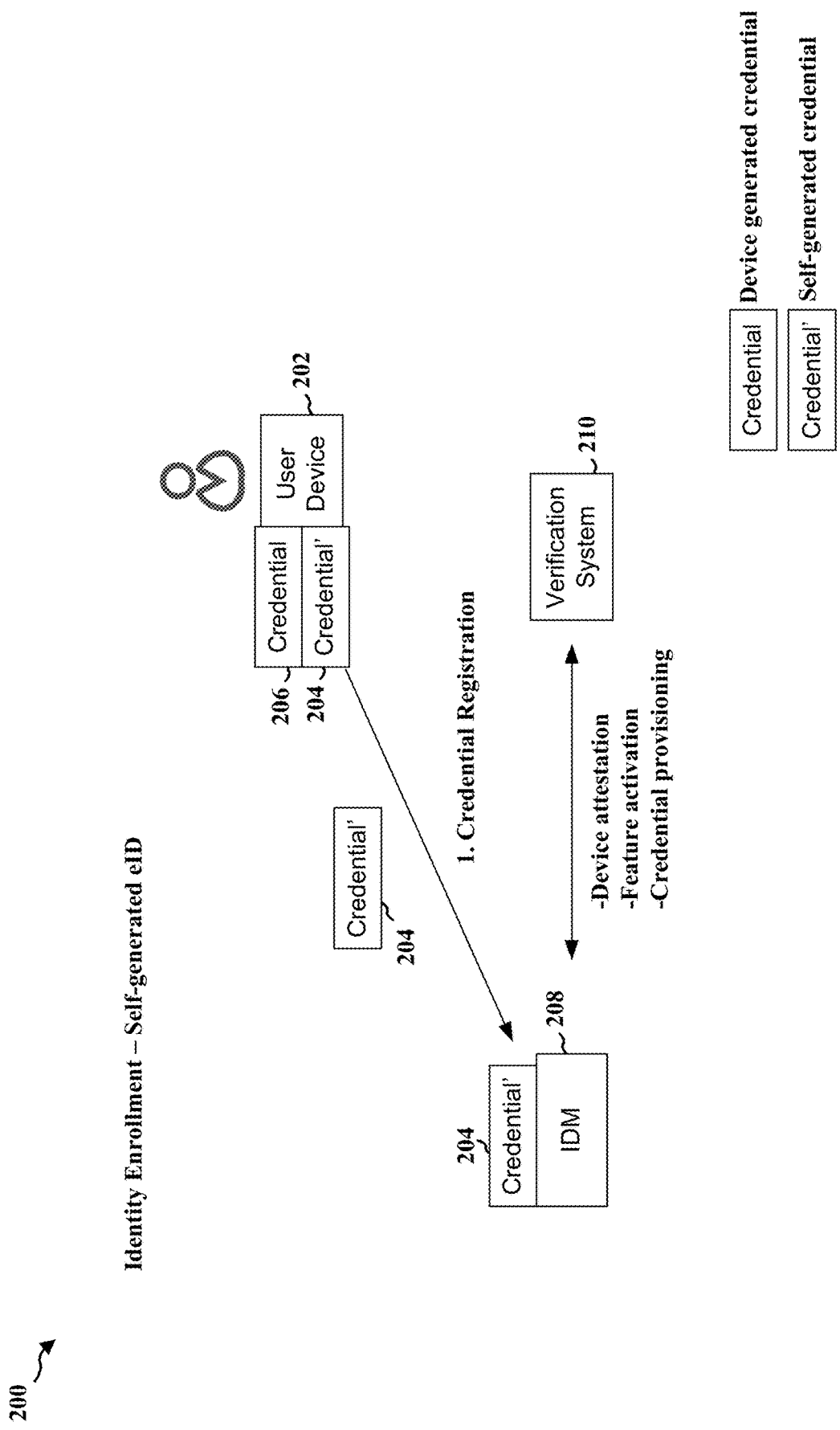
FIG. 2 is an example communication system for self-generation of an electronic identifier (eID), in accordance with the teachings disclosed herein.

FIG. 2 illustrates an example system 200 for identity enrollment of a self-generated eID. As illustrated, a user device 202 may generate a self-generated credential 204 and may have a device credential 206. The user device 202 may send the self-generated credential 204 to an IDM system 208 in a credential registration. The IDM system 208 may perform a device attestation with a verification system 210, e.g., to obtain the proof of the current device states to enable a feature activation for the user device, credential provisioning for the user device, etc. Each step illustrated in FIG. 2 may include attestation. For example, there may be a user attestation to the user device 202 (e.g., between the user and the user device 202), a device attestation to the IDM system 208 (e.g., between the user device 202 and the IDM system 208) and/or the verification system 210 (e.g., between the IDM system 208 and the verification system 210), a connection attestation to the IDM system 208 (e.g., between the user device 202 and the IDM system 208) and/or a connection attestation to the verification system 210 (e.g., between the IDM system 208 and the verification system 210).

In some examples, the user device 202 may be a mobile device that exchanges wireless messages with the IDM system 208 or other system as part of the enrollment, attestation, etc.

Figure 3:
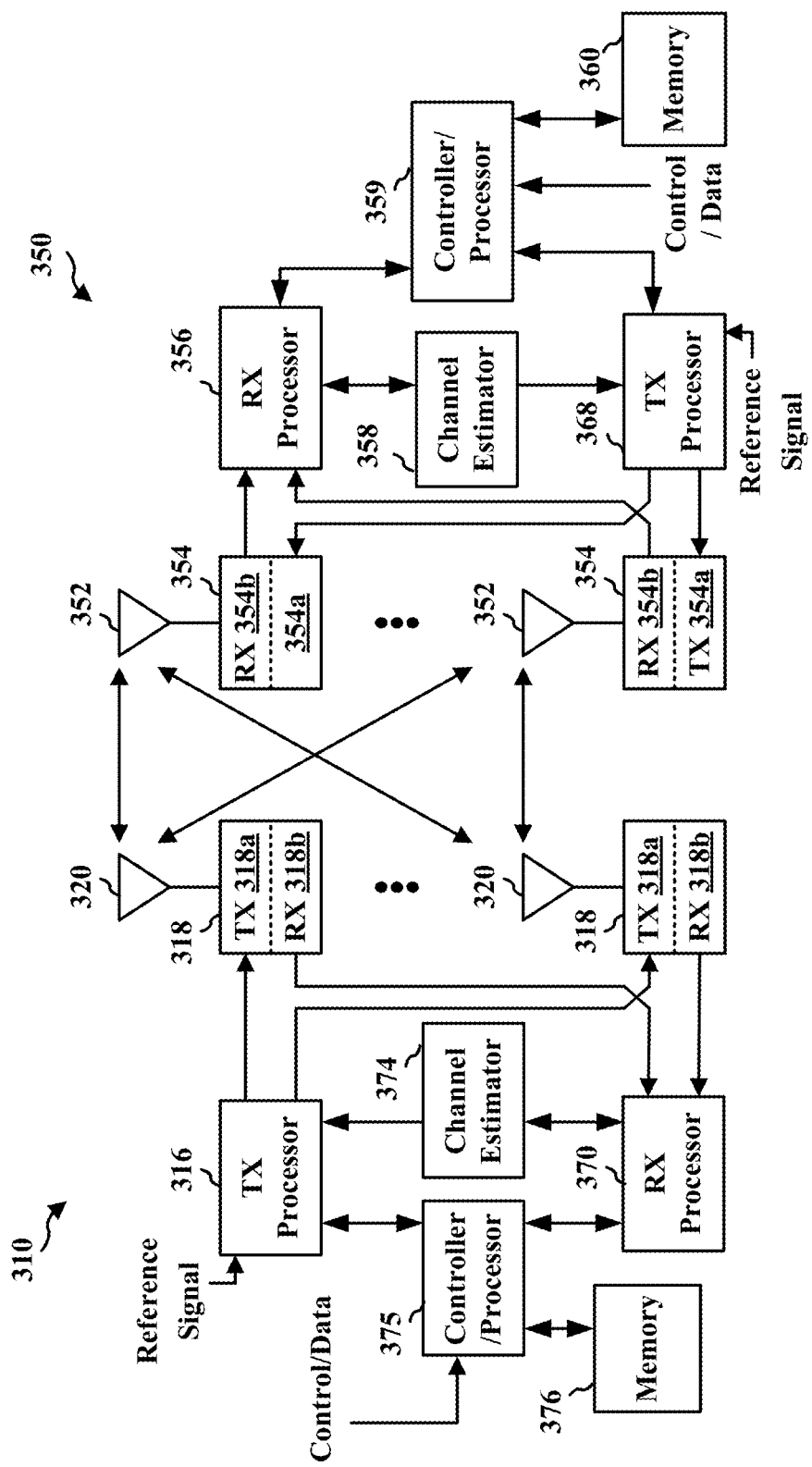
FIG. 3 is a diagram illustrating an example of a first wireless device and a second wireless device in an access network, in accordance with the teachings disclosed herein.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. The UE 350 may be a device (e.g., a user device, a network endpoint, etc.) that exchanges messages with an enrollment system, such as the enrollment system 198 of FIG. 1, and/or an IDM system, such as the IDM system 199 of FIG. 1, via the base station 310. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly

TABLE 1 below illustrates examples of enrollment types and example properties associated with a self-generated eID and a certified eID.

| | Self-generated eID | Certified eID |
|---|---|---|
| Example Use Cases | General service access, e.g., web services, shared device access, etc. | Service access with real identity verification, e.g., government or financial services |
| ID Properties | Self-ownership (self-certified) | Certified by a 3$^{rd}$ party |
| ID generation | Censorship resistant | Controlled by a 3$^{rd}$ party |
| Trust of ID | Based on reputation | Endorsed/certified by a trusted authority |
| ID Dependencies | Endorsed by other eID(s) | Associated with a device credential |
| Enrollment | Device attestation attests the security level of eID | | of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

IG. 4 illustrates an example communication flow 400 of an identity enrollment for a self-generated eID, in accordance with the teachings disclosed herein. The eID enrollment may be performed, for example, by an eID system such as illustrated in FIG. 2. The communication flow 400 of FIG. 4 includes a user 402, a device 404, an IDM system 406, and a verification system 408. A user attestation or authentication process 403 may be performed between the user 402 and the device 404 for the device 404 to verify that the user 402 is authorized to use the device 404. The authentication or attestation may be based on a password, a Personal Identification Number (PIN), biometric information, a liveness test, etc. entered or provided by the user 402. Following the user authentication (e.g., at the authentication process 403), an ID enrollment trigger may occur, as illustrated at 405. The user 402 may trigger the ID enrollment, for example. An ID may be selected or generated by the user 402 and/or the device 404. In some examples, the ID may additionally or alternatively comprise a credential, such as a public-private key pair (e.g., a public key (pk) and a private key (or secret key (sk)). The device 404 sends a credential enrollment request 407 that is received by the IDM system 406. The credential enrollment request 407 includes the device ID for the device 404. The IDM system 406 sends a device verification request 409 that is received by the verification system 408. The verification system 408 responds to the device verification request 409 by transmitting a device attestation request 411, including a nonce, that is received by the IDM system 406. The IDM system 406 sends a device attestation request 413 with the nonce to the device 404. The device 404 responds by sending a device attestation 415 that is received by the IDM system 406.

In some examples, the device attestation 415 may include a signed claim, and the claim may include one or more device states, or hash values of the one or more device states, or any combination thereof. A claim includes a piece of asserted information and may be in the form of a name/value pair about the device. The claim may be signed by the device (e.g., using a device specific signing key), which may be provisioned and stored in the secure or trusted environment of the device. An attestation provides attributes about the device. The device states may be measured at least based on one or more of device software, firmware, operating systems, application programs, a user authentication result, a current location, a hardware state, or any combination thereof. In some examples, the attestation may include a user attestation. The user attestation may further comprise one or more of a biometric liveness score, a trusted location, information about a user finger used to authenticate, other metadata associated with preventing spoofing of the user authentication, or any combination of such user attestation information. As an example of a hardware state, a device may determine if it is connected via a universal serial bus (USB) to a computer, if the device's battery has been removed, or some other evidence of potential hardware tampering. A hardware state may be based on information from sensors to indicate whether something has or has not occurred at the device, e.g., has a fuse blown, has a fuse been disabled, has the device been opened, is the device currently connected to another device such as via a USB or other wired connection, etc. The device states or hash values of device states may be signed along with at least the device ID, and a nonce. The IDM system 406 sends a device verification request 417 to the verification system 408. The device verification request 417 may include the signed claim or other information from the device attestation 415.

At 419, the verification system 408 determines the device identity of the device 404 and claim verification. Then, the verification system 408 transmits a device verification response 421 to the IDM system 406. The device verification response 421 may contain the device verification result. The device verification result provides a proof of the evaluation of the device claim by the verifier (e.g., the verification system 408). The device verification result may be signed by the verifier, e.g., using its signing key, similar to the claim from the device being signed by the device using the device's signing key. The device verification response may further contain the device states. The device verification result may indicate that the device identity is verified and that the claim is verified by the verification system.

Figure 4:
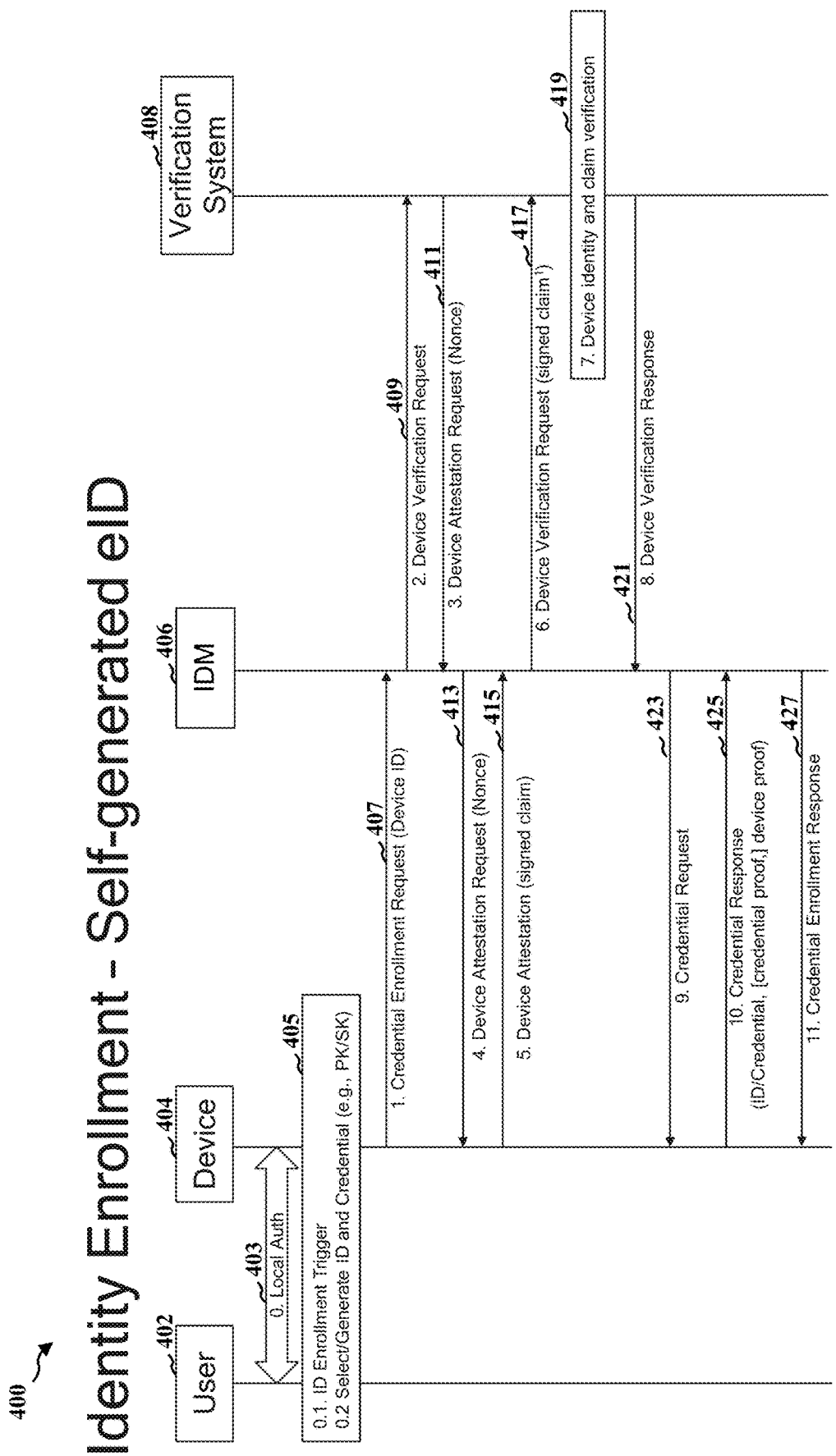
FIG. 4 is an example communication flow of an identity enrollment for a self-generated eID, in accordance with the teachings disclosed herein.

As shown in FIG. 4, the IDM system 406 sends a credential request 423 to the device 404 after receiving the device verification response 421 from the verification system 408. The device 404 responds to the credential request 423 by transmitting a credential response 425 to the IDM system 406. Among other information, the credential response 425 may include one or more of an ID, a credential, a credential proof, user information, or a device proof. The information included in the credential response may comprise an eID. After receiving the credential response 425, the IDM system 406 responds with a credential enrollment response 427. Following the credential enrollment response 427, the eID is enrolled with the IDM system 406.

Figure 5:
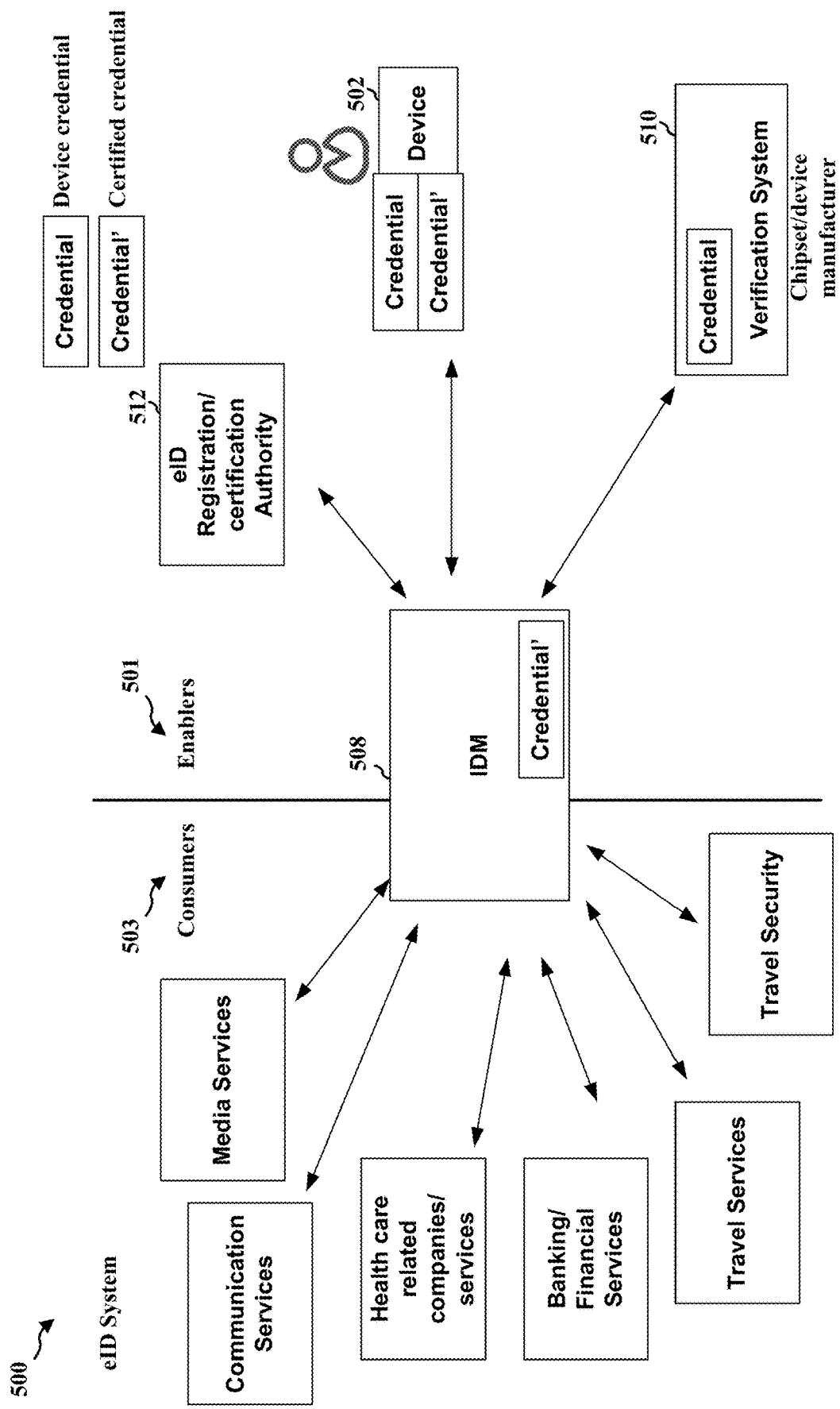
FIG. 5 is an example communication system for enrollment of an eID, in accordance with the teachings disclosed herein.

FIG. 5 illustrates an example eID system 500 in which an IDM system 508 interacts with enablers 501 that enable an eID to provide or control access to consumers or services 503, in accordance with the teachings disclosed herein. In the illustrated example, a device 502 (e.g., a user device, a UE, a network endpoint, etc.) may interact with the IDM system 508 to use the eID in connection with the consumers or services 503. The IDM system 508 may exchange information with a verification system 510 to verify the credentials of the device 502. An enrollment system or eID registration/certification authority 512 may provide the eID to the IDM system 508 for the device 502. In the illustrated example of FIG. 5, the eID registration/certification authority 512 is different than the self-generated eID of FIGS. 2 and/or 4.

An eID may be stored or enrolled in a user device by scanning a physical ID card and verifying the authenticity of the card interacting with the issuing authority. There might be many scenarios where the physical ID card is unnecessary or not preferred due to risk of theft, delay of the issuing and/or enrollment procedure, difficulty of revocation, or the like. By facilitating enrollment procedures detailed herein, eID and associated credentials that are created by an issuing authority may be managed by an IDM and the user device may be granted a token to access the eID and credentials. The token may be bound to the user device that user registered during the enrollment procedure detailed herein. Device attestation may be performed as part of device registration. The user may then download the eID and credentials from the IDM by presenting the token on the user device.

Figure 6:
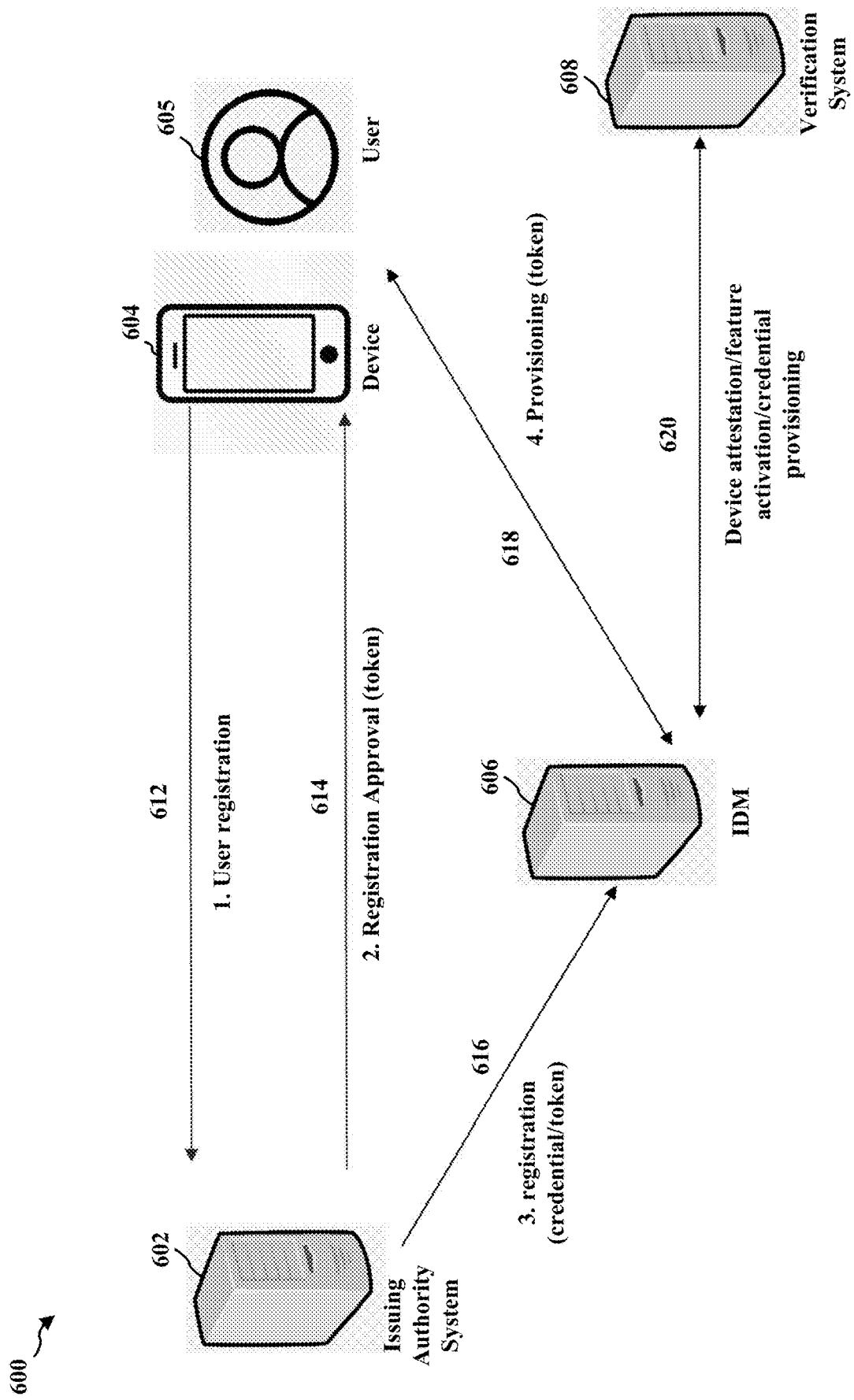
FIG. 6 is a diagram illustrating an example eID enrollment environment, in accordance with the teachings disclosed herein.

FIG. 6 is a diagram illustrating an example eID enrollment environment 600, as presented herein. An eID is an ID including ID information and an associated credential, e.g., an electronic credential. Examples of ID information that may be included in the eID include an ID number, a name, a birth date, an issuing date, an expiration date, among other information. The associated credential may include any of a key (e.g., a public-private key pair), a certificate, a token, a password, a PIN, a digital ID (such as a digital ID card) comprising the user information, biometric information for the user (e.g., a facial ID, a fingerprint, iris biometric information, etc.), among other examples. The user device may further perform a user authentication. The user authentication may bind the attestation to authentication, e.g., the attestation for the device to the user. In some examples, the user authentication may further include a liveness test of a user, which may increase the binding between the attestation of the device and the authentication of the user. As illustrated in FIG. 6, the eID enrollment environment 600 includes an issuing authority system 602, a device 604 (e.g., a user device, a UE, a network endpoint, etc.) controlled by a user 605, an IDM system 606, and a verification system 608. The issuing authority system 602 may be controlled by an issuing authority of the eID. For example, if the eID is associated with a driver's license the issuing authority of the eID may be the department of motor vehicles. The verification system 608 may store information regarding user devices, such as a device credential of the device 604. In some aspects, the device credential may include a device public key. In some aspects, the device credential may include credentials that are tied to the hardware of the device 604. For example, the device credential may include one or more permanent identifiers associated with hardware, such as chipset including a baseband processor and one or more other processors, of the device 604.

As shown in FIG. 6, the user 605 may use the device 604 to begin a user registration process 612. Device credentials may be transmitted to the issuing authority system 602 while performing the user registration process 612. The issuing authority system 602 may then transmit a registration approval that includes a token that may be bound to the device 604. The issuing authority system 602 may also perform a registration procedure 616 with the IDM system 606 by transmitting a registration token including ID credential, such as credentials associated with a driver's license and driver's license information to the IDM system 606. The IDM system 606 may store the ID credentials transmitted from the issuing authority system 602. Responsive to receiving registration approval 614, the device 604 may perform a credential provisioning procedure 618 at the device 604 with the IDM system 606. In some aspects, during the credential provisioning procedure, user authentication is also performed based on the credential stored in the IDM system 606. Details of the credential provisioning procedure are further explained in conjunction with FIG. 9. The IDM system 606 may perform a device verification procedure 620 with the verification system 608 to verify the device 604. In some aspects, the device verification procedure 620 may include device provisioning, feature activation, or device attestation. In some aspects, each step among the user registration process 612, the registration approval 614, the registration procedure 616, the credential provisioning procedure 618, and the device verification procedure 620 may require device attestation.

Performing remote attestation may include a first entity or first party (e.g., an attester), a second entity or second party (e.g., a relying party), and a third entity or third party (e.g., a verifier). The attester is the entity (e.g., a user or a device) whose attributes are being appraised to determine whether the entity is considered trustworthy (e.g., whether the entity has access and/or authorization to a service). The relying party is the entity (e.g., a service provider) that relies on the trustworthiness of the attester to determine whether the entity has access and/or authorization to a service. The verifier is an entity (e.g., a trusted third party, such as a manufacturer of a device, an IDM system, a verification system, etc.) that appraises the validity of the attributes of the attester.

For example, a network, such as an IoT network, may include one or more network endpoints and/or devices that access a service (e.g., resources of the network) provided by a service provider (e.g., a gateway, a router, an access point, a base station, etc.). To protect the integrity of the network, the service provider may utilize remote attestation procedures to determine whether the one or more network endpoints and/or devices are in-compliance with access to the network.

In general, the attester (e.g., a network endpoint, a device) creates evidence (e.g., a set of information or claims) that is conveyed to the verifier. In some examples, the evidence may comprise a measurement and report of a state of the network endpoint and/or the device (generally referred to herein as "UE"). For example, the evidence may include firmware information, software information, location information, a timestamp (e.g., time and/or date information), etc. associated with the UE. In some examples, the attestation may include a user attestation. The user attestation may further comprise one or more of a biometric liveness score, a trusted location, information about a user finger used to authenticate, other metadata associated with preventing spoofing of the user authentication, or any combination of such user attestation information.

The verifier applies an evidence appraisal policy to the received evidence to assess the trustworthiness of the attester (e.g., the UE) and generates an attestation result. The evidence appraisal policy may comprise one or more rules or constraints directing the verifier on how to evaluate the validity of the evidence provided by the attester. The attestation result may indicate whether the verifier vouches for the validity of the attester and the evidence. For example, the verifier may be a trusted third party, such as a manufacturer of the network endpoint and/or the device, and the evidence appraisal policy may include device verification information regarding compliant firmware version(s) information, compliant software version(s) information, compliant location(s) information, compliant timestamp(s) information, etc. The verifier may generate the attestation result indicating whether the evidence provided by the attester is in-compliance with the device verification information.

The relying party applies an attestation appraisal policy to the attestation result to determine whether to provide access and/or authorization to a service to the attester. For example, the relying party may be a service provider and may enforce a policy to the attester based on the attestation result. For example, the policy may comprise one or more levels or configurations of network access, one or more levels or configurations of service access and/or authorization, one or more levels or configurations of QoS, one or more levels or configurations of resource access, one or more levels or configurations of trust, and/or one or more trust event remedies.

Figure 7:
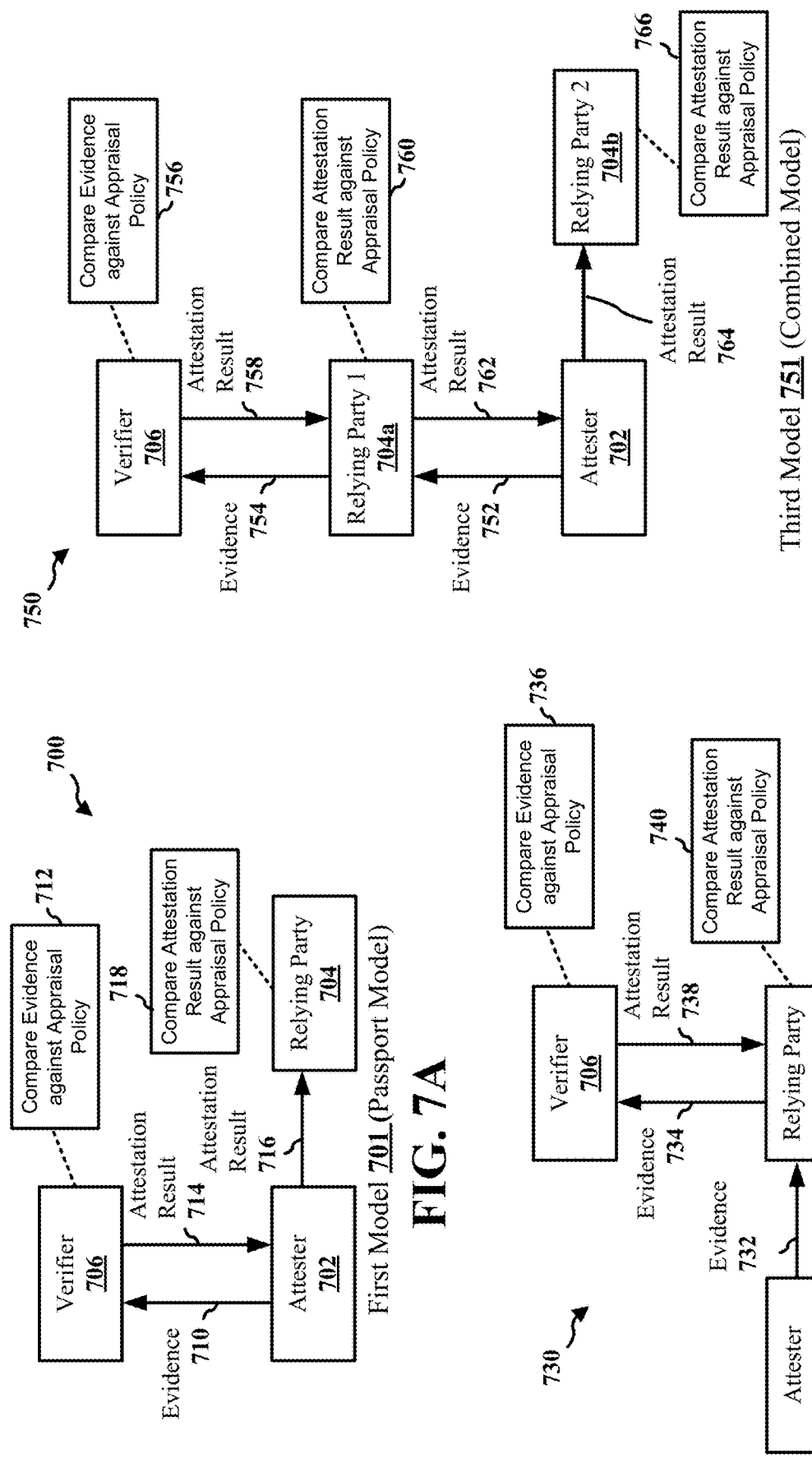
FIG. 7A illustrates an example communication flow facilitating a first example model of performing remote attestation between an attester, a relying party, and a verifier, in accordance with the teachings disclosed herein.
FIG. 7B illustrates an example communication flow facilitating a second example model of performing remote attestation between an attester, a relying party, and a verifier, in accordance with the teachings disclosed herein.
FIG. 7C illustrates an example communication flow facilitating a third example model of performing remote attestation between an attester, a first relying party, a second relying party, and a verifier, in accordance with the teachings disclosed herein.

Aspects of performing remote attestation may be implemented using different techniques. FIG. 7A illustrates an example communication flow 700 facilitating a first example model 701 of performing remote attestation between an attester 702, a relying party 704, and a verifier 706, as presented herein. FIG. 7B illustrates an example communication flow 730 facilitating a second example model 731 of performing remote attestation between the attester 702, the relying party 704, and the verifier 706, as presented herein. FIG. 7C illustrates an example communication flow 750 facilitating a third example model 751 of performing remote attestation between the attester 702, a first relying party 704a, a second relying party 704b, and the verifier 706, as presented herein.

Aspects of the relying party 704 may be implemented by a service provider, such as a gateway, a router, an access point, a base station, an edge node, etc., providing access to a network (e.g., an IoT network). Aspects of the attester 702 may be implemented by a network endpoint and/or a device (e.g., the user device 103 of FIG. 1 and/or the UE 104 of FIG. 1) that is connected (or attempting to connect) to the network provided by the relying party 704. Aspects of the verifier 706 may be implemented by a trusted third party, such as a manufacturer of the attester 702 or an IoT framework configured to manage the devices of the network. In the illustrated examples of FIGS. 7A, 7B, and/or 7C, the verifier 706 is in communication with the attester 702 and/or the relying party 704 via a remote network.

In some examples, the first example model 701 of FIG. 7A may be referred to as a "Passport Model" due to its resemblance on how nations issue passports to their citizens.

In the illustrated example of FIG. 7A, the attester 702 transmits evidence 710 that is received by the verifier 706. At 712, the verifier 706 compares the evidence 710 against an evidence appraisal policy. The verifier 706 then transmits an attestation result 714 that is received by the attester 702. If the attester 702 determines that the attestation result 714 indicates compliance, then the attester 702 transmits (or forwards) an attestation result 716 to the relying party 704. At 718, the relying party 704 compares the attestation result 716 against an attestation appraisal policy. The relying party 704 may then enforce a policy on the attester 702 based on the outcome of the comparison (e.g., at 718).

In some examples, the second example model 731 of FIG. 7B may be referred to as a "Background Check Model" due to its resemblance on how an employer may perform a background check on a prospective employee. In the illustrated example of FIG. 7B, the attester 702 transmits evidence 732 that is received by the relying party 704. The relying party 704 transmits (or forwards) evidence 734 that is received by the verifier 706. At 736, the verifier 706 compares the evidence 734 against an evidence appraisal policy. The verifier 706 then transmits an attestation result 738 that is received by the relying party 704. At 740, the relying party 704 compares the attestation result 738 against an attestation appraisal policy. The relying party 704 may then enforce a policy on the attester 702 based on the outcome of the comparison (e.g., at 740).

In some examples, the third example model 751 of FIG. 7C may be referred to as a "Combined Model" due to its resemblance of a first relying party 704*a* employing the background check model, as shown in FIG. 7B, and a second relying party 704*b* employing the passport model, as shown in FIG. 7A. In the illustrated example of FIG. 7C, the attester 702 transmits evidence 752 that is received by the first relying party 704*a*. The first relying party 704*a* transmits (or forwards) evidence 754 that is received by the verifier 706. At 756, the verifier 706 compares the evidence 754 against an evidence appraisal policy. The verifier 706 then transmits an attestation result 758 that is received by the first relying party 704*a*. At 760, the first relying party 704*a* compares the attestation result 758 against an attestation appraisal policy. If the first relying party 704*a* determines that the attestation result 758 indicates compliance, then the first relying party 704*a* transmits an attestation result 762 to the attester 702. If the attester 702 determines that the attestation result 762 indicates compliance, then the attester 702 transmits (or forwards) an attestation result 764 to the second relying party 704*b*. At 766, the second relying party 704*b* compares the attestation result 764 against an attestation appraisal policy. The second relying party 704*b* may then enforce a policy on the attester 702 based on the outcome of the comparison (e.g., at 766).

However, in some examples, performing remote attestation may entail privacy concerns, management concerns, and/or scalability issues. For example, each time remote attestation is performed, information (e.g., evidence) is transmitted from the network (e.g., the network provided by the service provider) to a verifier via a remote network. For example, the network may be associated with a home, a business, a factory, a municipality, etc., and the network endpoints may comprise the different devices connected to the network. In some such examples, it may be appreciated that an owner of the network (e.g. a home owner, a factory owner, etc.) may want to limit the information that is transmitted to the remote network. For example, a network associated with a home may include one or more smart devices, such as a smart meter, a smart thermometer, one or more smart bulbs, etc. In some such examples, information that one or more the smart devices may transmit when performing remote attestation may provide habits or behaviors of the home owner (e.g., when the home owner is at home, etc.) that the home owner may want to keep private. In another example, a network associated with a factory may include dozens or hundreds of network endpoints. In some such examples, information that the network endpoints may transmit when performing remote attestation may include trade secrets, such as factory logs. In another example, it may be beneficial to prevent network endpoints within a network from connecting with a trusted third party (e.g., via a remote network).

However, in some examples, maintaining the health of the network may include communicating with a third party via a remote network. For example, software updates may be made available for a network endpoint connected to the network by the manufacturer of the network endpoint. In some such examples, the network owner may want to manage the heath and update devices in a centralized manner (e.g., via a secured gateway). Additionally or alternatively, the network owner may want to manage their devices based on capabilities, profiles, or roles.

Example techniques disclosed herein utilize a network health manager (e.g., a network controller, a network manager, a gateway, a router, an access point, a base station, an edge node, etc.) located within the network to facilitate self-managed trust for the network. For example, disclosed techniques can facilitate reducing information that is transmitted from the network to a third party via a remote network (e.g., an IoT framework) by configuring the network health manager to manage the health and trust of network endpoints connected to the network. The network health manager may leverage information provided by one or more trusted third parties to assume the role of verifier. Thus, the network health manager may operate as the service provider and the verifier of the network endpoints and limit information that is transmitted from the network to a third party via a remote network.

In some examples, an initial verification may be performed, for example, between a network endpoint, the network health manager, and a trusted third party (e.g., a remote verifier). For example, when a network endpoint requests a connection with the network, the network endpoint (e.g., an attester 702), the network health manager (e.g., a relying party 704), and the trusted third party (e.g., a verifier 706) may employ the remote attestation procedures described above in connection with FIGS. 7A, 7B, and/or 7C.

The network health manager (e.g., a secured gateway) may then operate as a surrogate for the network endpoint when managing the health and the trust of the network endpoint. For example, after the network endpoint is verified and its trustworthiness determined, the network health manager may obtain (or receive) trusted reference information for the network endpoint (e.g., from the trusted third party). In some examples, the trusted reference information may comprise a "last known good state" of the network endpoint. For example, the trusted reference information may include one or more of compliant firmware version(s) information, compliant software version(s) information, compliant location(s) information, compliant timestamp(s) information, etc.

In some examples, the network health manager may receive the trusted reference information per network endpoint. For example, the network health manager may receive first trusted reference information for a first smart thermometer, may receive second trusted reference information for a second smart thermometer, may receive third trusted reference information for a smart meter, etc.

In some examples, the network health manager may receive the trusted reference information for a set of network endpoints (e.g., network endpoints of a same type). For example, the network health manager may receive first trusted reference information for the first and second smart thermometer, may receive second trusted reference information for the smart meter, etc.

In some examples, the network health manager may subscribe to receive up-to-date trusted reference information for a network endpoint from a trusted third party. For example, the manufacturer of the network endpoint may provide a service that notifies the network health manager when a software update is available for the network endpoint.

In some examples, the network health manager may perform verifications of the network endpoint. For example, the network health manager may query the network endpoint for an attestation and determine whether a trust event occurred based on the attestation of the network endpoint and the trusted reference information. In some examples, the network health manager may perform the verifications of the network endpoint in accordance with a policy. For example, the network health manager may query the network endpoint for an attestation periodically, on-demand, or in response to an occurrence of a triggering event. The network health manager may then determine a trust state of the network endpoint based on the attestation and the trusted reference information associated with the network endpoint. In some examples, the network health manager may report the result of the verification and/or report the trust state of the network endpoint to a trusted third party. For example, the network health manager may report the result of the verification and/or report the trust state of the network endpoint in accordance with a service contract with a trusted third party.

In some examples, the network health manager may obtain or receive a policy to enforce against a network endpoint from a trusted third party. For example, the network health manager may receive the policy in association with performing the initial verification, in association with performing a subsequent verification, in association with performing an identifier enrollment, and/or in response to an occurrence of a triggering event.

In some examples, the network endpoint may provide the network health manager a policy to enforce against the network endpoint. In some examples, the network endpoint may provide an attestation verifier to the network health manager for accessing a policy. The network endpoint may provide the attestation verifier to the network health manager in association with performing the initial verification, in association with performing an identifier enrollment, and/or in accordance with a policy. For example, the attestation verifier may comprise a policy location (e.g., uniform resource locator (URL)) that the network health manager may use to access (or retrieve) a policy for enforcing against the network endpoint. In some examples, the policy may comprise a Manufacturer Usage Description (MUD) file. The MUD file may describe the network endpoint and associated device usage information. For example, the MUD file may define what network usage or behavior by the network endpoint is acceptable or permitted.

In some examples, after the network health manager obtains a policy, the network health manager begins enforcing the policy against the network endpoint. For example, the network health manager may enforce network access or authorization based on the policy. The policy may include network access levels or configurations, service access or authorization levels or configurations, QoS levels or configurations, resource access levels or configurations, and/or trust levels or configurations. In some examples, enforcing a policy may include limiting access to the network endpoint, limiting remote access for the network endpoint, limiting information about the network endpoint that is provided to a third party, and/or providing software updates for the network endpoint.

In some examples, the policy may include one or more remedies for the network health manager to apply when a trust event is detected. In some examples, a trust event may occur when a network endpoint fails a verification. For example, the network health manager may determine that the attestation provided by the network endpoint may not match the trusted reference information associated with the network endpoint. In some examples, a trust event may occur when a network endpoint is determined to be operating outside the scope defined by the MUD file. For example, a smart bulb may be controlled though a network and may be configured to connect to a rendezvous service that may be accessed via an application executing on a smart phone. If the network health manager detects that the smart bulb is attempting to access another network element (e.g., a refrigerator, a printer, etc.), the network health manager may determine the occurrence of a trust event. In another example, the MUD file for a smart meter may indicate that the smart meter is configured to transmit data once a day to a cloud service. If the network health meter detects that the smart meter is attempting to transmit data more frequently, or transmitting more data than is allowable, the network health manager may determine the occurrence of a trust event.

In some examples, when the network health manager determines the occurrence of a trust event, the network health manager may attempt one or more remedies to resolve the trust event. For example, the network health manager may disable user access via the network endpoint, may force a software update for the network endpoint, may cause the network endpoint to perform a reboot, may cause a reset (e.g., a factory reset) of the network endpoint, and/or may disconnect network access for the network endpoint. In some examples, the network health manager may provide a trust event report to a third party device manager based on a determination that the network health manager is unable to resolve the trust event.

Figure 8:
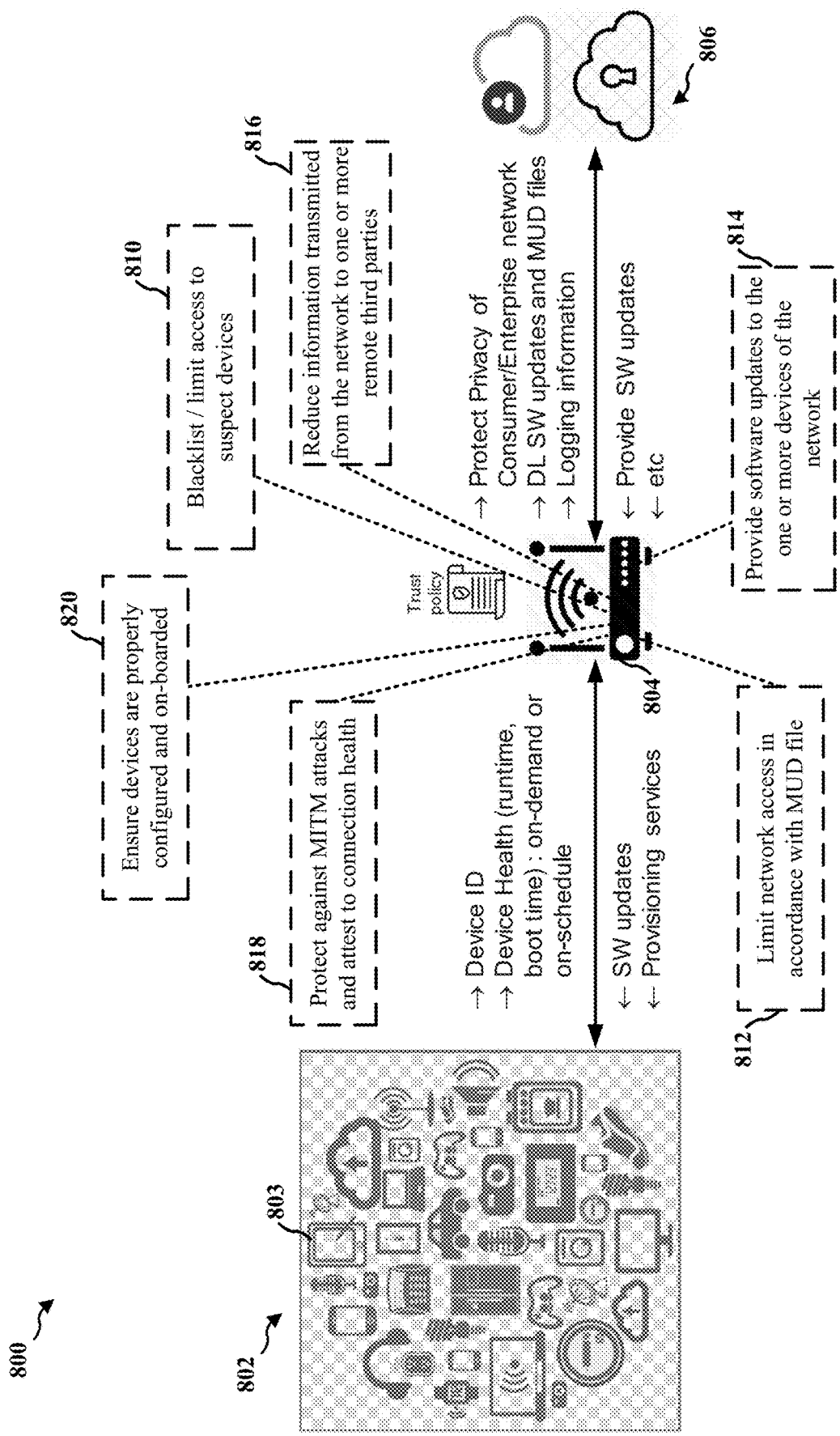
FIG. 8 illustrates an example exchange of information between a network, a network health manager, and a remote third party, in accordance with the teachings disclosed herein.

FIG. 8 illustrates an example exchange of information 800 between a network 802, a network health manager 804, and a remote third party 806, as presented herein. In the illustrated example, the exchange of information 800 facilitates a self-managed trust system comprising one or more devices of the network 802, the network health manager 804, and the remote third party 806. Aspects of the network 802 may be implemented by an IoT network, an enterprise network and/or a consumer network comprising one or more network endpoints (e.g., the user device 103 of FIG. 1, the user device 202 of FIG. 2, the device 404 of FIG. 4, the device 502 of FIG. 5, and/or the device 604 of FIG. 6), one or more UEs (e.g., the UE 104 of FIG. 1 and/or the UE 350 of FIG. 3), and/or one or more attesters (e.g., the attester 702 of FIGS. 7A, 7B, and/or 7C). Aspects of the network health manager 804 may be implemented by a secured gateway, a secured router, etc. Aspects of the remote third party 806 may be implemented by a trusted third party associated with a network endpoint (e.g., a device 803) of the network 802, such as the manufacturer of the device 803, a cloud-based device management service (e.g., an IoT framework), an entity (e.g., a web server) hosting policies for enforcing against the device 803, an entity (e.g., a web server) hosting trusted reference information for the device 803, an entity configured to perform verifications associated with the device 803, etc. It may be appreciated that the remote third party 806 may be one of one or more remote third parties.

In the illustrated example of FIG. 8, the network health manager 804 manages the health of the connected devices (e.g., the one or more network endpoints of the network 802). In some examples, the network health manager 804 may blacklist or otherwise limit access to suspect devices within the network 802 based on a trust policy (e.g., at 810). In some examples, the network health manager 804 may serve as a firewall for the one or more devices of the network 802. For example, the network health manager 804 may limit network access of the device 803 in accordance with a MUD file (e.g., at 812). The network health manager 804 may also provide software updates to the one or more devices of the network 802 when the respective device software is out-of-date (e.g., at 814). Thus, the network health manager 804 disclosed herein may increase the privacy of the network 802, for example, by reducing the information relayed from the one or more devices of the network 802 to the remote third party 806 (e.g., at 816).

Moreover, the self-managed trust system of FIG. 8 may facilitate protecting against man-in-the-middle (MITM) attacks and attesting to connection health (e.g., at 818) of the network 802. For example, the network health manager 804 may ensure that the one or more devices of the network 802 are properly configured and on-boarded (e.g., at 820). For example, when the device 803 initiates a connection request, the network health manager 804 may facilitate performing an initial device verification (e.g., a remote attestation, as described above in connection with FIGS. 7A, 7B, and/or 7C) to determine a trustworthiness of the device 803. The network health manager 804 may also perform subsequent queries of the state of the device 803 to assess the trust state of the device 803. When the network health manager 804 detects the occurrence of a trust event, the network health manager 804 may perform one or more trust event remedies to attempt to resolve the trust event associated with the device 803.

As shown in FIG. 8, the one or more devices of the network 802 may provide device IDs and/or device health information to the network health manager 804. In some examples, the device ID may comprise a permanent credential of a device (e.g., the device 803). The device health information may comprise state information, such as firmware information, software information, location information, a timestamp (e.g., time and/or date information), etc., associated with the device 803. In some examples, the device 803 may collect (or measure) the device health information during runtime and/or at boot-time. In some examples, the device 803 may provide the device health information on-demand (e.g., when queried by the network health manager 804) and/or on-schedule (e.g., in accordance with a policy).

The network health manager 804 may protect the privacy of network 802 by, for example, limiting the information that is transmitted from the network 802 to the remote third party 806. For example, by being able to perform verifications, the network health manager 804 limits logging information associated with the one or more devices of the network 802 that may have been transmitted to the remote third party 806 as part of the device health information (e.g., during a remote attestation performance). Additionally, the network health manager 804 provides a centralized manner for performing software updates and requests for policies (e.g., MUD files). For example, instead of each of the devices of the network 802 coordinating with their respective remote third parties for receiving software updates, the network health manager 804 may subscribe to a service that notifies the network health manager 804 when a software update is available for respective devices of the network 802.

The network health manager 804 may receive responses and/or information from the remote third party 806. For example, the network health manager 804 may receive software updates, device verification information, etc. for respective devices of the network 802.

The network health manager 804 may provide provisioning services for respective devices of the network 802. For example, the network health manager 804 may facilitate credential provisioning for the device 803.

As described above, the network health manager 804 may also facilitate performing software updates for the respective devices of the network (e.g., when a software update is available and/or critical for the device). In some examples, the network health manager 804 may facilitate performing software updates with increased privacy.

Figure 9:
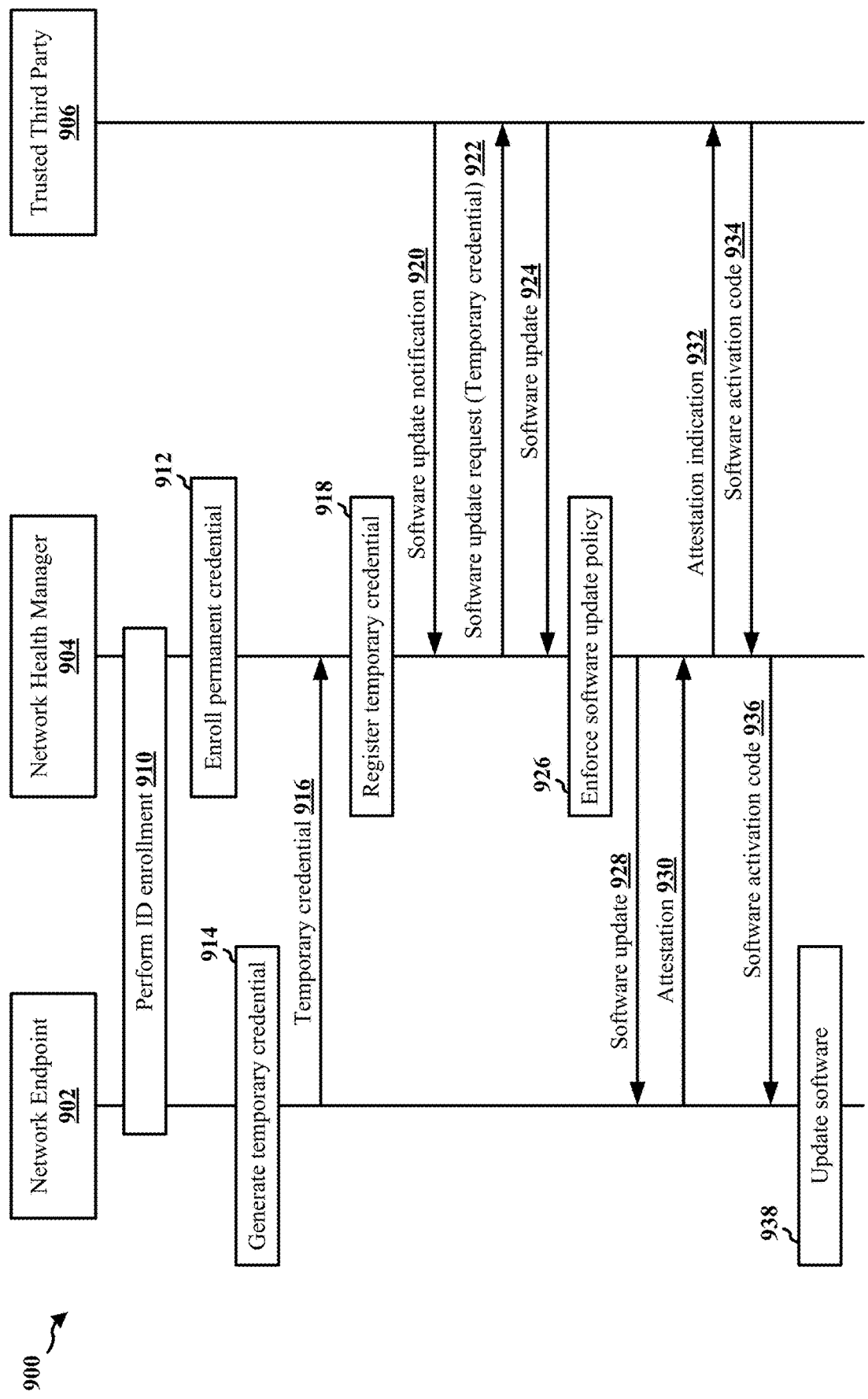
FIG. 9 illustrates an example communication flow between a device, a network health manager, and a trusted third party, in accordance with the teachings disclosed herein.

FIG. 9 illustrates an example communication flow 900 between a network endpoint 902, a network health manager 904, and a trusted third party 906, as presented herein. In the illustrated example, the communication flow 900 facilitates the network endpoint 902 performing a software update while maintaining privacy with the trusted third party 906. Aspects of the network endpoint 902 may be implemented by a network endpoint (e.g., the user device 103 of FIG. 1, the user device 202 of FIG. 2, the device 404 of FIG. 4, the device 502 of FIG. 5, and/or the device 604 of FIG. 6), a UE (e.g., the UE 104 of FIG. 1 and/or the UE 350 of FIG. 3), an attester (e.g., the attester 702 of FIGS. 7A, 7B, and/or 7C), and/or the device 803 of FIG. 8. Aspects of the network health manager 904 may be implemented by the network health manager 804 of FIG. 8. Aspects of the trusted third party 906 may be implemented by a trusted third party associated with the network endpoint 902 (e.g., the verifier 706 of FIGS. 7A, 7B, and/or 7C and/or the remote third party 806 of FIG. 8).

Although not shown in the illustrated example of FIG. 9, in other examples, the network health manager 904 may manage the health and trust of one or more devices connected to a network and, thus, the network endpoint 902 may be one example device of the network, such as the example device 803 of the network 802 of FIG. 8.

Additionally, although shown as a single entity in the illustrated example of FIG. 9, in other examples, the trusted third party 906 may comprise one or more trusted third parties. For example, the trusted third party 906 may include a manufacturer of the network endpoint 902, a cloud-based device management service (e.g., an IoT framework), an entity hosting policies for enforcing against the network endpoint 902, an entity hosting trusted reference information for the network endpoint 902, an entity configured to perform attestations associated with the network endpoint 902, etc.

In the illustrated example of FIG. 9, the network endpoint 902 and the network health manager 904 may perform, at 910, an identity enrollment. For example, the network endpoint 902 and the network health manager 904 may employ the example communication flow 400 of FIG. 4 to perform the identity enrollment. At 912, the network health manager 904 may enroll a permanent credential associated with the network endpoint 902.

At 914, the network endpoint 902 generates a temporary credential. The temporary credential may comprise a public-private key pair. The network endpoint 902 transmits a temporary credential 916 that is received by the network health manager 904. The temporary credential 916 may be based on at least one of the public-private key pair, the public key of the public-private key pair, or certificate. In some examples, the temporary credential 916 may further comprise a temporary ID associated with the temporary credential. The temporary ID may be a hash of the public key, certificate ID or an identifier associated with the temporary credential 916. The network endpoint 902 may also provide proof of ownership (or validity) of the temporary credential 916 to the network health manager 904. For example, the proof of ownership may be based on the permanent credential of the network endpoint 902 that is known to the network health manager 904 (e.g., the permanent credential enrolled at 912). If the network health manager 904 determines that the temporary credential is valid, the network health manager 904 registers the temporary credential 916, at 918, and associates the temporary credential 916 with the network endpoint 902.

In the illustrated example, the network health manager 904 receives a software update notification 920 from the trusted third party 906. The software update notification 920 may indicate that a software update is available for the network endpoint 902. The network health manager 904 may receive the software update notification 920 in response to a periodic attestation report and/or as a push notification based on a subscription. In some examples, the subscription may be based on a device type (e.g., a smart meter), while the device ID of the network endpoint 902 is held private. The network health manager 904 transmits a software update request 922 that is received by the trusted third party 906. The software update request 922 may include the temporary credential 916 of the network endpoint 902 so that the software update may be bound to the network endpoint 902. For example, the trusted third party 906 transmits software update 924 that is received by the network health manager 904. The trusted third party 906 may use the temporary credential 916 to encrypt the software update 924. The trusted third party 906 may also sign the software update 924 (e.g., via a manufacturer ID).

At 926, the network health manager 904 enforces a software update policy associated with the network endpoint 902. For example, the network health manager 904 may attempt to verify the integrity of the software update 924 by verifying the software update 924 includes a correct target device (e.g., the temporary credential of the network endpoint 902) and that the software update 924 is signed by the trusted third party 906 (e.g., via a manufacturer ID). If the network health manager 904 successfully verifies the software update (e.g., at 926), the network health manager 904 transmits software update 928 that is received by the network endpoint 902. If the network health manager 904 is unable to verify the software update (e.g., the software update 924 does not include the correct target device and/or the software update 924 is not signed by the trusted third party 906), the network health manager 904 blocks the software update from being provided to the network endpoint 902.

At 938, the network endpoint 902 updates the software. In some examples, performing the software update may include using a software activation code, for example, to prevent the misuse of software updates. For example, performing the software update may include providing the software activation code.

In some examples, the network endpoint 902 may transmit an attestation 930 that is received by the network health manager 904. The attestation 930 may comprise a device identifier of the network endpoint 902, a permanent credential of the network endpoint 902, and/or a device state of the network endpoint 902. In some examples, at least one of the device identifier and the permanent credential may be stored in a secure or trusted environment of the network endpoint 902 and that information stored in the secure or trusted environment may be unalterable.

The network health manager 904 may transmit an attestation indication 932 that is received by the trusted third party 906. In some examples, the attestation indication 932 may comprise an attestation result generated by the network health manager 904 and based on the attestation 930. The trusted third party 906 may transmit a software activation code 934 that is received by the network health manager 904. The trusted third party 906 may transmit the software activation code 934 in response to receiving the attestation indication 932. The network health manager 904 transmits (or forwards) software activation code 936 that is received by the network endpoint 902. At 938, the network endpoint 902 may use the software activation code 936 to facilitate the performing of the software update.

Figure 10:
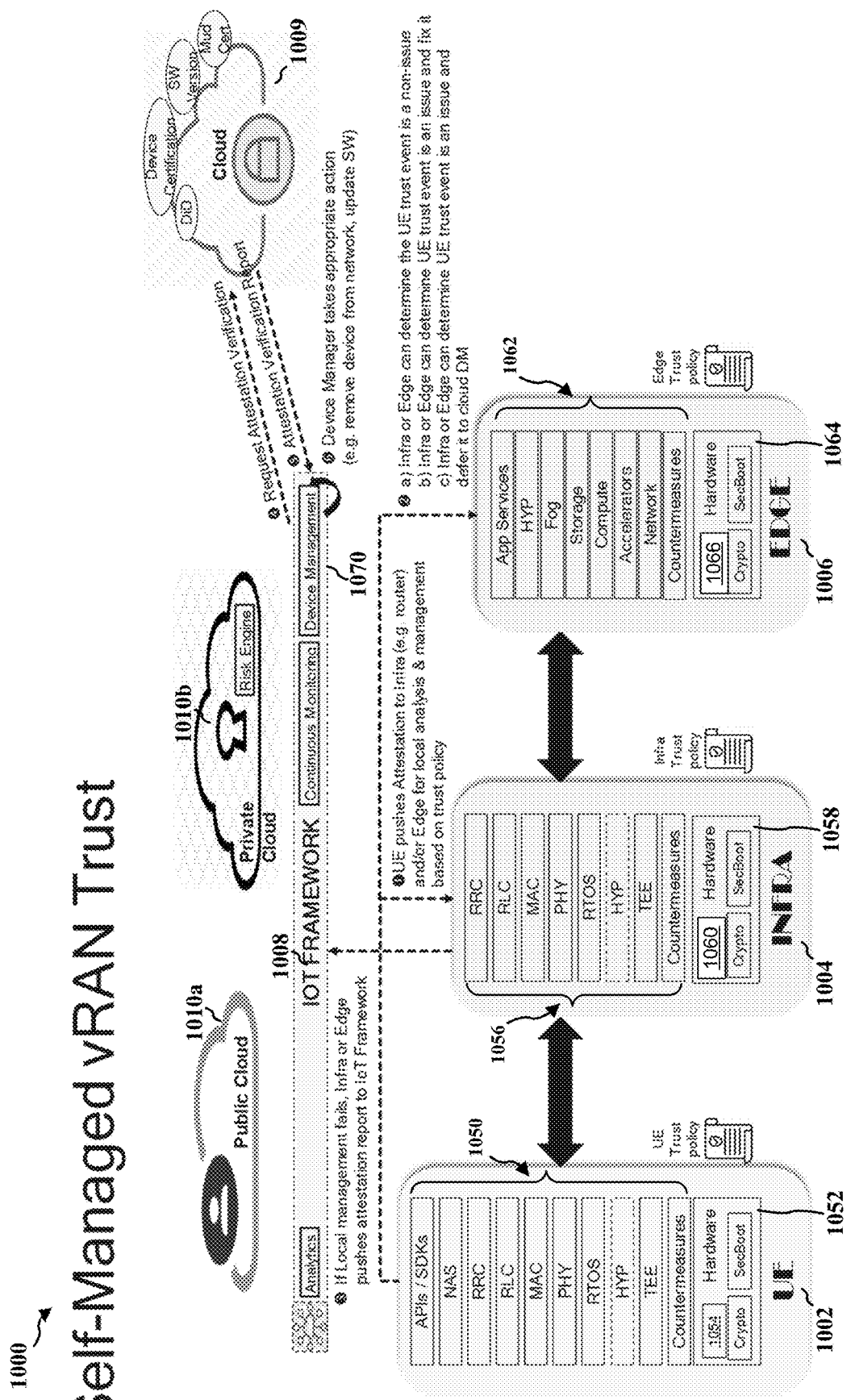
FIG. 10 illustrates an example exchange of information in a self-managed virtual radio access network (vRAN) trust environment comprising a UE, an infra node, an edge node, and an IoT framework, in accordance with the teachings disclosed herein.

FIG. 10 illustrates an example exchange of information in a self-managed virtual radio access network (vRAN) trust environment 1000 comprising a UE 1002, an infra node 1004, an edge node 1006, and an IoT framework 1008, as presented herein. In the illustrated example of FIG. 10, the UE 1002, the infra node 1004, the edge node 1006, and the IoT framework 1008 communicate via a network 1010.

Aspects of the UE 1002 may be implemented by a network endpoint (e.g., the user device 103 of FIG. 1, the user device 202 of FIG. 2, the device 404 of FIG. 4, the device 502 of FIG. 5, the device 604 of FIG. 6, and/or the network endpoint 902 of FIG. 9), a UE (e.g., the UE 104 of FIG. 1 and/or the UE 350 of FIG. 3), an attester (e.g., the attester 702 of FIGS. 7A, 7B, and/or 7C), and/or the device 803 of FIG. 8. Aspects of the infra node 1004 may be implemented by a router or a base station, such as the example base station 102/180 of FIG. 1 and/or the base station 310 of FIG. 3. Aspects of the network 1010 may be implemented by a public cloud 1010a, such as a mobile network or a telecommunication network, or may be implemented by a private cloud 1010b, such as an enterprise network.

In the illustrated example of FIG. 10, the IoT framework 1008 may comprise a cloud-based device management service to manage one or more network endpoint (e.g., one or more IoT devices), such as the UE 1002. For example, the IoT framework 1008 may perform analytics of the one or more network endpoint, perform continuous monitoring of the one or more network endpoint, and/or may perform device management of the one or more network endpoint. In some examples, the IoT framework 1008 may communicate with one or more cloud systems 1009 that provide one or more trusted third party services. For example, the one or more cloud systems 1009 may provide services related to a manufacturer of a network endpoint, an entity hosting policies for enforcing against a network endpoint, an entity hosting trusted reference information for a network endpoint, an entity configured to perform device attestations associated with a network endpoint, etc.

In some examples, the IoT framework 1008 may offload one or more services to the edge node 1006 so that the edge node 1006 may act locally on data. By offloading one or more services to the edge node 1006, execution of the service may be completed relatively faster than when performed via the IoT framework 1008, thereby reducing latency that the UE 1002 may experience when accessing the service.

In the illustrated example of FIG. 10, the UE 1002 includes a protocol and/or software stack 1050 and a hardware component 1052. The example protocol and/or software stack 1050 includes application programming interfaces (APIs), software development kits (SDKs), a NAS layer, an RRC layer, an RLC layer, a MAC layer, a PHY layer, a real-time operating system (RTOS), a hypervisor (HYP) layer, a trusted execution environment (TEE), and a countermeasures layer. However, other example protocol and/or software stacks may include additional or alternative components.

The example hardware component 1052 comprises a secure boot (SecBoot) component, a crypto component, and a secure element 1054. The secure element 1054 (sometimes referred to as a "trust management engine") may be hardened to provide hardware assurance. For example, modifying content stored in the secure element 1054 may require physical access to the secure element 1054. Thus, storing information in the secure element 1054 increases assurance that the stored information is not modified and provides a "Root of Trust." In some examples, at least one of a device identifier of the UE 1002, a permanent credential of the UE 1002, and/or device state information of the UE 1002 may be stored in the secure element 1054. In some examples, during attestation, the secure element 1054 may perform the measurement and reporting of the device state.

In the illustrated example of FIG. 10, the infra node 1004 includes a protocol and/or software stack 1056 and a hardware component 1058. The example protocol and/or software stack 1056 includes an RRC layer, an RLC layer, a MAC layer, a PHY layer, an RTOS, a HYP layer, a TEE, and a countermeasures layer. However, other example protocol and/or software stacks may include additional or alternative components.

The example hardware component 1058 comprises a SecBoot component, a crypto component, and a secure element 1060. Aspects of the secure element 1060 may be similar to the secure element 1054 of the UE 1002. In some examples, the secure element 1060 may additionally or alternatively store enrolled and/or registered identifiers associated with other network endpoint (e.g., the UE 1002). For example, the UE 1002 may enroll a device identifier with the infra node 1004 (e.g., using the example communication flow 400 of FIG. 4). In some such examples, the infra node 1004 may store the enrolled device identifier of the UE 1002 in the secure element 1060.

In the illustrated example of FIG. 10, the edge node 1006 includes a protocol and/or software stack 1062 and a hardware component 1064. The example protocol and/or software stack 1062 includes an application services layer, a HYP layer, a Fog layer (e.g., an open standard for edge computing), a storage layer, a compute layer, an accelerators layer, a network layer, and a countermeasures layer. However, other example protocol and/or software stacks may include additional or alternative components.

The example hardware component 1064 comprises a SecBoot component, a crypto component, and a secure element 1066. Aspects of the secure element 1066 may be similar to the secure element 1054 of the UE 1002 and/or the secure element 1060 of the infra node 1004.

In the illustrated example of FIG. 10, when a device, such as the UE 1002, performs attestation, the secure element 1054 of the UE 1002 may measure and report the device state of the UE 1002. For example, the secure element 1054 may measure and/or obtain information relating one or more of device software, firmware, operating systems, application programs, a user authentication result, a current location, a hardware state, or any combination thereof, associated with the UE 1002. In some examples, the attestation may include a user attestation. The user attestation may further comprise one or more of a biometric liveness score, a trusted location, information about a user finger used to authenticate, other metadata associated with preventing spoofing of the user authentication, or any combination of such user attestation information.

As described above, to facilitate a self-managed trust network, the network may designate a surrogate device (or surrogate devices, as described below in connection with FIG. 11) to facilitate performing attestations within the network. In some such examples, the surrogate device (e.g., a network health manager) may obtain trusted reference information to facilitate performing health and trust state checks of the one or more connected network endpoints.

In the illustrated example of FIG. 10, the infra node 1004 may perform aspects of a network health manager, such as the network health manager 804 of FIG. 8 and/or the network health manager 904 of FIG. 9. For example, the infra node 1004 may facilitate performing an initial device verification of the UE 1002 and then retrieve trusted reference information associated with the UE 1002 from a trusted third party (e.g., via the IoT framework 1008). The infra node 1004 may store the trusted reference information in a secure element of the infra node 1004, such as the example secure element 1060.

In the illustrated example of FIG. 10, the UE 1002 provides an attestation to the network. For example, the UE 1002 may transmit an attestation to the infra node 1004 and/or the edge node 1006. In some examples, the attestation may include device state information measured and reported by the secure element 1054 of the UE 1002. The UE 1002 may provide the attestation in accordance with a policy, based on a request (e.g., from the infra node 1004 and/or the edge node 1006), and/or in response to a triggering event. The UE 1002 may transmit the attestation to the infra node 1004 and/or the edge node 1006 for local analysis and management based on a trust policy.

The local management node (e.g., the infra node 1004 and/or the edge node 1006) may determine whether a trust event occurred based on the attestation and the trusted reference information associated with the UE 1002. In a first example, the local management node may determine that no trust event occurred. In a second example, the local management node may determine that a trust event occurred and that the trust event is a non-issue. In a third example, the local management node may determine that a trust event occurred, that the trust event is an issue, and determine to fix the issue. For example, the local management node may apply one or more trust event remedies, in accordance with a policy, to fix the issue. In a fourth example, the local management node may determine that a trust event occurred, that the trust event is an issue, and determine to defer fixing the issue to the IoT framework 1008. For example, the local management node may determine that applying one or more of the trust event remedies is unsuccessful in resolving the trust event, that the local management node is incapable of performing a trust event remedy (e.g., the trust event remedy is outside the policy associated with the UE 1002 and/or the policy associated with the local management node), and/or that no trust event remedy is provided (e.g., by a policy) for remedying the trust event.

In some examples in which the local management node determines to defer fixing the issue to the IoT framework 1008, the local management node may transmit a trust event report (sometimes referred to as an "attestation report") to the IoT framework 1008.

As shown in FIG. 10, a device management entity 1070 of the IoT framework 1008 may request attestation verification from the one or more cloud systems 1009. For example, the device management entity 1070 may use the attestation report provided by the local management node to request the attestation verification for the UE 1002. In response to the attestation verification request, the one or more cloud systems 1009 may provide an attestation verification report. The device management entity 1070 may then take one or more actions to remedy the trust event associated with the UE 1002. For example, the device management entity 1070 may remove the UE 1002 from the network 1010, may force the UE 1002 to perform a software update, etc.

Figure 11:
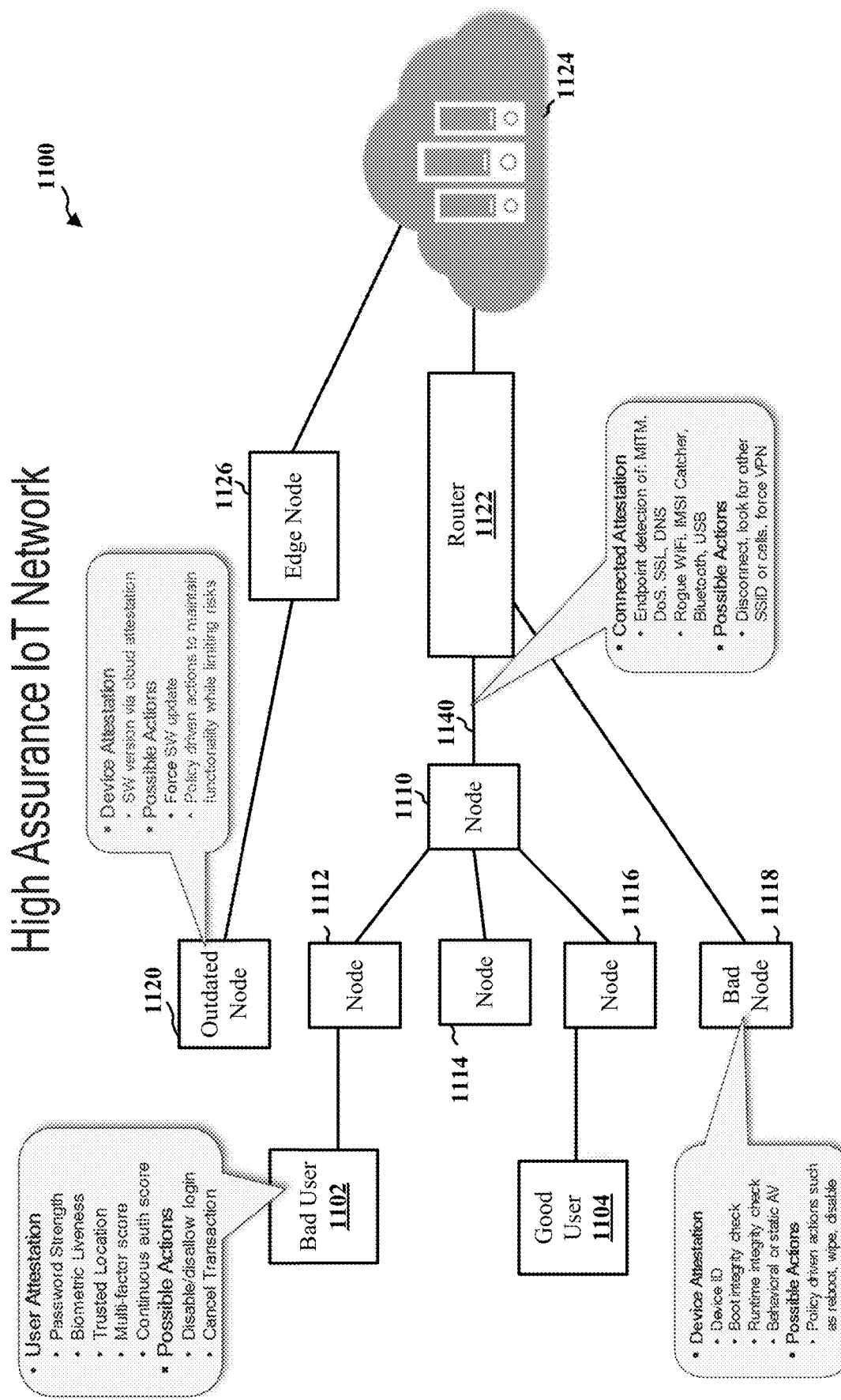
FIG. 11 depicts an example self-managed high assurance IoT network comprising users, devices, a network health manager, a trusted third party, and an edge node, in accordance with the teachings disclosed herein.

FIG. 11 depicts an example network 1100, such as a self-managed high assurance IoT network, comprising users 1102, 1104, network endpoints (e.g., nodes 1110, 1112, 1114, 1116, 1118, 1120), a router 1122, a trusted third party 1124, and an edge node 1126, as presented herein. The example network 1100 provides examples of nodes performing user attestation, device attestation, and/or connected attestation. In the illustrated example of FIG. 11, the router 1122 and the edge node 1126 are each in communication with the trusted third party 1124, and are also in communication with one or more nodes 1110, 1112, 1114, 1116, 1118, 1120. In some such examples, aspects of a network health manager may be implemented by the router 1122 and/or the edge node 1126. For example, the router 1122 may operate as a local verifier for the one or more nodes 1110, 1112, 1114, 1116, 1118 connected to the router 1122, and the edge node 1126 may operate as a local verifier for a node 1120 connected to the edge node 1126. For example, when any of the nodes 1110, 1112, 1114, 1116, 1118 connects with the router 1122, the router 1122 may perform an initial device verification with the respective nodes 1110, 1112, 1114, 1116, 1118, and then obtain trusted reference information associated with the respective nodes 1110, 1112, 1114, 1116, 1118 from the trusted third party 1124. As described above in connection with FIG. 10, the router 1122 may store the trusted reference information in a secure element of the router, such as a secure element of the router 1122.

Similarly, when the node 1120 connects with the edge node 1126, the edge node 1126 may perform an initial device verification with the node 1120 and then obtain trusted reference information associated with the node 1120 from the trusted third party 1124. The edge node 1126 may store the trusted reference information in a secure element of the edge node 1126, such as the secure element 1066 of the edge node 1006 of FIG. 10.

As shown in FIG. 11, the router 1122 is in communication with the trusted third party 1124 and a relay node 1110. Aspects of the relay node 1110 may be implemented by an access point or a relay device. The example relay node 1110 is in communication with a first downstream node 1112, a second downstream node 1114, and a third downstream node 1116. The first downstream node 1112 is accessible by a first user 1102 and the third downstream node 1116 is accessible by a second user 1104. To make sure the users 1102, 1104 are allowed to access their respective network endpoints (e.g., the nodes 1112, 1116, respectively), the network endpoints may perform user verification of their respective user. For example, performing user verification may be based on one or more of a password, a biometric, a trusted location, a multi-factor verification, or a continuous authentication. As shown in FIG. 11, the second user 1104 is a "good user," meaning that the second user 1104 successfully provided user authentication and attestation. In contrast, the first user 1102 is a "bad user," meaning that the first user 1102 did not successfully provide user authentication and attestation. As shown in FIG. 11, based on the first user 1102 being a "bad user," the first downstream node 1112 may disable and/or disallow the first user 1102 from login and/or accessing the network 1100. The first downstream node 1112 may additionally or alternatively cancel a transaction that the first user 1102 may have been attempting to perform.

In some examples, the first downstream node 1112 and/or the third downstream node 1116 may provide a result of the user verification to the router 1122 (e.g., via the relay node 1110). For example, the first downstream node 1112 may provide an attestation result to the router 1122 indicating that the first user 1102 failed their user verification (e.g., provided noncompliant authentication and/or noncompliant attestation to the first downstream node 1112). In contrast, the third downstream node 1116 may provide an attestation result to the router 1122 indicating that the second user 1104 passed their user verification (e.g., provided compliant authentication and attestation to the third downstream node 1116). In some examples, the first downstream node 1112 and/or the third downstream node 1116 may provide their attestation results in accordance with their respective policies. For example, the policy may instruct the downstream nodes 1112, 1116 to provide attestation result(s) in accordance with a schedule (e.g., daily, etc.), to provide attestation result(s) on-demand (e.g., when requested by the router 1122), and/or to provide attestation result(s) when a triggering event occurs (e.g., each time a downstream node performs user verification, each time a downstream node performs a successful user verification, each time a downstream node performs an unsuccessful user verification, etc.).

As shown in FIG. 11, the router 1122 is in communication with a bad node 1118. The bad node 1118 may be designated a "bad node" due to an unsuccessful device attestation. For example, performing the device attestation may be based on one or more of a device ID, a boot integrity check, a runtime integrity check, behavioral or static antivirus (AV), an indication that the bad node 1118 is rooted, etc. As shown in FIG. 11, based on the determination that the bad node 1118 is a "bad node," the router 1122 may perform policy-driven remedies, such as causing the bad node 1118 to reboot, causing the bad node 1118 to reset (e.g., perform a factory reset or "wipe" the node), and/or disconnecting the bad node 1118 from the network 1100. In some examples, after performing one or more remedies (successful or unsuccessful), the router 1122 may query the respective nodes 1110, 1112, 1114, 1116, 1118 to provide an attestation.

In some examples, the bad node 1118 may provide its attestation result in accordance with a policy. For example, the policy may instruct the bad node 1118 to provide attestation result(s) in accordance with a schedule (e.g., daily, etc.), to provide attestation result(s) on-demand (e.g., when requested by the router 1122), and/or to provide attestation result(s) when a triggering event occurs (e.g., each time the node performs attestation, each time the node performs a successful attestation, each time the node performs an unsuccessful attestation, etc.).

As shown in FIG. 11, the router 1122 is in communication with the relay node 1110 via a connection 1140. In the illustrated example, the router 1122 may perform a connected attestation on the connection 1140 to determine the trustworthiness of the connection 1140. For example, the router 1122 may use the connected attestation to determine whether the connection 1140 may be noncompliant due to an intrusion (e.g., a man-in-the-middle (MITM) attack, a denial of service (DOS), a Domain Name System (DNS) poisoning, a non-compliant secure socket layer (SSL) connection, etc.), detection of a rogue wireless connection, detection of an international mobile subscriber identity-catcher (IMSI-catcher), detection of a rogue universal serial bus (USB) device, etc. In response to a determination that the connection 1140 is noncompliant (e.g., the router 1122 performs an unsuccessful connected attestation), the router 1122 may disconnect the relay node 1110 from the network 1100, look for another cell or service set identifier (SSID) through which to connect, and/or force the relay node 1110 and the router 1122 to communicate via a virtual private network (VPN).

As described above, in some examples, different levels of access to a service may be provided to a user and/or a device based on a policy or a level of sensitivity of the service being accessed. For example, based on the occurrences of the trust events associated with the first user 1102, the bad node 1118, and/or the connection 1140, the router 1122 (and/or a downstream node 1112, 1114, 1116) may perform remedies such as disabling user access, rebooting a node, wiping a node, disabling a node, disconnecting a node, looking for another cell or SSID to connect with, and/or forcing a VPN connection.

However, in some examples, a trust event may occur, such as a detection of a node operating out-of-date software, and the remedy for such a trust event may include allowing the node to continue functioning while limiting risk. As shown in FIG. 11, the edge node 1126 may perform attestation with the node 1120 and determine that the node 1120 is executing out-of-date software (e.g., an "outdated" node). In some examples, the edge node 1126 may force the outdated node 1120 to perform a software update. In some examples, the edge node 1126 may enable the outdated node 1120 to maintain functionality while limiting risk to the outdated node 1120 and/or the network 1100. For example, a software update for the outdated node 1120 may indicate that the software update does not include critical updates. In some examples, the software update may indicate and/or the edge node 1126 may determine to disable certain functionality of the outdated node 1120 until the software update is applied to the outdated node 1120. For example, the outdated node 1120 may be a smart bulb, and the software update available for the smart bulb may indicate that the software update corrects an issue when a user attempts to enable a "party mode" setting for the smart bulb. In some such examples, the edge node 1126 may instruct the outdated node 1120 to disable the "party mode" setting while also allowing the outdated node 1120 to continue other functionality (e.g., being controlled remotely, etc.).

In some examples, the policy being enforced against the outdated node 1120 may enable the outdated node 1120 to operate using out-of-date software for a period before forcing a software update. For example, when a software update includes a critical update, enforcing the policy to the outdated node 1120 may force the outdated node 1120 to perform the software update. In other examples in which the software update does not include critical updates, enforcing the policy to the outdated node 1120 may allow the outdated node 1120 to continue functioning while operating the out-of-date software, for example, until a triggering event occurs. In some examples, the software update triggering event may occur based on a threshold period elapsing. For example, the software update triggering event may occur 24-hours after the edge node 1126 determines that a software update is available for the outdated node 1120. In some examples, the software update triggering event may occur based on a determination that the outdated node 1120 is connected to a power source, has a threshold battery charge, and/or during a down time of the outdated node 1120. For example, the edge node 1126 may cause the outdated node 1120 to perform the software update based on historical usage data associated with the outdated node 1120. For example, the outdated node 1120 may be a smart bulb and the historical usage data associated with the smart bulb may indicate that the smart bulb is not active (e.g., is off) during one or more periods of the day (e.g., during work hours on weekdays, during night time hours, etc.). The edge node 1126 may then cause the smart bulb to perform the software update during one of the identified periods.

Although not shown in the example of FIG. 11, in some examples, the router 1122 and/or the edge node 1126 may defer resolving an issue (e.g., an occurrence of a trust event). For example, the router 1122 and/or the edge node 1126 may provide a trust event report to the trusted third party 1124 to determine what techniques to employ to remedy the occurrence of the trust aspects. Aspects of deferring the resolving of the issue are described above in connection with FIG. 10 and the device management entity 1070.

Figure 12:
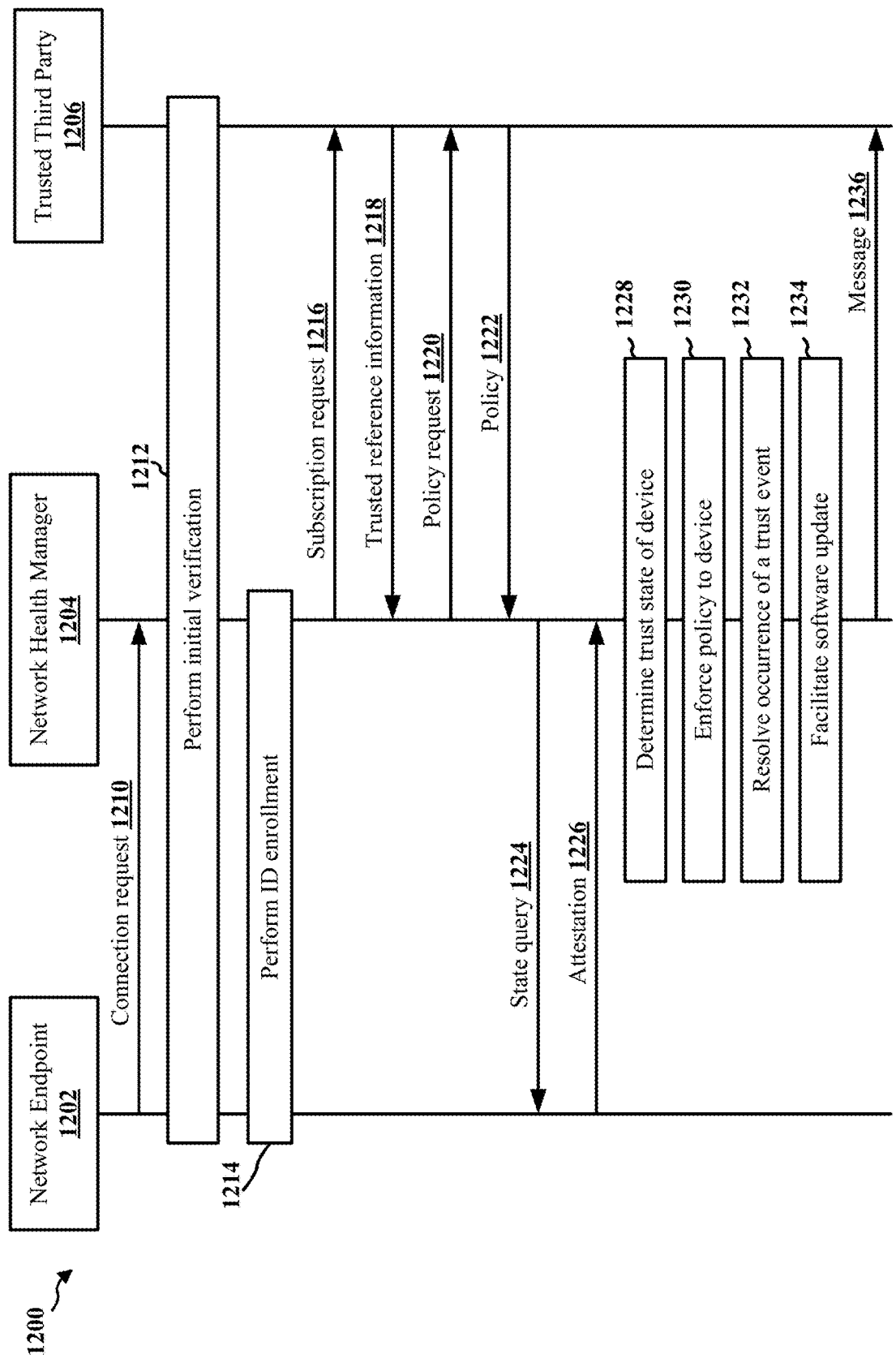
FIG. 12 illustrates an example communication flow between a device, a network health manager, and a trusted third party, in accordance with the teachings disclosed herein.

FIG. 12 illustrates an example communication flow 1200 between a network endpoint 1202, a network health manager 1204, and a trusted third party 1206, as presented herein. Aspects of the network endpoint 1202 may be implemented by a network endpoint (e.g., the user device 103 of FIG. 1, the user device 202 of FIG. 2, the device 404 of FIG. 4, the device 502 of FIG. 5, the device 604 of FIG. 6, the network endpoint 902, and/or the nodes 1102, 1103, 1105 of FIG. 11), a UE (e.g., the UE 104 of FIG. 1, the UE 350 of FIG. 3, and/or the UE 1002 of FIG. 10), an attester (e.g., the attester 702 of FIGS. 7A, 7B, and/or 7C), and/or the device 803 of FIG. 8. Aspects of the network health manager 1204 may be implemented by the network health manager 804 of FIG. 8, the network health manager 904 of FIG. 9, the infra node 1004 and/or the edge node 1006 of FIG. 10, and/or the router 1104 and/or the edge node 1108 of FIG. 11. Aspects of the trusted third party 1206 may be implemented by a trusted third party associated with the network endpoint 1202 (e.g., the verifier 706 of FIGS. 7A, 7B, and/or 7C, the remote third party 806 of FIG. 8, the trusted third party 906 of FIG. 9, the IoT framework 1008 of FIG. 10, and/or the trusted third party 1106 of FIG. 11). Although not shown in the illustrated example of FIG. 12, the network health manager 1204 may manage the health and trust of one or more devices connected to a network and, thus, the network endpoint 1202 may be one example device of the network, such as the example device 803 of the network 802 of FIG. 8.

Additionally, although shown as a single entity in the illustrated example of FIG. 12, the trusted third party 1206 may comprise one or more trusted third parties. For example, the trusted third party 1206 may include a manufacturer of the network endpoint 1202, an entity hosting policies for enforcing against the network endpoint 1202, an entity hosting trusted reference information for the network endpoint 1202, an entity configured to perform attestations associated with the network endpoint 1202, etc.

In the illustrated example of FIG. 12, the network endpoint 1202 may transmit a connection request 1210 that is received by the network health manager 1204. The connection request 1210 may be an initial request by the network endpoint 1202 to connect to the network being managed by the network health manager 1204.

At 1212, the network endpoint 1202, the network health manager 1204, and the trusted third party 1206 may perform an initial verification. Aspects of the initial verification may be similar to the remote attestation procedures described above in connection with FIGS. 7A, 7B, and/or 7C.

At 1214, the network endpoint 1202 and the network health manager 1204 may perform an identity enrollment. Aspects of performing the identity enrollment (at 1214) may be similar to performing the identity enrollment at 910 of FIG. 9, and/or the example communication flow 400 of FIG. 4. In some examples, the network health manager 1204 may enroll a device key associated with the network endpoint 1202 after completing the performing of the identity enrollment. For example, the network health manager 1204 may store a device ID, a permanent credential, etc. associated with the network endpoint 1202 in a secure element of the network health manager 1204.

In the illustrated example, the network health manager 1204 may transmit a subscription request 1216 that is received by the trusted third party 1206. The subscription request 1216 may include a request by the network health manager 1204 to subscribe to a service to receive up-to-date trusted reference information for the network endpoint 1202 and/or to receive notifications when a software update for the network endpoint 1202 is available.

In the illustrated example, the trusted third party 1206 transmits trusted reference information 1218 that is received by the network health manager 1204. In some examples, the trusted third party 1206 may transmit the trusted reference information 1218 in response to the subscription request 1216. The trusted reference information 1218 may enable the network health manager 1204 to perform local management of the network endpoint 1202. For example, the network health manager 1204 may use the trusted reference information 1218 to determine the trust state of the network endpoint 1202 and/or to enforce a policy against the network endpoint 1202 without transmitting information about the network endpoint 1202 (e.g., device health information and/or device state information) to the trusted third party 1206. In some examples, the network health manager 1204 may store the trusted reference information 1218 in a secure element of the network health manager 1204. In some examples, the trusted reference information 1218 may be received per network endpoint. In some examples, the trusted reference information 1218 may be received for a set of network endpoints of a same kind.

In some examples, the network health manager 1204 may transmit a policy request 1220 that is received by the trusted third party 1206. In some examples, the network health manager 1204 may use an attestation verifier associated with the network endpoint 1202 to transmit the policy request 1220. For example, the network endpoint 1202 may provide an attestation verifier to the network health manager 1204 in association with performing the initial verification (e.g., at 1212), in association with performing an identifier enrollment (e.g., at 1214), and/or in accordance with a policy. In some examples, the attestation verifier may comprise a URL that the network health manager 1204 may use to access a policy for enforcing against the network endpoint 1202.

The trusted third party 1206 transmits a policy 1222 that is received by network health manager 1204. For example, the trusted third party 1206 may transmit the policy 1222 in response to the policy request 1220. In some examples, the policy 1222 may comprise a MUD file. The MUD file may describe the network endpoint 1202 and associated device usage information. For example, the MUD file may define what network usage or behavior by the network endpoint 1202 is acceptable or permitted. In some examples, the policy 1222 may include network access levels or configurations, service access or authorization levels or configurations, QoS levels or configurations, resource access levels or configurations, trust levels or configurations, and/or trust event remedies. In some examples, the policy 1222 may be an updateable policy.

The network health manager 1204 performs verifications of the network endpoint 1202 based at least in part on the trusted reference information 1218 received from the trusted third party 1206. In some examples, the network health manager 1204 may perform the verifications of the network endpoint 1202 periodically. In some examples, the network health manager 1204 may perform the verifications of the network endpoint 1202 on-demand. In some examples, the network health manager 1204 may perform the verifications of the network endpoint 1202 in response to an occurrence of a triggering event (e.g., new software is installed, a USB device is connected, etc.).

In the illustrated example, the network health manager 1204 initiates performing a verification of the network endpoint 1202 by transmitting a state query 1224 that is received by the network endpoint 1202.

In response to receiving the state query 1224, the network endpoint 1202 transmits an attestation 1226 that is received by the network health manager 1204. In some examples, the attestation 1226 may be based on one or more of a device identifier of the network endpoint 1202, a permanent credential of the network endpoint 1202, and/or device state information of the network endpoint 1202. In some examples, a secure element of the network endpoint 1202, such as the secure element 1054 of the UE 1002, may measure and report the attestation 1226. In some examples, at least one of the device identifier and the permanent credential may be stored in the secure element of the network endpoint 1202.

At 1228, the network health manager 1204 determines a trust state of the network endpoint 1202. For example, the network health manager 1204 may compare the attestation 1226 received from the network endpoint 1202 to the trusted reference information 1218 to determine a trust state of the network endpoint 1202. In some examples, the network health manager 1204 may provide a notification of the trust event (e.g., a trust event report) to a network system or an edge component for analysis of the trust event, as described above in connection with FIG. 10.

In some examples, the network health manager 1204 may report a verification result of performing the verification to the trusted third party 1206. For example, the network health manager 1204 may transmit a message 1236 that is received by the trusted third party 1206. The message 1236 may include the verification result. In some examples, the message 1236 may include an attestation report.

At 1230, the network health manager 1204 enforces the policy to the network endpoint 1202. In some examples, the network health manager 1204 may enforce the policy based on the trust state of the network endpoint 1202. In some examples, the network health manager 1204 may enforce the policy to the network endpoint 1202 by limiting access to network endpoint 1202 based on a trust policy. In some examples, the network health manager 1204 may enforce the policy to the network endpoint 1202 by limiting remote or network access for the network endpoint 1202, by limiting information about the network endpoint 1202 that is provided to a third party, etc.

In some examples, enforcing the policy to the network endpoint 1202 may include the network health manager 1204 resolving an occurrence of a trust event, at 1232. For example, the network health manager 1204 may apply one or more trust event remedies to fix the trust event. In some examples, resolving the occurrence of the trust event may include disabling user access via the network endpoint 1202, may include forcing a software update for the network endpoint 1202, may include causing the network endpoint 1202 to reboot, may include causing a reset of the network endpoint 1202, and/or may include disconnecting network access for the network endpoint 1202. In some examples, resolving the occurrence of the trust event may include determining that the trust event is a non-issue. In some examples, resolving the occurrence of the trust event may include deferring the fixing of the trust event to a cloud-based device manager (e.g., as described above in connection with FIG. 10).

In some examples, enforcing the policy to the network endpoint 1202 may include facilitating a software update, at 1234. Aspects of facilitating the software update (e.g., at 1234) may be similar to the example communication flow 900 of FIG. 9.

In some examples, when the network health manager 1204 initiates performing a verification (e.g., by transmitting the state query 1224), the network endpoint 1202 may also perform a user verification of a user accessing the network endpoint 1202. In some such examples, the attestation 1226 transmitted by the network endpoint 1202 to the network health manager 1204 may include a user verification result based on the user verification performed by the network endpoint 1202. As described above in connection with FIG. 11, the network health manager 1204 may control user access to a service based on the user verification. For example, the network health manager 1204 may disable or disallow login and/or may cancel a transaction based on the occurrence of a trust event associated with the user verification.

Referring again to the illustrated example of FIGS. 7A, 7B, and 7C, verification of the attester 702 is performed by one entity (e.g., the verifier 706). However, in some examples, access to services may be based on verification of various information about the service accessing entity (e.g., the attester or a device). In some such examples, performing a single authentication and/or attestation may be insufficient in determining the trustworthiness of the device (e.g., a user device, a UE, a network endpoint, etc.).

Example techniques disclosed herein utilize a surrogate device to manage access to services provided by the service managing entity. For example, disclosed techniques may configure a device to operate as an agent for the service managing entity and to manage access to the services based on a plurality of attestable parameters. In some examples, the agent may facilitate verifying attestable information corresponding to the attestable parameters. The example agent may then evaluate a trust score for the device based on respective verification results and enforce a policy to the device based on the trust score.

Figure 13:
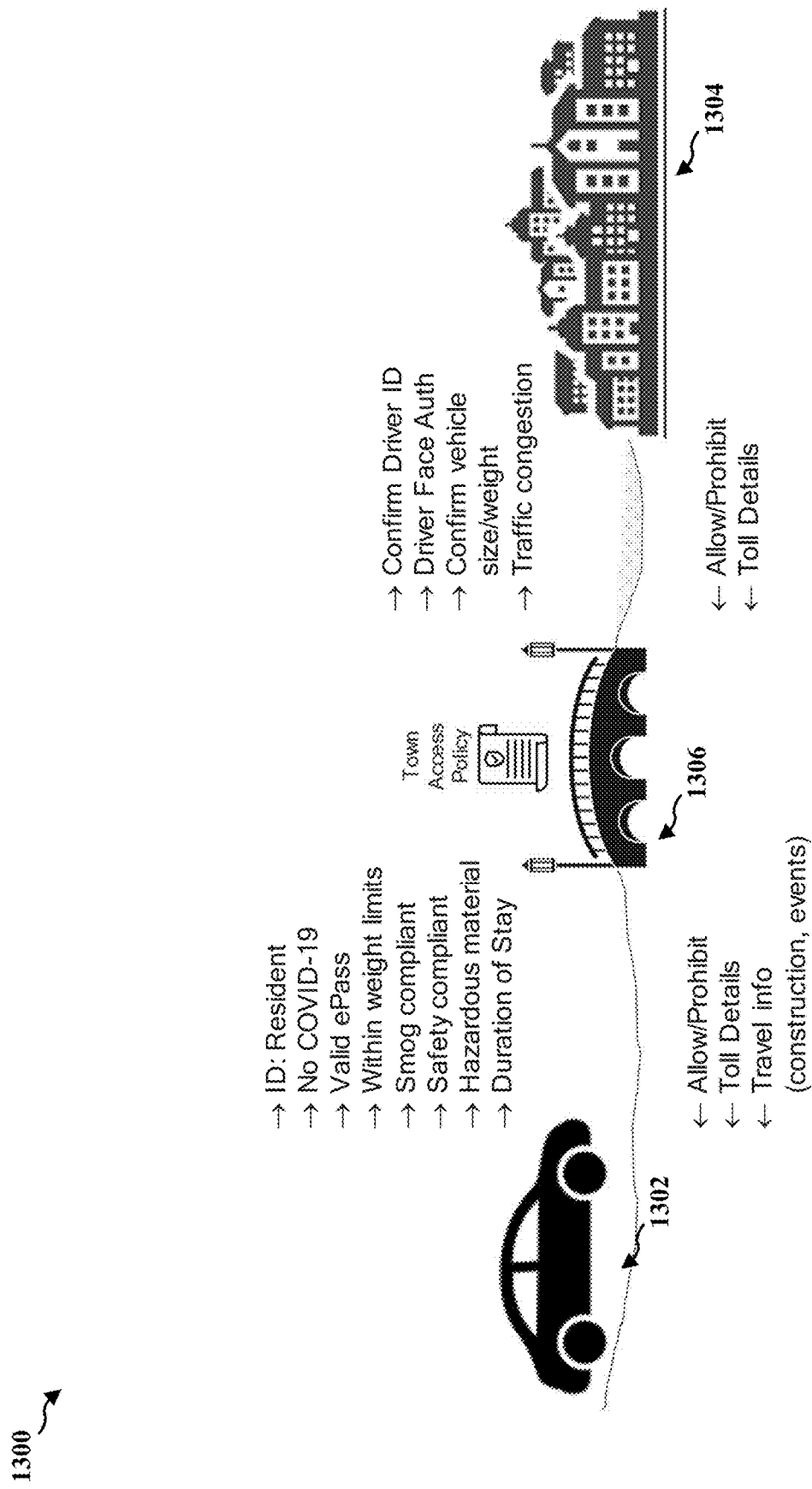
FIG. 13 illustrates an example exchange of information between a device, a service managing entity, and an agent of the service managing entity, in accordance with the teachings disclosed herein.

For example, FIG. 13 depicts an example exchange of information 1300 between a device 1302, a service managing entity 1304, and an agent 1306 of the service managing entity 1304, as presented herein. Although the following description may be focused on a car/bridge/town example environment, the concepts described herein may be applicable to other similar environments in which utilizing a surrogate device (e.g., the agent) to manage access rights based on policies of the service managing entity may be beneficial. For example, the agent may be implemented by a security gate at a work or business. In another example, the agent may be implemented by a peripheral hub (e.g., a universal serial bus (USB) hub, etc.).

In the illustrated example of FIG. 13, the device 1302 (e.g., the attester) is implemented by a vehicle, the service managing entity 1304 (e.g., the relying party) is implemented by a town, and the agent 1306 is implemented by a bridge. As shown, the service managing entity 1304 relies on the agent 1306 to verify the device 1302. In particular, the bridge may act as an agent for the town to control traffic based on a number of attestable parameters. In some examples, the device 1302 may be capable of attesting the user of the device 1302 and/or the device 1302. The attestation performed by the device 1302 may provide at least some of the attestation information requested by the agent 1306.

In some examples, the device 1302 may provide attestation information corresponding to one or more attestable parameters to the agent 1306, which may then verify the attestation information. For example, the agent 1306 may be capable of using reference information (e.g., a database of license plate numbers for devices registered with the service managing entity 1304) to verify whether the device 1302 is registered with the service managing entity 1304 and/or the user of the device 1302 is a resident of the service managing entity 1304.

In some examples, the agent 1306 may be capable of making a measurement and verifying attestation information based on the measurement. For example, the agent 1306 may be capable of measuring the weight of the device 1302 and determining whether the weight of the device 1302 is within a general weight limit (e.g., the town may have a maximum weight for vehicles) and/or whether the weight of the device 1302 is within a weight limit based on the type of device.

In some examples, the agent 1306 may communicate with one or more third party verification entities (e.g., an identity issuer, an IDM system, a device manufacturer, and/or a certification service) to verify the attestation information. For example, the agent 1306 may communicate with the IDM system 199 of FIG. 1 and/or a Department of Motor Vehicles (DMV) to confirm the vehicle's last smog test.

In the illustrated example of FIG. 13, the device 1302 provides attestation information to the agent 1306. In some examples, the attestation information may comprise one or more sub-states that are independent and associated with or managed by different verification entities (e.g., by the device 1302, the agent 1306, and/or a third party verification entity).

The attestation information may include user attestable information, device attestable information, and/or network (or connectivity) attestable information. In some examples, the attestation information may include one or more sub-states of attestable information. For example, the attestation information may include one or more of device state information, user authentication state information, and/or connectivity state information. The device state information may include one or more of Basic Input/Output System (BIOS) information, Unified Extensible Firmware Interface (UEFI) information, primary boot loader (PBL) information, secondary boot loader (SBL) information, firmware information, Hypervisor information, high level operating system (HLOS) information, real-time operating system (RTOS) information, and/or runtime integrity information. The user authentication state information may include one or more of authentication type and result of a user accessing the device, a liveness test (e.g., if biometric authorization is used), password strength information, continuous authentication, and/or multi-factor authentication (MFA) information. The connectivity state information may include one or more of radio frequency (RF) fingerprint information, virtual private network (VPN) information, channel-type information, authentication method information, security protocol and/or algorithm information. In some examples, the attestable information may include additional attestable information, such as location information and/or a timestamp (e.g., a time and/or date). The location information may include different levels of granularity. For example, the location information may include coordinates information (e.g., Global Positioning System (GPS) coordinates). In some examples, the location information may include general locations, such as "home," "office," etc. The agent 1306 may then facilitate verifying the attestation information. For example, the agent 1306 may use the attestation information by the device 1302, may perform its own verifications of the attestation information, and/or may communication with one or more third party verification entities to perform verifications.

To enable the agent 1306 to facilitate intelligent policy control and enforcement, the agent 1306 may evaluate a trust score based on one or more verification results. In some examples, the agent 1306 may apply weights to respective verification results to evaluate the trust score of the device 1302. The agent 1306 may use the trust score to manage access to the services provided by the service managing entity 1304. For example, the agent 1306 may allow or deny access to the services provided by the service managing entity 1304 based on the trust score of the device 1302. In some examples, the agent 1306 may determine a level of accessibility to the services provided by the service managing entity 1304 based on the trust score of the device 1302. For example, the agent 1306 may determine to allow full access or limited access to the device 1302. In some examples, the agent 1306 may determine a priority level for service access to the device 1302 based on the trust score of the device 1302. In some examples, the trust score may allow the agent 1306 and/or the service managing entity 1304 to adaptively configure the policy enforced on the device 1302. For example, the policy may change based one or more various factors, such as an increase in attestable parameter(s), a decrease in attestable parameter(s), a time of day, an amount of traffic, bandwidth usage, network conditions, anomaly detection, etc.

As an illustrative example, the agent 1306 acts as an intermediary between the device 1302 and the service managing entity 1304 to facilitate managing access rights (e.g., tolls, admittance, etc.) based on policies of the service managing entity 1304 and/or the agent 1306. For example, policies of the service managing entity 1304 and/or the agent 1306 may include that at least one occupant of the device 1302 is a resident of the service managing entity 1304, that the device 1302 satisfies a weight limit restriction, that the occupants of the device 1302 appear healthy (e.g., are not presenting with high temperatures, etc.). The service managing entity 1304 may then use the agent 1306 to allow the device 1302 to access (or enter) the service managing entity 1304, to block the device 1302 from accessing (or entering) the service managing entity 1304, or schedule the device 1302 to enter the service managing entity 1304. For example, the policy (or policies) may allow non-residents to enter the service managing entity 1304 for a maximum period. A policy may define one or more actions (e.g., a set of actions) to be enforced based on an evaluation of the attestation information. The actions (or a subset of the actions) may be enforced by the agent 1306, the device 1302, and/or one or more trusted third parties. For example, the set of actions defined by a policy may include one or more actions that are enforced by the agent 1306 (e.g., displaying a sign that reads access is not approved), one or more actions that the agent 1306 causes the device 1302 to enforce (e.g., by causing the device 1302 to turn around), and/or one or more actions that the agent 1306 causes one or more trusted third parties to enforce (e.g., by causing access barriers to move into position to prevent access).

In some examples, the service managing entity 1304 (e.g., the town) may use the agent 1306 to notify the device 1302 of special situations within the town. For example, the agent 1306 may notify the device 1302 of construction, parade routes, etc. In some examples, the agent 1306 may be configured to re-route the device 1302 based on the special situations.

In some examples, the device 1302 may notify the agent 1306 and/or the service managing entity 1304 (e.g., via the agent 1306) of special conditions related to the device 1302. For example, the device 1302 may indicate to the agent 1306 that the device 1302 is a wide-load, is part of a funeral procession, etc.

In some examples, the service managing entity 1304 and/or the agent 1306 may determine a toll for the device 1302 to be collected by the agent 1306, for example, based on the resident status, the vehicle type, the time of day, the traffic conditions, etc.

Figure 14:
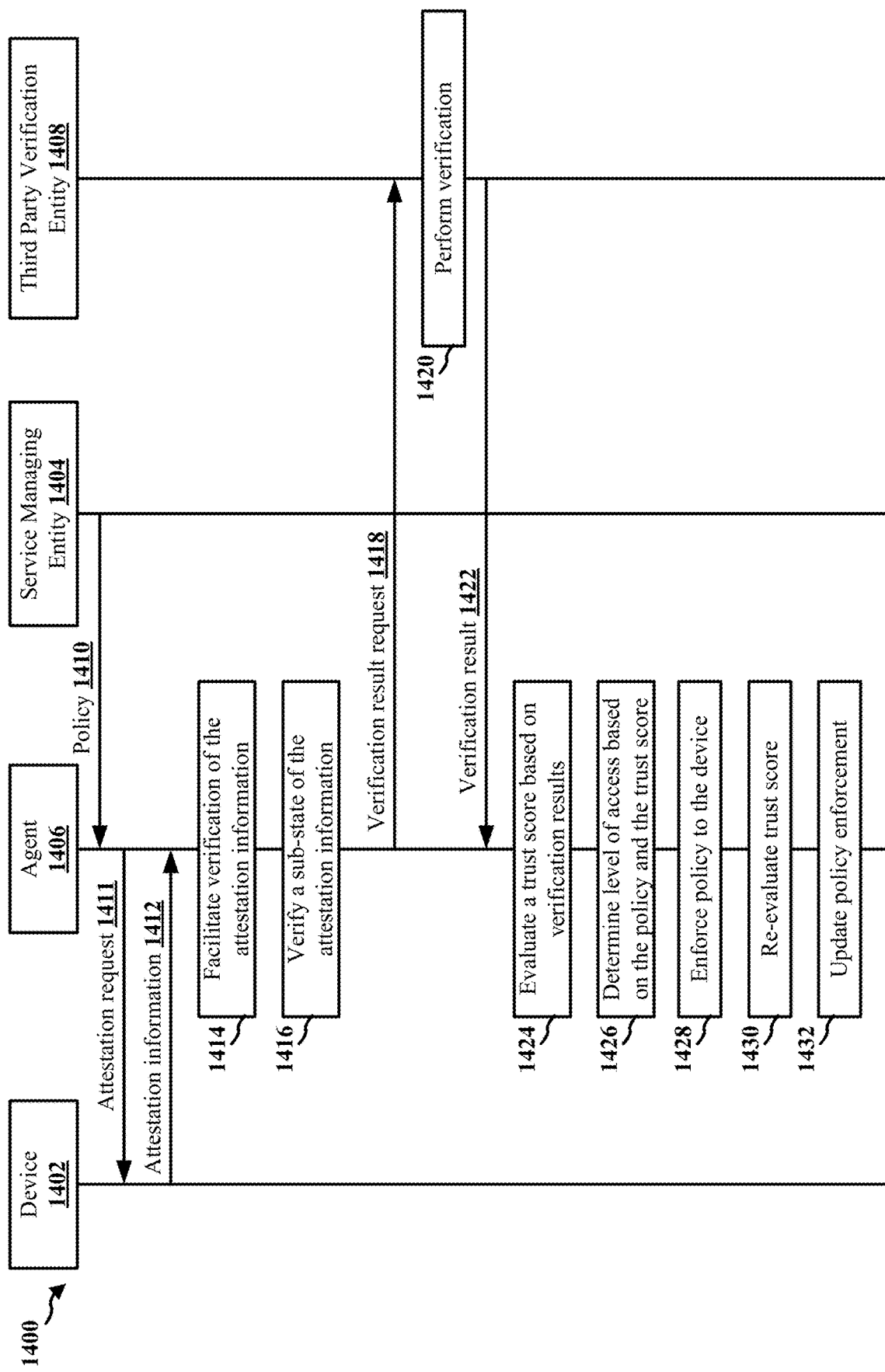
FIG. 14 illustrates an example communication flow between a device, a service managing entity, an agent of the service managing entity, and a third party verification entity, in accordance with the teachings disclosed herein.

FIG. 14 illustrates an example communication flow 1400 between a device 1402, a service managing entity 1404, an agent 1406 of the service managing entity, and a third party verification entity 1408, as presented herein. In the illustrated example, the communication flow 1400 facilitates surrogate-based access management of services using attestation results.

Aspects of the device 1402 may be implemented by the device 1302 of FIG. 13. Aspects of the service managing entity 1404 may be implemented by the service managing entity 1304 of FIG. 13. Aspects of the agent 1406 may be implemented by the agent 1306 of FIG. 13. Aspects of the third party verification entity 1408 may be implemented by the verifier 706 of FIGS. 7A, 7B, and/or 7C, an identity issuer, an IDM system, a device manufacturer, and/or a certification service.

Although not shown in the illustrated example of FIG. 14, it may be appreciated that in additional or alternative examples, the agent 1406 may be in communication with one or more other devices, agents, or third party verification entities.

In the illustrated example of FIG. 14, the service managing entity 1404 transmits a policy 1410 that is received by the agent 1406. However, in other examples, the agent 1406 may receive the policy 1410 from a trusted third party. For example, the service managing entity 1404 may instruct or may cause the trusted third party to configure the agent 1406 with the policy 1410. It may be appreciated that in some examples, the agent 1406 may request and/or obtain the policy 1410 after the device 1402 requests access to the services provided by the service managing entity 1404.

In some examples, the policy 1410 may include one or more attestable parameters, one or more trust score thresholds, one or more sets of actions, and/or one or more trust score evaluation parameters. The attestable parameters may define one or more sub-states of attestation information associated with the policy 1410. The trust score thresholds of the policy 1410 may correspond to different levels of access. For example, a first level of access may be associated with a trust score that is greater than or equal to a trust score threshold, and a second level of access may be associated with a trust score that is less than the trust score threshold. The sets of actions of the policy 1410 may include one or more actions to enforce to a device based on the level of access. For example, the first level of access may be associated with a first set of actions and the second level of access may be associated with a second set of actions.

The trust score evaluation parameters of the policy 1410 may include one or more triggering events that cause the agent 1406 to evaluate (or re-evaluate) the trust score for a device. For example, triggering events may include an initial service access request from the device, a service access request for one or more services (e.g., a request to access a particular building or building type, a request to access a particular file or file type, etc.). In some examples, the trust score evaluation parameters may indicate how frequently or how often the agent 1406 is to evaluate (or re-evaluate) the trust score for a device (e.g., once every hour, once every day, etc.).

In the illustrated example, the agent 1406 transmits an attestation request 1411 that is received by the device 1402. In some examples, the attestation request 1411 may indicate the one or more attestable parameters that the agent 1406 may use to evaluate the attestation. For example, the agent 1406 may identify the one or more attestable parameters defined by the policy 1410 to the device 1402 via the attestation request 1411.

In the illustrated example, the device 1402 transmits attestation information 1412 that is received by the agent 1406. The attestation information 1412 may include user attestable information, device attestable information, and/or network (or connectivity) attestable information. In some examples, the attestation information 1412 may include one or more sub-states of attestable information. For example, the attestation information 1412 may include one or more of device state information, user authentication state information, and/or connectivity state information. The device state information may include one or more of Basic Input/Output System (BIOS) information, Unified Extensible Firmware Interface (UEFI) information, primary boot loader (PBL) information, secondary boot loader (SBL) information, firmware information, Hypervisor information, high level operating system (HLOS) information, real-time operating system (RTOS) information, and/or runtime integrity information. The user authentication state information may include one or more of authentication type and result of a user accessing the device, a liveness test (e.g., if biometric authorization is used), password strength information, continuous authentication, and/or multi-factor authentication (MFA) information. The connectivity state information may include one or more of radio frequency (RF) fingerprint information, virtual private network (VPN) information, channel-type information, authentication method information, security protocol and/or algorithm information. In some examples, the attestation information 1412 may include additional attestable information, such as location information and/or a timestamp (e.g., a time and/or date). The location information may include different levels of granularity. For example, the location information may include coordinates information (e.g., Global Positioning System (GPS) coordinates). In some examples, the location information may include general locations, such as "home," "office," etc. At 1414, the agent 1406 facilitates verification of the attestation information 1412. In some examples, the agent 1406 may select a subset of the attestation information 1412 for verification. For example, the agent 1406 may select the subset of the attestation information 1412 corresponding to the attestable parameters of the policy 1410.

In some examples, different sub-states of the attestation information 1412 may be associated with and/or managed by different verification entities. For example, and referring to the example of FIG. 13, the attestation information may include the license plate number associated with the device 1302. The license plate number may then be used to determine, for example, whether the device 1302 is registered with the service managing entity 1304, whether an authorized user is driving the device 1302, whether the device 1302 is within a general weight limit, whether the device 1302 is within a weight limit based on the device type, whether the device 1302 is smog compliant, and/or whether the device 1302 is safety compliant.

In some examples, the agent 1406 may facilitate verification of the attestation information by performing a verification. For example, at 1416, the agent 1406 may verify a sub-state of the attestation information 1412. In some examples, the agent 1406 may verify the sub-state of the attestation information 1412 based on reference information. For example, the agent 1406 may determine whether the device 1402 is registered with the town based on the license plate number of the device 1402 and a data store comprising license plate numbers for devices registered with the town.

In some examples, the agent 1406 may verify the sub-state of the attestation information 1412 based on a measurement. For example, the agent 1406 may be capable of measuring the weight of the device 1402 and determine whether the weight of the device 1402 is within a weight limit (e.g., a general weight limit and/or a weight limit based on the device type).

In some examples, the agent 1406 may facilitate verification of the attestation information by requesting a third party verification entity perform the verification. For example, the agent 1406 may transmit a verification result request 1418 to the third party verification entity 1408 and request that the third party verification entity 1408 provide a verification result for a sub-state of the attestation information 1412. In some examples, the verification result request 1418 may include the attestation information 1412. For example, the agent 1406 may provide the license plate number to a DMV and request that the DMV verify whether the device 1402 is smog compliant. In some examples, the verification result request 1418 may include information associated with the attestation information 1412. For example, the agent 1406 may capture an image of a user in the device 1402 and transmit the image of the user to an IDM system (e.g., the IDM system 199 of FIG. 1) and request that the IDM system verify the identity of the user.

At 1420, the third party verification entity 1408 may perform a verification of a sub-state of the attestation information 1412. The third party verification entity 1408 may transmit a verification result 1422 that is received by the agent 1406. The verification result 1422 may include the result of the verification performed by the third party verification entity 1408 (e.g., at 1420).

At 1424, the agent 1406 evaluates a trust score for the device 1402 based on the verification results. For example, the agent 1406 may evaluate the trust score for the device 1402 based on a calculation that applies weight values to respective verification results. In some examples, the weight values may be provided by the policy 1410 and may be based on the respective attestable parameters defined by the policy 1410.

At 1426, the agent 1406 determines a level of access for the device 1402 based on the policy 1410 and the trust score for the device 1402. For example, the policy 1410 may include one or more trust score thresholds. In some examples, the agent 1406 may determine a first level of access for the device 1402 when the trust score is greater than (or equal to) a trust score threshold, and may determine a second level of access for the device 1402 when the trust score is less than the trust score threshold. In some examples, the first level of access may allow access to the services (e.g., access to the town) and the second level of access may deny access to the services (e.g., deny or block access to the town). In some examples, the first level of access may allow full access to the services and the second level of access may allow limited access to the services (e.g., deny or block access to portions of the town). In some examples, the first level of access may be associated with a first priority level and the second level of access may be associated with a second priority level that is less than the first priority level. For example, the first priority level may allow the device 1402 to travel at faster speeds within the town than the second priority level.

At 1428, the agent 1406 enforces the policy to the device 1402. For example, based on the trust score, the agent 1406 may enforce the respective level of access to the device 1402. In some examples, the respective level of access may be associated with a set of actions. In some examples, the agent 1406 may enforce the policy to the device 1402 by enforcing the set of actions to the device 1402. For example, to deny or block access to the town by the device 1402, the agent 1406 may raise a barricade. In some examples, the agent 1406 may enforce the policy to the device 1402 by causing the device 1402 to enforce the set of actions. For example, to deny or block access to the town by the device 1402, the agent 1406 may cause the device 1402 to turn around. In some examples, the set of actions may include one or more actions enforceable by the agent 1406, one or more actions enforceable by the device 1402, and/or one or more actions enforceable by a trusted third party.

At 1430, the agent 1406 may re-evaluate the trust score for the device 1402. In some examples, the agent 1406 may periodically re-evaluate the trust score for the device 1402 (e.g., based on the trust score evaluation parameter of the policy 1410). In some examples, the agent 1406 may re-evaluate the trust score for the device 1402 based on an occurrence of a triggering event. For example, the triggering event may include a request to access one or more services (e.g., a request to access a particular building or building type). In some examples, the agent 1406 may re-evaluate the trust score for the device 1402 by requesting attestation information from the device 1402, verifying one or more sub-states of the attestation information, and evaluating an updated trust score based on the respective verification results (e.g., as described above in connection with 1414 and 1424).

At 1432, the agent 1406 may update policy enforcement for the device 1402. In some examples, the agent 1406 may update policy enforcement for the device 1402 by determining an updated level of access based on the new trust score (e.g., as described above in connection with 1426). In some examples, the policy 1410 may change based on one or more of an increase in attestable parameter(s), a decrease in attestable parameter(s), a time of day, an amount of traffic, bandwidth usage, network conditions, anomaly detection, etc.

Thus, it may be appreciated that the techniques disclosed herein enable the service managing entity 1404 and the agent 1406 to employ an adaptive configuration of a policy including continuous, periodic, and/or on-demand trust score evaluations of the device 1402. Moreover, it may be appreciated that by managing access to the services provided by the service managing entity 1404 based on a trust score evaluation based on one or more verification results, different levels of access may be allowed based on respective verification results. For example, instead of denying access to the town based on a verification result indicating that the device 1402 has not had a smog check performed (or has not had a smog check performed within a compliant period), the example techniques disclosed herein allow the device 1402 to access the town, for example, with limited access. Moreover, the set of actions associated with the limited access may include causing the device 1402 to have a smog check performed within a threshold period of accessing the town.

Figure 15:
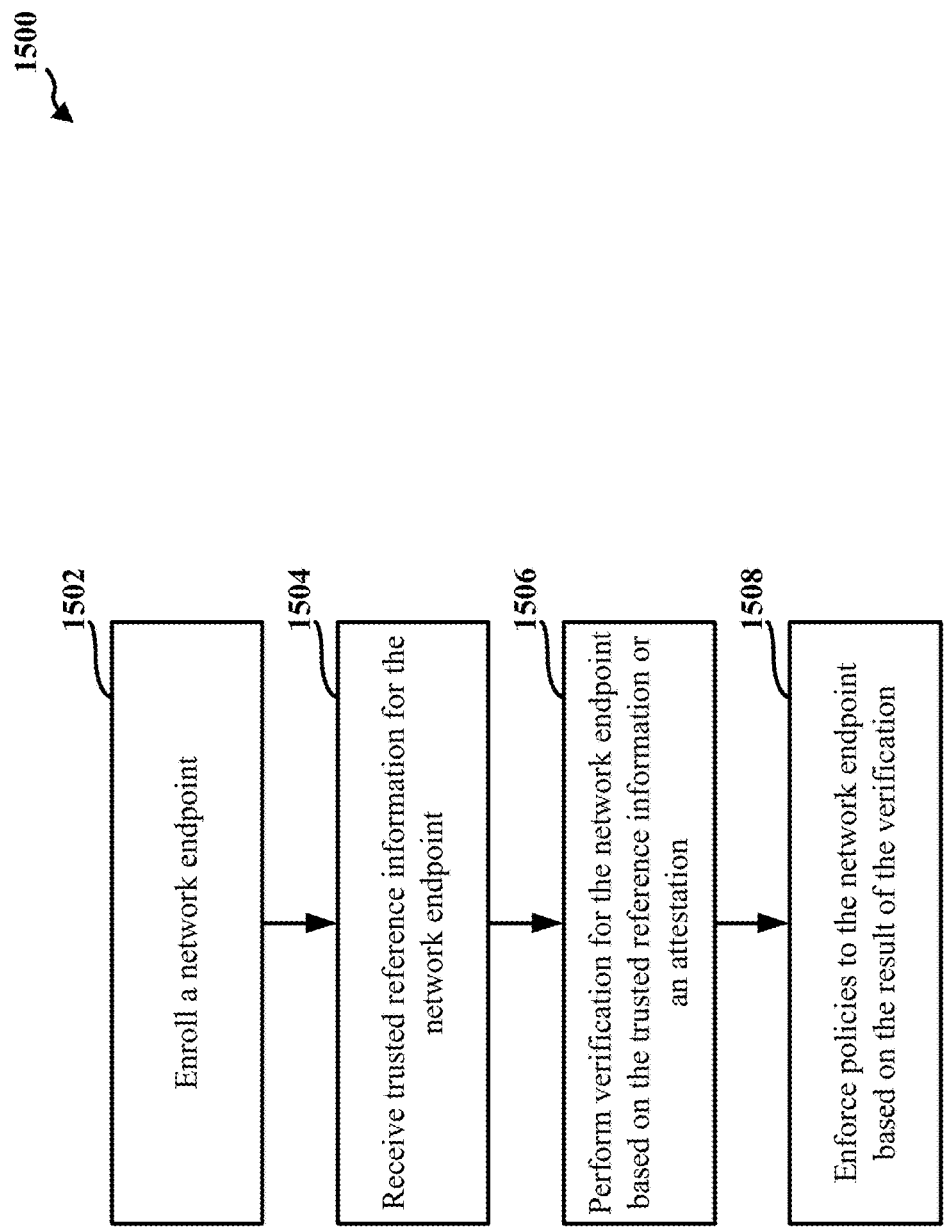
FIG. 15 is a flowchart of a method of performing device attestation at a first device, in accordance with the teachings disclosed herein.

FIG. 15 is a flowchart 1500 of a method of trust management. The method may be performed by a network manager (e.g., the network health manager 804 of FIG. 8, the network health manager 904 of FIG. 9, the infra node 1004 and/or the edge node 1006 of FIG. 10, the router 1122 and/or the edge node 1126 of FIG. 11, and/or the network health manager 1204 of FIG. 12; the apparatus 2102). The method may facilitate a self-managed trust network to increase privacy while also managing the network to a trusted and health level.

At 1502, the network manager enrolls a network endpoint with a network managed by the network manager, as described in connection with the communication flow 400 of FIG. 4, the performing of ID enrollment at 910 of FIG. 9, and/or the performing of ID enrollment at 1214 of FIG. 12. In some examples, the network endpoint may be connected to the network manager. In some examples, enrolling the network endpoint may include exchanging information with the network endpoint. In some examples, the network manager may transmit the credential request to the network endpoint after performing an initial verification of the network endpoint. In some examples, when exchanging information with the network endpoint, the network manager may use a credential of the network manager to authenticate a message before transmitting the authenticated message to the network endpoint. In some examples, when exchanging information with the network endpoint, the network manager may use the credential of the network manager to decrypt a message received form the network endpoint. The enrolling of the network endpoint, at 1502, may be performed by an identity enrollment component 2142 of the apparatus 2102 of FIG. 21.

At 1504, the network manager receives trusted reference information for the network endpoint based on enrolling the network endpoint, as described in connection with the trusted reference information 1218 of FIG. 12. The receiving of the trusted reference information, at 1504, may be performed by a trusted reference information component 2140 of the apparatus 2102 of FIG. 21. In some examples, the first device may receive the trusted reference information per network endpoint in communication with the network manager. In some examples, the network manager may receive the trusted reference information for a set of network endpoints in communication with the network manager. In some examples, the network manager may receive the trusted reference information from a verification information service associated with the network endpoint, as described in connection with the subscription request 1216 of FIG. 12. For example, the network manager may subscribe to a service provided by the verification information service to receive notifications of software updates and/or updated trusted reference information.

At 1506, the network endpoint performs verification of the network endpoint based on at least one of the trusted reference information or an attestation, as described in connection with the attestation 1226 of FIG. 12. In some examples, the network manager may perform the verification of the network endpoint periodically. In some examples, the network manager may perform the verification of the network endpoint on-demand. In some examples, the network manager may perform the verification of the network endpoint in response to an occurrence of a triggering event. In some examples, the network manager may initiate performing the verification by querying the network endpoint for device state information in accordance with a policy. The performing of the verification of the network endpoint, at 1506, may be performed a verification component 2146 of the apparatus 2102 of FIG. 21.

At 1508, the network manager enforces policies to the network endpoint based on a result of the verification, as described in connection with 1230, 1232, and/or 1234 of FIG. 12. The enforcing of the policies to the network endpoint, at 1508, may be performed by a policy enforcement component 2150 of the apparatus 2102 of FIG. 21. In some examples, the policies may include at least one of network access levels or configurations, service access or authorization levels or configurations, QoS levels or configurations, resource access levels or configurations, trust levels or configurations, and trust event remedies.

In some examples, enforcing policies to the network endpoint may include monitoring connection health for the network endpoint and/or monitoring device health of the network endpoint, as described in connection with 818 of FIG. 8. In some examples, enforcing policies to the network endpoint may modifying network access controls of the network endpoint, limiting functional capabilities of the network endpoint, adjusting QoS levels of the network endpoint, and/or forcing a software update of the network endpoint, as described in connection with 812 of FIG. 8. In some examples, enforcing policies to the network endpoint may include providing software updates for the network endpoint, as described in connection with 814 of FIGS. 8 and/or 1234 of FIG. 12. Aspects of providing a software update, in accordance with the teachings disclosed herein, are described below in connection with FIG. 14. In some examples, enforcing policies to the network endpoint may include limiting information about the network endpoint that is provided to a third party, as described in connection with 816 of FIG. 8. In some examples, enforcing policies to the network endpoint may include controlling user access to a service or resource based on a user verification, as described in connection with the bad user 1101a of FIG. 11.

Figure 16:
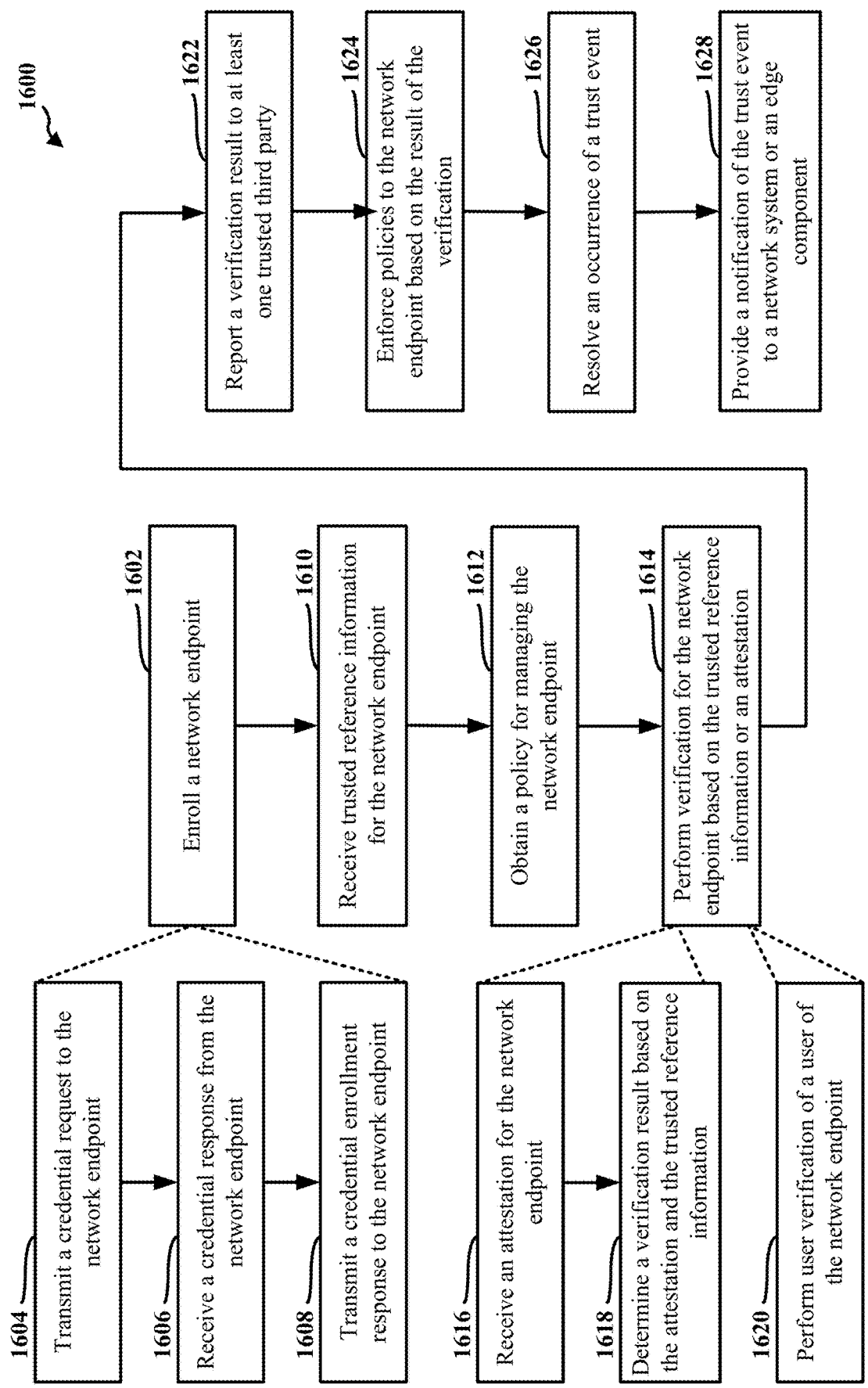
FIG. 16 is a flowchart of a method of performing device attestation at a first device, in accordance with the teachings disclosed herein.

FIG. 16 is a flowchart 1600 of a method of trust management. The method may be performed by a network manager (e.g., the network health manager 804 of FIG. 8, the network health manager 904 of FIG. 9, the infra node 1004 and/or the edge node 1006 of FIG. 10, the router 1122 and/or the edge node 1126 of FIG. 11, and/or the network health manager 1204 of FIG. 12; the apparatus 2102). The method may facilitate a self-managed trust network to increase privacy while also managing the network to a trusted and health level.

At 1602, the network manager enrolls a network endpoint with a network managed by the network manager, as described in connection with the communication flow 400 of FIG. 4, the performing of ID enrollment at 910 of FIG. 9, and/or the performing of ID enrollment at 1214 of FIG. 12. In some examples, the network endpoint may be connected to the network manager. In some examples, enrolling the network endpoint may include exchanging information with the network endpoint. For example, at 1604, the network manager may transmit a credential request to the network endpoint, as described in connection with the credential request 423 of FIG. 4. In some examples, the network manager may transmit the credential request to the network endpoint after performing an initial verification of the network endpoint. At 1606, the network manager may receive a credential response from the network endpoint, as described in connection with the credential response 425 of FIG. 4. At 1608, the network manager may transmit a credential enrollment response to the network endpoint when the device identifier is enrolled with the network manager, as described in connection with the credential enrollment response 427 of FIG. 4. In some examples, when exchanging information with the network endpoint, the network manager may use a credential of the network manager to authenticate a message before transmitting the authenticated message to the network endpoint. In some examples, when exchanging information with the network endpoint, the network manager may use the credential of the network manager to decrypt a message received form the network endpoint. Aspects of the enrolling of the network endpoint, at 1602, 1604, 1606, 1608, may be performed by the identity enrollment component 2142 of the apparatus 2102 of FIG. 21.

At 1610, the network manager may receive trusted reference information for the network endpoint from one or more trusted third parties based on enrolling the network endpoint, as described in connection with the trusted reference information 1218 of FIG. 12. The receiving of the trusted reference information, at 1610, may be performed by a trusted reference information component 2140 of the apparatus 2102 of FIG. 21. In some examples, the first device may receive the trusted reference information per network endpoint in communication with the network manager. In some examples, the network manager may receive the trusted reference information for a set of network endpoints in communication with the network manager. In some examples, the network manager may receive the trusted reference information from a verification information service associated with the network endpoint, as described in connection with the subscription request 1216 of FIG. 12. For example, the network manager may subscribe to a service provided by the verification information service to receive notifications of software updates and/or updated trusted reference information.

At 1612, the network manager may obtain a policy for managing the network endpoint, as described in connection with the policy 1222 of FIG. 12. In some examples, the policy obtained for managing the network endpoint may include one or more ranges of remedies that are based on a trust level associated with the network endpoint and/or an operational purpose associated with the network endpoint. For example, a remedy for managing a first network endpoint associated with a first trust level may include disabling the first network endpoint, while a second network endpoint associated with a second trust level may include enabling the second network endpoint to update software. The obtaining of the policy, at 1612, may be performed by a policy obtaining component 2144 of the apparatus 2102 of FIG. 21. In some examples, the network manager may use an attestation verifier associated with the network endpoint to retrieve a policy from the one or more trusted third parties for managing the network endpoint. In some examples, managing the network endpoint may include enforcing the policy against the network endpoint. In some examples, the attestation verifier may comprise a policy location (e.g., a URL) identifying an entity (e.g., a web server) hosting a policy for the network endpoint. In some examples, the policy may be a MUD file. In some examples, the network manager may receive the policies for enforcement to the network endpoint from a network owner. In some examples, one or more of the policies may be updateable policies.

At 1614, the network endpoint performs verification of the network endpoint based on at least one of the trusted reference information or an attestation, as described in connection with the attestation 1226 of FIG. 12. In some examples, the network manager may perform the verification of the network endpoint periodically. In some examples, the network manager may perform the verification of the network endpoint on-demand. In some examples, the network manager may perform the verification of the network endpoint in response to an occurrence of a triggering event. In some examples, the network manager may initiate performing the verification by querying the network endpoint for device state information in accordance with a policy.

In some examples, performing the verification of the network endpoint may include receiving, at 1616, the attestation for network endpoint, as described in connection with the attestation 1226 of FIG. 12. The attestation may be based on one or more of a device identifier of the network endpoint, a permanent credential of the network endpoint, or a device state of the network endpoint. In some examples, at least one of the device identifier and the permanent credential may be stored in a trusted environment of the network endpoint, such as a secure element (e.g., the secure element 1054 of FIG. 10). It may be appreciated that the secure element may be configured such that information stored in the secure element is unalterable.

In some examples, performing the verification may include determining, at 1618, a verification result based on the attestation and the trusted reference information, as described in connection with 1228 of FIG. 12. In some examples, determining the verification result may include determining an occurrence of a trust event. For example, the network manager may determine an occurrence of a trust event based on the device state of the network endpoint.

In some examples, performing the verification may include performing, at 1620, user verification of a user of network endpoint, as described in connection with the bad user 1101*a* and the first downstream node 1102*b* of FIG. 11. In some examples, performing the user verification may include receiving device attestation including a user verification result from the network endpoint. Aspects of the performing of the verification of the network endpoint, at 1614, 1616, 1618, 1620, may be performed a verification component 2146 of the apparatus 2102 of FIG. 21.

At 1622, the network manager may report a verification result to at least one trusted third party of the one or more trusted third parties, as described in connection with the message 1236 of FIG. 12. The reporting of the verification result, at 1622, may be performed by a reporting component 2148 of the apparatus 2102 of FIG. 21.

At 1624, the network manager enforces policies to the network endpoint based on a result of the verification, as described in connection with 1230, 1232, and/or 1234 of FIG. 12. The enforcing of the policies to the network endpoint, at 1624, may be performed by a policy enforcement component 2150 of the apparatus 2102 of FIG. 21. In some examples, the policies may include at least one of network access levels or configurations, service access or authorization levels or configurations, QoS levels or configurations, resource access levels or configurations, trust levels or configurations, and trust event remedies.

In some examples, enforcing policies to the network endpoint may include monitoring connection health for the network endpoint and/or monitoring device health of the network endpoint, as described in connection with 818 of FIG. 8. In some examples, enforcing policies to the network endpoint may modifying network access controls of the network endpoint, limiting functional capabilities of the network endpoint, adjusting QoS levels of the network endpoint, and/or forcing a software update of the network endpoint, as described in connection with 812 of FIG. 8. In some examples, enforcing policies to the network endpoint may include providing software updates for the network endpoint, as described in connection with 814 of FIGS. 8 and/or 1234 of FIG. 12. Aspects of providing a software update, in accordance with the teachings disclosed herein, are described below in connection with FIG. 14. In some examples, enforcing policies to the network endpoint may include limiting information about the network endpoint that is provided to a third party, as described in connection with 816 of FIG. 8. In some examples, enforcing policies to the network endpoint may include controlling user access to a service or resource based on a user verification, as described in connection with the bad user 1101*a* of FIG. 11.

In some examples, at 1626, the network manager may resolve an occurrence of a trust event in accordance with a policy, as described in connection with 1232 of FIG. 12. The resolving of the trust event, at 1626, may be performed by a trust event handling component 2152 of the apparatus 2102 of FIG. 21. In some examples, the network manager may resolve the trust event by disabling user access via the network endpoint, forcing a software update for the network endpoint, causing the network endpoint to reboot, causing a reset of the network endpoint, and/or disconnecting network access for the network endpoint. In some examples, the network manager may also verify that the trust event resolved successfully on the network endpoint. In some examples, resolving the trust event may include providing a trust event report to a third party device manager based on a determination that the network manager is unable to resolve the trust event. In some examples, the network manager may provide a trust event report to a network system or an edge component for analysis of the trust event. The trust event report may include one or more trust event indications and/or one or more trust event remedies. For example, the trust event report may include indications identifying the one or more trust events. The trust event report may additionally or alternatively include indications of one or more trust event remedies attempted by the network manager to resolve the trust event and/or the trust event remedies applied by the network manager to resolve the trust event.

At 1628, the network manager may provide a notification of the trust event to a network system or an edge component, as described in connection with FIG. 10. The providing of the notification of the trust event, at 1628, may be performed by the trust event handling component 2152 of the apparatus 2102 of FIG. 21. In some examples, the notification of the trust event may comprise the trust event report.

Figure 17:
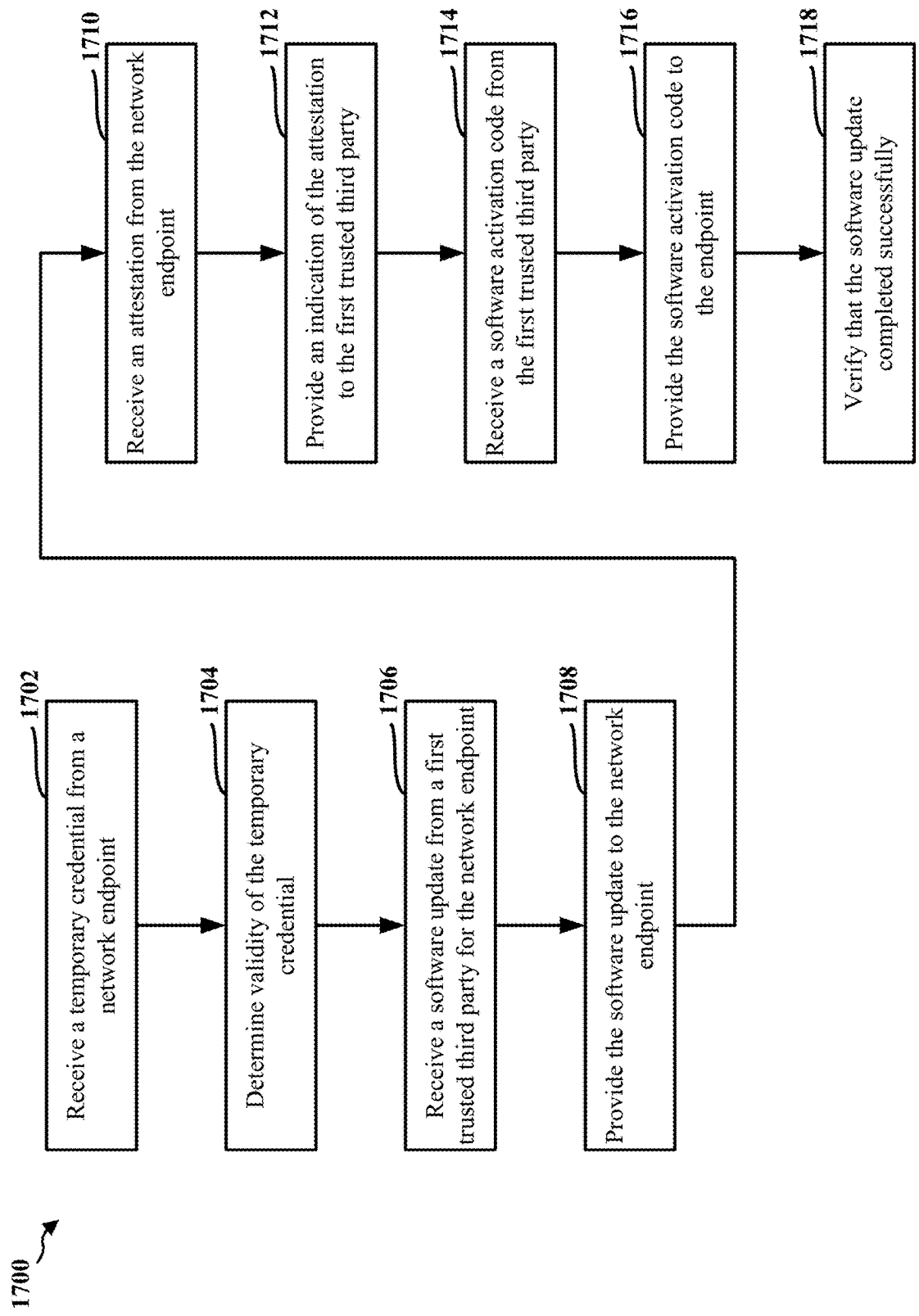
FIG. 17 is a flowchart of a method of performing device attestation at a first device, in accordance with the teachings disclosed herein.

FIG. 17 is a flowchart 1700 of a method of trust management. The method may be performed by a network manager (e.g., the network health manager 804 of FIG. 8, the network health manager 904 of FIG. 9, the infra node 1004 and/or the edge node 1006 of FIG. 10, the router 1104 and/or the edge node 1108 of FIG. 11, and/or the network health manager 1204 of FIG. 12; the apparatus 2102). The method may facilitate performing a software update of a network endpoint while maintaining privacy of the network endpoint.

At 1702, the network manager may receive a temporary credential from the network endpoint, as described in connection with the temporary credential 916 of FIG. 9. The receiving of the temporary credential, at 1702, may be performed by a credential handling component 2154 of the apparatus 2102 of FIG. 21. In some examples, the temporary credential may be based on at least one of a public-private key pair, a public key, a hash of the public key, or an identifier associated with the temporary credential.

At 1704, the network manager may determine validity of the temporary credential, as described in connection with 918 of FIG. 9. The determining of the validity of the temporary credential, at 1704, may be performed by the credential handling component 2154 of the apparatus 2102 of FIG. 21. In some examples, the network manager may register the temporary credential in response determining the temporary credential is valid.

At 1706, the network manager may receive a software update from a first trusted third party for network endpoint, as described in connection with the software update 924 of FIG. 9. The receiving of the software update, at 1706, may be performed by a software handling component 2156 of the apparatus 2102 of FIG. 21. In some examples, the network manager may receive the software update in response to a periodic attestation report, a notification based on a subscription for the network endpoint, and/or a request from the network manager that includes a temporary credential for the network endpoint.

At 1708, the network manager may provide the software update to the network endpoint, as described in connection with the software update 928 of FIG. 9. The providing of the software update, at 1708, may be performed by the software handling component 2156 of the apparatus 2102 of FIG. 21. In some examples, the network manager may provide the software update based on the verification of the network endpoint. In some examples, the network manager may provide the software update based on a verification of a signature of the software updated provided by the first trusted third party. In some examples, the network manager may provide the software update to the network endpoint based on a software update policy, as described in connection with 926 of FIG. 9.

At 1710, the network manager may receive an attestation from the network endpoint, as described in connection with attestation 930 of FIG. 9. The receiving of the attestation, at 1710, may be performed by an attestation handling component 2158 of the apparatus 2102 of FIG. 21.

At 1712, the network manager may provide an indication of the attestation to the first trusted third party, as described in connection with the attestation indication 932 of FIG. 9. For example, the providing of the indication of the attestation may be performed by the attestation handling component 2158 of the apparatus 2102 of FIG. 21.

At 1714, the network manager may receive a software activation code from the first trusted third party, as described in connection with the software activation code 934 of FIG. 9. The receiving of the software activation code, at 1714, may be performed by an activation code handling component 2160 of the apparatus 2102 of FIG. 21. In some examples, the network manager may receive the software activation code from the first trusted third party in response to the indication of the activation.

At 1716, the network manager may provide the software activation code to the network endpoint, as described in connection with the software activation code 936 of FIG. 9. For example, the providing of the software activation code may be performed by the activation code handling component 2160 of the apparatus 2102 of FIG. 21.

At 1718, the network manager may verify that the software update completed successfully on the network endpoint, as described in connection with 938 of FIG. 9. For example, the verifying that the software update completed successfully may be performed by the software handling component 2156 of the apparatus 2102 of FIG. 21.

Figure 18:
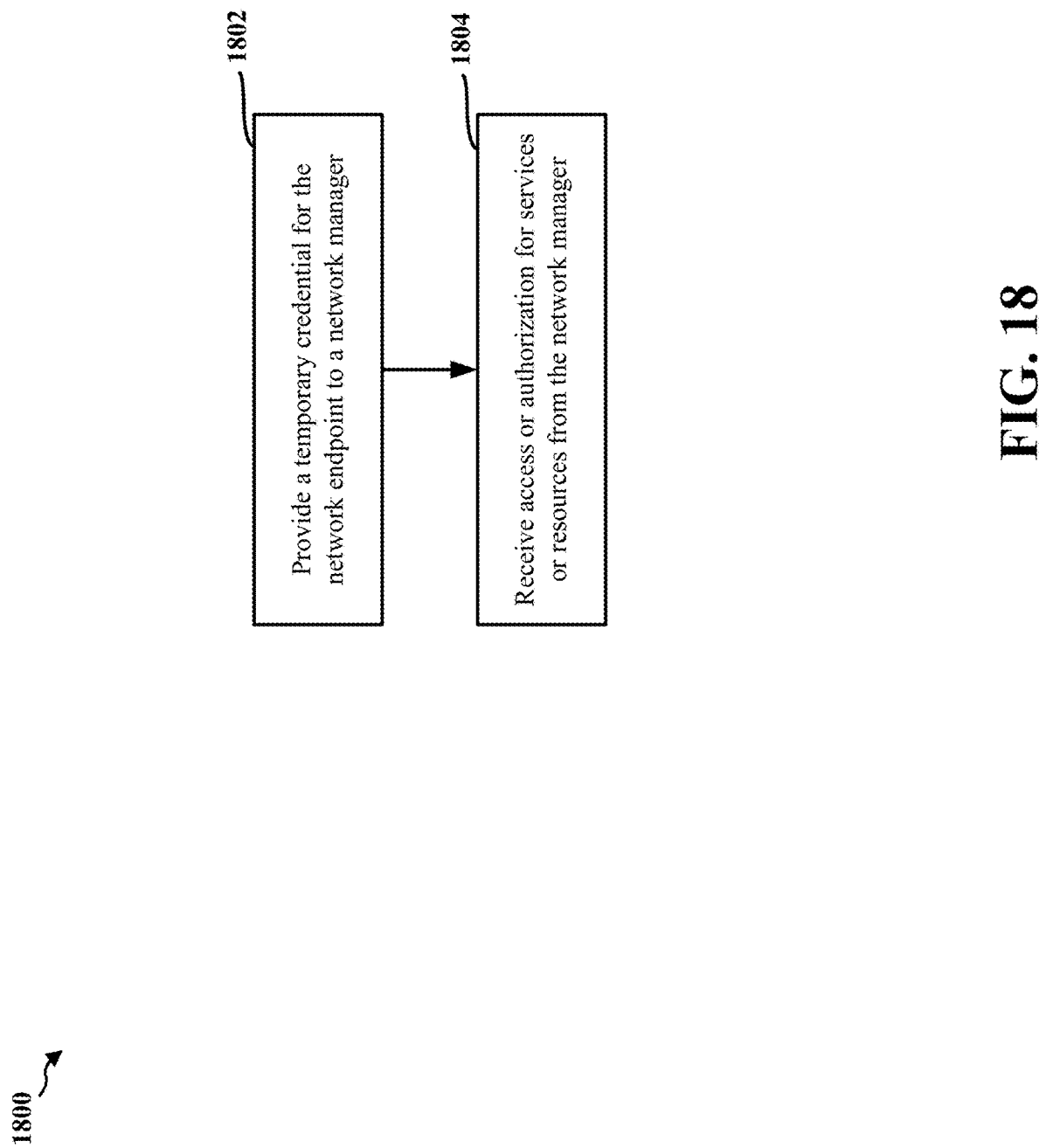
FIG. 18 is a flowchart of a method of device attestation at a device, in accordance with the teachings disclosed herein.

FIG. 18 is a flowchart 1800 of a method of trust management. The method may be performed by a network endpoint (e.g., the user device 103 of FIG. 1, the user device 212 of FIG. 2, the device 404 of FIG. 4, the device 502 of FIG. 5, the device 604 of FIG. 6, the network endpoint 902 of FIG. 9, and/or the nodes 1102, 1103, 1105 of FIG. 11), a UE (e.g., the UE 104 of FIG. 1, the UE 350 of FIG. 3, and/or the UE 1002 of FIG. 10), an attester (e.g., the attester 702 of FIGS. 7A, 7B, and/or 7C), the device 803 of FIG. 8, and/or the apparatus 2102 of FIG. 21. The method may facilitate a self-managed trust network to increase privacy while also managing the network to a trusted and health level.

At 1802, the network endpoint provides a temporary credential for the network endpoint to a network manager, as described in connection with the temporary credential 916 of FIG. 9. In some examples, the temporary credential may be based on a permanent credential for the network endpoint. In some examples, the temporary credential may be based on at least one of a public-private key pair, a public key, a hash of the public key, or an identifier associated with the temporary credential. The providing of the temporary credential, at 1802, may be performed by a credential handling component 2154 of the apparatus 2102 of FIG. 21

At 1804, the network endpoint receives, from the network manager, access or authorization for services or resources, as described in connection with FIG. 8. In some examples, the access or authorization may be based on the temporary credential of the network endpoint. Receiving access or authorization, at 1804, may be performed by an authorized component 2162 of the apparatus 2102 of FIG. 21.

Figure 19:
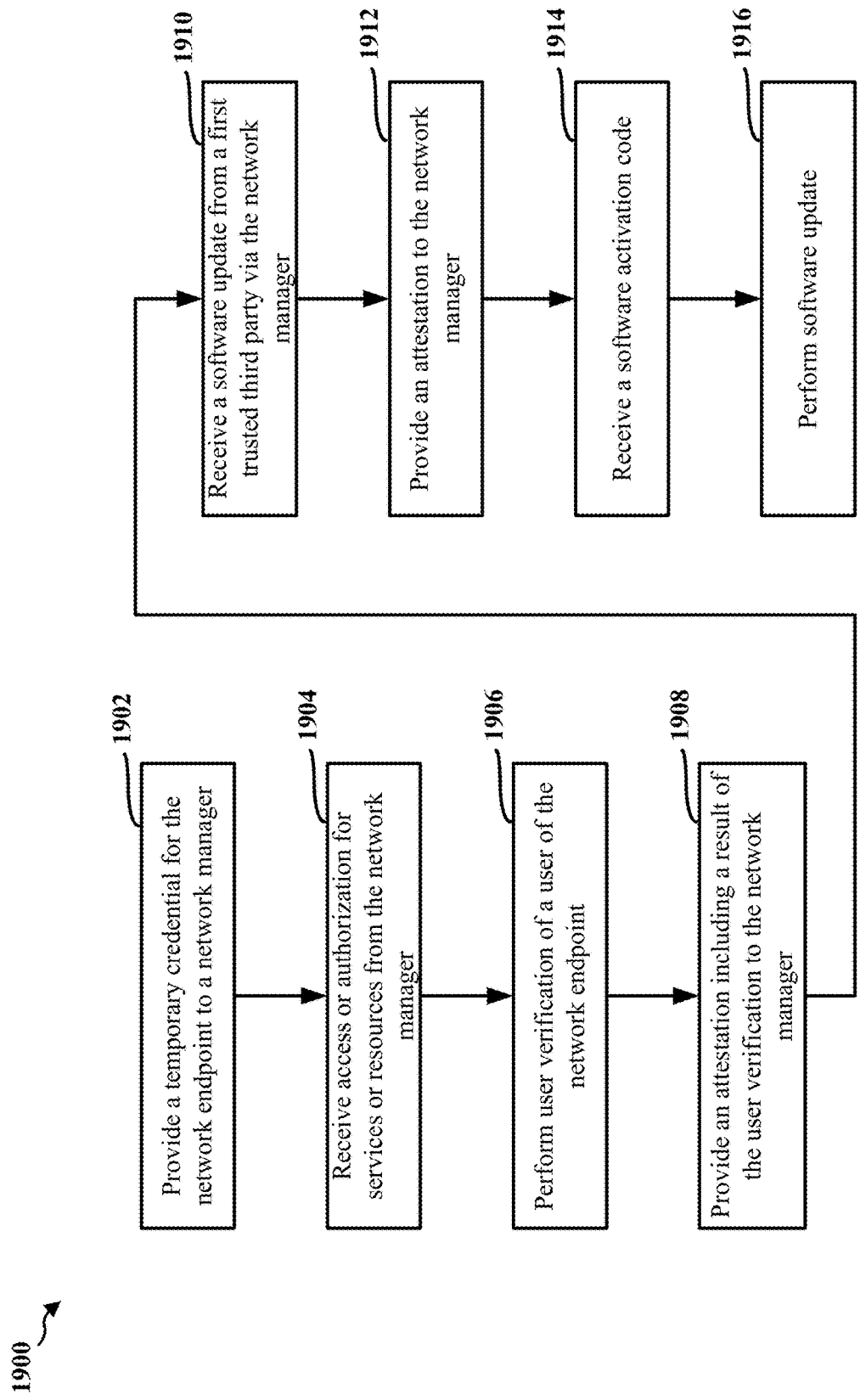
FIG. 19 is a flowchart of a method of device attestation at a device, in accordance with the teachings disclosed herein.

FIG. 19 is a flowchart 1900 of a method of trust management. The method may be performed by a network endpoint (e.g., the user device 103 of FIG. 1, the user device 212 of FIG. 2, the device 404 of FIG. 4, the device 502 of FIG. 5, the device 604 of FIG. 6, the network endpoint 902 of FIG. 9, and/or the nodes 1102, 1103, 1105 of FIG. 11), a UE (e.g., the UE 104 of FIG. 1, the UE 350 of FIG. 3, and/or the UE 1002 of FIG. 10), an attester (e.g., the attester 702 of FIGS. 7A, 7B, and/or 7C), the device 803 of FIG. 8, and/or the apparatus 2102 of FIG. 21. The method may facilitate a self-managed trust network to increase privacy while also managing the network to a trusted and health level.

At 1902, the network endpoint provides a temporary credential for the network endpoint to a network manager, as described in connection with the temporary credential 916 of FIG. 9. In some examples, the temporary credential may be based on a permanent credential for the network endpoint. In some examples, the temporary credential may be based on at least one of a public-private key pair, a public key, a hash of the public key, or an identifier associated with the temporary credential. The providing of the temporary credential, at 1902, may be performed by a credential handling component 2154 of the apparatus 2102 of FIG. 21

At 1904, the network endpoint receives, from the network manager, access or authorization for services or resources, as described in connection with FIG. 8. In some examples, the access or authorization may be based on the temporary credential of the network endpoint. Receiving access or authorization, at 1904, may be performed by an authorized component 2162 of the apparatus 2102 of FIG. 21.

At 1906, the network endpoint may perform user verification of a user of the network endpoint, as described in connection with the user 1101a and first downstream node 1102b of FIG. 11. In some examples, performing user verification may be based on one or more of a password, a biometric, a trusted location, a multi-factor verification, or a continuous authentication. The performing of the user verification, at 1906, may be performed by a verification component 2146 of the apparatus 2102 of FIG. 21

At 1908, the network endpoint may provide an attestation including a result of the user verification to the network manager, as described in connection with the attestation 1226 of FIG. 12. The providing of the attestation including the result of the user verification, at 1908, may be performed by an attestation handling component 2158 of the apparatus 2102 of FIG. 21.

At 1910, the network endpoint may receive a software update from a first trusted third party via the network manager, as described in connection with the software update 928 of FIG. 9. The receiving of the software update, at 1910, may be performed by a software handling component 2156 of the apparatus 2102 of FIG. 21.

At 1912, the network endpoint may provide an attestation to the network manager, as described in connection with the attestation 930 of FIG. 9. The providing of the attestation, at 1912, may be performed by the attestation handling component 2158 of the apparatus 2102 of FIG. 21.

At 1914, the network endpoint may receive, via the network manager, a software activation code from the first trusted third party, as described in connection with the software activation code 936 of FIG. 9. The receiving of the software activation code, at 1914, may be performed by an activation code handling component 2160 of the apparatus 2102 of FIG. 21.

At 1916, the network endpoint may perform a software update, as described in connection with the 938 of FIG. 9. The performing of the software update, at 1916, may be performed by the software handling component 2156 of the apparatus 2102 of FIG. 21.

Figure 20:
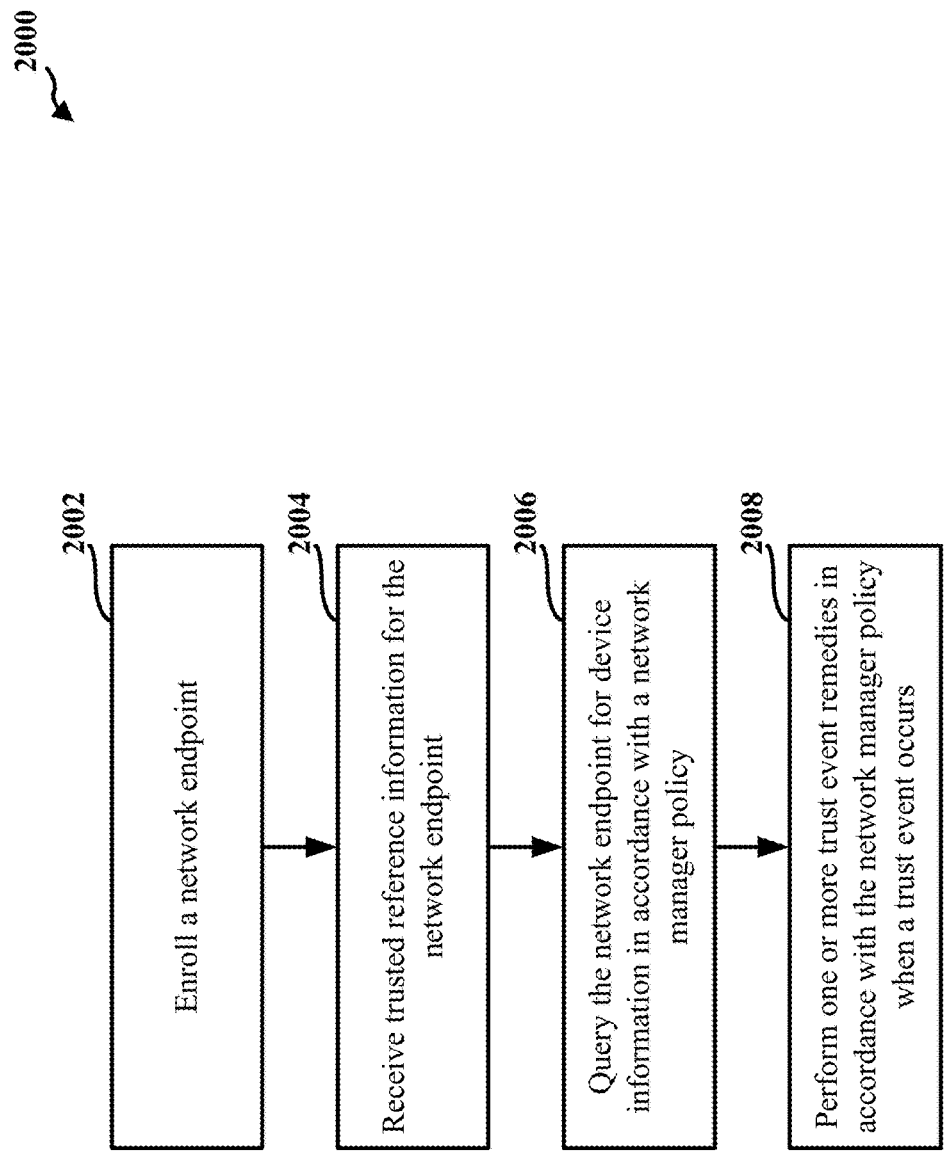
FIG. 20 is a flowchart of a method of performing device attestation at a first device, in accordance with the teachings disclosed herein.

FIG. 20 is a flowchart 2000 of a method of trust management. The method may be performed by a network manager (e.g., the network health manager 804 of FIG. 8, the network health manager 904 of FIG. 9, the infra node 1004 and/or the edge node 1006 of FIG. 10, the router 1122 and/or the edge node 1126 of FIG. 11, and/or the network health manager 1204 of FIG. 12; the apparatus 2102). The method may facilitate a self-managed trust network to increase privacy while also managing the network to a trusted and health level.

At 2002, the network manager enrolls a network endpoint with a network managed by the network manager, as described in connection with the communication flow 400 of FIG. 4, the performing of ID enrollment at 910 of FIG. 9, and/or the performing of ID enrollment at 1214 of FIG. 12. In some examples, the network endpoint may be connected to the network manager. In some examples, enrolling the network endpoint may include exchanging information with the network endpoint. In some examples, the network manager may transmit the credential request to the network endpoint after performing an initial verification of the network endpoint. In some examples, when exchanging information with the network endpoint, the network manager may use a credential of the network manager to authenticate a message before transmitting the authenticated message to the network endpoint. In some examples, when exchanging information with the network endpoint, the network manager may use the credential of the network manager to decrypt a message received form the network endpoint. The enrolling of the network endpoint, at 2002, may be performed by an identity enrollment component 2142 of the apparatus 2102 of FIG. 21.

At 2004, the network manager receives trusted reference information for the network endpoint based on enrolling the network endpoint, as described in connection with the trusted reference information 1218 of FIG. 12. The receiving of the trusted reference information, at 2004, may be performed by a trusted reference information component 2140 of the apparatus 2102 of FIG. 21. In some examples, the first device may receive the trusted reference information per network endpoint in communication with the network manager. In some examples, the network manager may receive the trusted reference information for a set of network endpoints in communication with the network manager. In some examples, the network manager may receive the trusted reference information from a verification information service associated with the network endpoint, as described in connection with the subscription request 1216 of FIG. 12. For example, the network manager may subscribe to a service provided by the verification information service to receive notifications of software updates and/or updated trusted reference information.

At 2006, the network endpoint queries the network endpoint for device information in accordance with a network manager policy enforced by the network manager, as described in connection with the state query 1224 of FIG. 12. The querying of the network endpoint, at 2006, may be performed by a verification component 2146 of the apparatus 2102 of FIG. 21.

At 2008, the network manager performs one or more trust event remedies in accordance with the network manager policy when a trust event occurs, as described in connection with 1232 of FIG. 12. In some examples, the occurrence of the trust event may be based on a comparison of the device information and the trusted reference information for the network endpoint. The performing of the one or more trust event remedies, at 2008, may be performed by a policy enforcement component 2150 of the apparatus 2102 of FIG. 21. In some examples, the policies may include at least one of network access levels or configurations, service access or authorization levels or configurations, QoS levels or configurations, resource access levels or configurations, trust levels or configurations, and trust event remedies.

Figure 21:
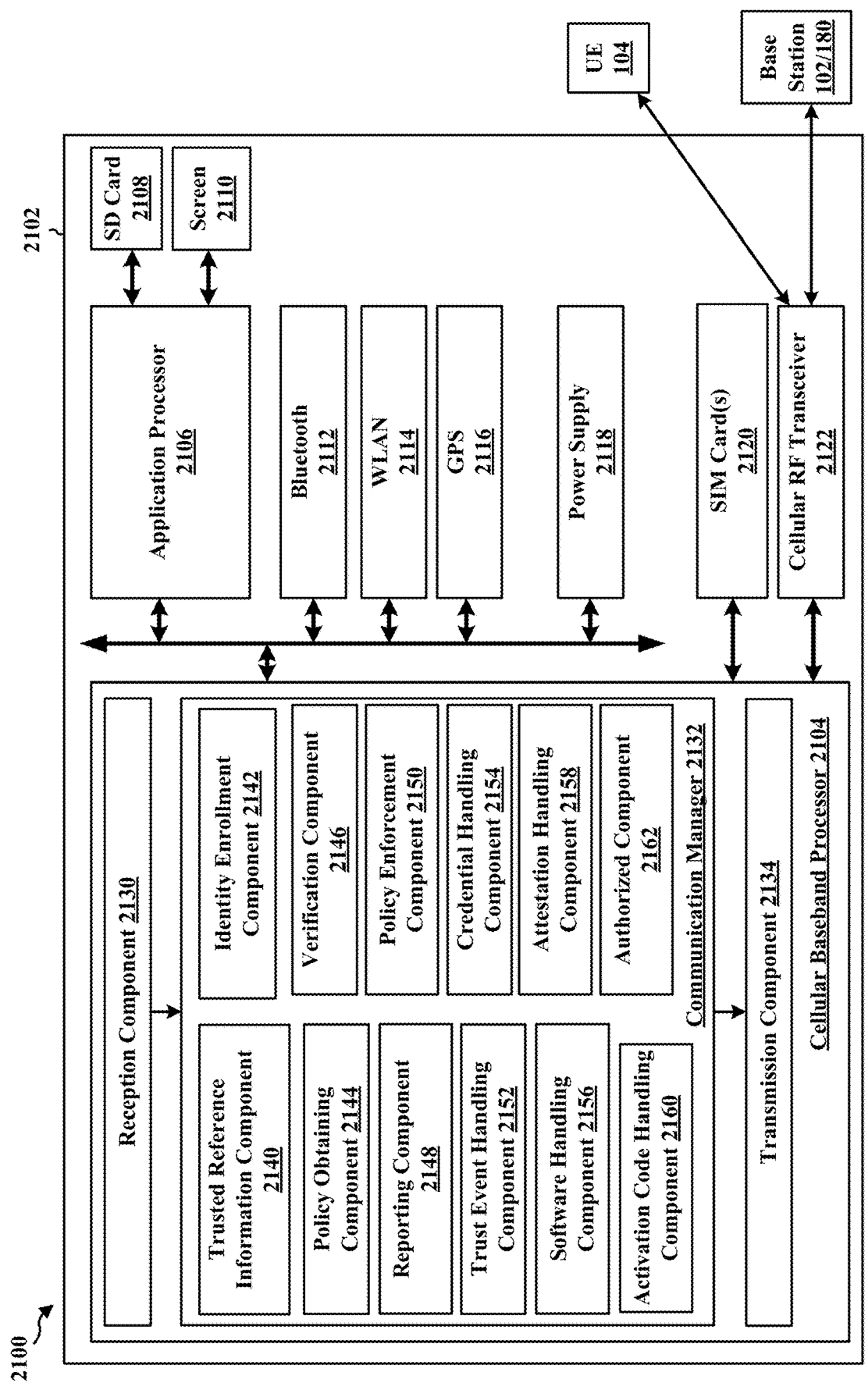
FIG. 21 is a diagram illustrating an example of a hardware implementation for an example apparatus, in accordance with the teachings disclosed herein.

FIG. 21 is a diagram 2100 illustrating an example of a hardware implementation for an apparatus 2102. The apparatus 2102 may be a UE, a component of a UE, or may implement UE functionality. In some aspects, the apparatus 2102 may include a cellular baseband processor 2104 (also referred to as a modem) coupled to a cellular RF transceiver 2122. In some aspects, the apparatus 2102 may further include one or more subscriber identity modules (SIM) cards 2120, an application processor 2106 coupled to a secure digital (SD) card 2108 and a screen 2110, a Bluetooth module 2112, a wireless local area network (WLAN) module 2114, a Global Positioning System (GPS) module 2116, or a power supply 2118. The cellular baseband processor 2104 communicates through the cellular RF transceiver 2122 with the UE 104 and/or base station 102/180. The cellular baseband processor 2104 may include a computer-readable medium/memory. The computer-readable medium/ memory may be non-transitory. The cellular baseband processor 2104 is responsible for general processing, including the execution of software stored on the computer-readable medium/memory. The software, when executed by the cellular baseband processor 2104, causes the cellular baseband processor 2104 to perform the various functions described supra. The computer-readable medium/memory may also be used for storing data that is manipulated by the cellular baseband processor 2104 when executing software. The cellular baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the cellular baseband processor 2104. The cellular baseband processor 2104 may be a component of the UE 350 and may include the memory 360 and/or at least one of the TX processor 368, the RX processor 356, and the controller/processor 359. In one configuration, the apparatus 2102 may be a modem chip and include just the cellular baseband processor 2104, and in another configuration, the apparatus 2102 may be the entire UE (e.g., see the UE 350 of FIG. 3) and include the additional modules of the apparatus 2102.

The communication manager 2132 includes a trusted reference information component 2140 that is configured to receive trusted reference information for the network endpoint based on enrolling the network endpoint, for example, as described in connection with 1504 of FIGS. 15 and/or 1610 of FIG. 16. The example trusted reference information component 2140 may also be configured to receive trusted reference information for the network endpoint based on enrolling the network endpoint, for example, as described in connection with 2004 of FIG. 20.

The communication manager 2132 also includes an identity enrollment component 2142 that is configured to enroll a network endpoint with a network managed by the network manager, for example, as described in connection with 1502 of FIGS. 15 and/or 1602 of FIG. 16. The example identity enrollment component 2142 may also be configured to transmit a credential request to the network endpoint after performing the verification of the network endpoint, for example, as described in connection with 1604 of FIG. 16. The example identity enrollment component 2142 may also be configured to receive a credential response from the network endpoint, for example, as described in connection with 1606 of FIG. 16. The example identity enrollment component 2142 may also be configured to transmit a credential enrollment response to the network endpoint when the device identifier is enrolled with the network manager, for example, as described in connection with 1608 of FIG. 16. The example identity enrollment component 2142 may also be configured to enroll a network endpoint with a network managed by the network manager, for example, as described in connection with 2002 of FIG. 20.

The communication manager 2132 also includes a policy obtaining component 2144 that is configured to obtain a policy for managing the network endpoint, for example, as described in connection with 1612 of FIG. 16.

The communication manager 2132 also includes a verification component 2146 that is configured to perform verification of the network endpoint based on at least one of the trusted reference information received from the one or more trusted third parties, or an attestation received from the network endpoint, for example, as described in connection with 1506 of FIGS. 15 and/or 1614 of FIG. 16. The example verification component 2146 may also be configured to receive an attestation for the network endpoint, for example, as described in connection with 1616 of FIG. 16. The example verification component 2146 may also be configured to determine a verification result based on the attestation and the trusted reference information, for example, as described in connection with 1618 of FIG. 16. The example verification component 2146 may also be configured to perform user verification of a user of the network endpoint, for example, as described in connection with 1620 of FIG. 16. The example verification component 2146 may also be configured to perform user verification of a user of the network endpoint, for example, as described in connection with 1906 of FIG. 19. The example verification component 2146 may also be configured to query the network endpoint for device information in accordance with a network manager policy enforced by the network manager, for example, as described in connection with 2006 of FIG. 20.

The communication manager 2132 also includes a reporting component 2148 that is configured to report a verification result to at least one trusted third party, for example, as described in connection with 1622 of FIG. 16.

The communication manager 2132 also includes a policy enforcement component 2150 that is configured to enforce policies to the network endpoint based on a result of the verification, for example, as described in connection with 1508 of FIGS. 15 and/or 1624 of FIG. 16. The example policy enforcement component 2150 may also be configured to perform one or more trust event remedies in accordance with the network manager policy when a trust event occurs, for example, as described in connection with 2008 of FIG. 20.

The communication manager 2132 also includes a trust event handling component 2152 that is configured to resolve an occurrence of a trust event, for example, as described in connection with 1626 of FIG. 16. The example trust event handling component 2152 may also be configured to provide a notification of the trust event to a network system or an edge component, for example, as described in connection with 1628 of FIG. 16.

The communication manager 2132 also includes a credential handling component 2154 that is configured to receive a temporary credential from a network endpoint, for example, as described in connection with 1702 of FIG. 17. The example credential handling component 2154 may also be configured to determine validity of the temporary credential, for example, as described in connection with 1704 of FIG. 17. The example credential handling component 2154 may also be configured to provide a temporary credential for the network endpoint to a network manager, for example, as described in connection with 1802 of FIGS. 18 and/or 1902 of FIG. 19.

The communication manager 2132 also includes a software handling component 2156 that is configured to receive a software update from a first trusted third party for the network endpoint, for example, as described in connection with 1706 of FIG. 17. The example software handling component 2156 may also be configured to provide the software update to the network endpoint, for example, as described in connection with 1708 of FIG. 17. The example software handling component 2156 may also be configured to verify that the software update completed successfully, for example, as described in connection with 1718 of FIG. 17. The example software handling component 2156 may also be configured to receive a software update from a first trusted third party via the network manager, for example, as described in connection with 1910 of FIG. 19. The example software handling component 2156 may also be configured to perform software update, for example, as described in connection with 1916 of FIG. 19.

The communication manager 2132 also includes an attestation handling component 2158 that is configured to receive an attestation from the network endpoint, for example, as described in connection with 1710 of FIG. 17. The example attestation handling component 2158 may also be configured to provide an indication of the attestation to the first trusted third party, for example, as described in connection with 1712 of FIG. 17. The example attestation handling component 2158 may also be configured to provide an attestation including a result of the user verification to the network manager, for example, as described in connection with 1908 of FIG. 19. The example attestation handling component 2158 may also be configured to provide an attestation to the network manager, for example, as described in connection with 1912 of FIG. 19.

The communication manager 2132 also includes an activation code handling component 2160 that is configured to receive a software activation code from the first trusted third party, for example, as described in connection with 1714 of FIG. 17. The example activation code handling component 2160 may also be configured to provide the software activation code to the endpoint, for example, as described in connection with 1716 of FIG. 17. The example activation code handling component 2160 may also be configured to receive a software activation code, for example, as described in connection with 1914 of FIG. 19.

The communication manager 2132 also includes an authorized component 2162 that is configured to receive access or authorization for services or resources from the network manager, for example, as described in connection with 1804 of FIGS. 18 and/or 1904 of FIG. 19.

The apparatus may include additional components that perform each of the blocks of the algorithm in the flowcharts of FIGS. 15 to 20. As such, each block in the flowcharts of FIGS. 15 to 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2102 may include a variety of components configured for various functions. In one configuration, the apparatus 2102, and in particular the cellular baseband processor 2104, includes means for enrolling a network endpoint with a network managed by the network manager. The example apparatus 2102 also includes means for receiving trusted reference information for the network endpoint based on enrolling the network endpoint. The example apparatus 2102 also includes means for performing verification of the network endpoint based on at least one of the trusted reference information, or an attestation received from the network endpoint. The example apparatus 2102 also includes means for enforcing policies to the network endpoint based on a result of the verification.

In another configuration, the example apparatus 2102 also includes means for receiving the attestation for the network endpoint. The example apparatus 2102 also includes means for determining a verification result based on the attestation and the trusted reference information.

In another configuration, the example apparatus 2102 also includes means for receiving the trusted reference information per network endpoint in communication with the network manager.

In another configuration, the example apparatus 2102 also includes means for receiving the trusted reference information for a set of network endpoints in communication with the network manager.

In another configuration, the example apparatus 2102 also includes means for performing the verification of the network endpoint periodically, on-demand, or in response to an occurrence of a triggering event.

In another configuration, the example apparatus 2102 also includes means for reporting a verification result to at least one trusted third party.

In another configuration, the example apparatus 2102 also includes means for monitoring connection health for the network endpoint. The example apparatus 2102 also includes means for monitoring device health of the network endpoint.

In another configuration, the example apparatus 2102 also includes means for modifying network access controls of the network endpoint. The example apparatus 2102 also includes means for limiting functional capabilities of the network endpoint. The example apparatus 2102 also includes means for adjusting QoS levels of the network endpoint. The example apparatus 2102 also includes means for forcing a software update of the network endpoint.

In another configuration, the example apparatus 2102 also includes means for receiving a software update from a trusted third party for the network endpoint. The example apparatus 2102 also includes means for providing the software update to the network endpoint based on the verification for the network endpoint. The example apparatus 2102 also includes means for verifying that the software update completed successfully on the network endpoint based on a second attestation from the network endpoint.

In another configuration, the example apparatus 2102 also includes means for performing user verification of a user of the network endpoint. The example apparatus 2102 also includes means for controlling user access to a service or resource based on the user verification.

In another configuration, the example apparatus 2102 also includes means for receiving device attestation including a user verification result from the network endpoint.

In another configuration, the example apparatus 2102 also includes means for transmitting a credential request to the network endpoint after performing the verification of the network endpoint. The example apparatus 2102 also includes means for receiving a credential response from the network endpoint. The example apparatus 2102 also includes means for transmitting a credential enrollment response to the network endpoint when a device identifier is enrolled with the network manager, where the network manager receives the trusted reference information for the network endpoint from one or more trusted third parties after enrolling the device identifier of the network endpoint.

In another configuration, the example apparatus 2102 also includes means for retrieving a policy from one or more trusted third parties for enforcing against the network endpoint using an attestation verifier associated with the network endpoint.

The means may be one or more of the components of the apparatus 2102 configured to perform the functions recited by the means. As described supra, the apparatus 2102 may include the TX processor 368, the RX processor 356, and the controller/processor 359. As such, in one configuration, the means may be the TX processor 368, the RX processor 356, and the controller/processor 359 configured to perform the functions recited by the means.

Figure 22:
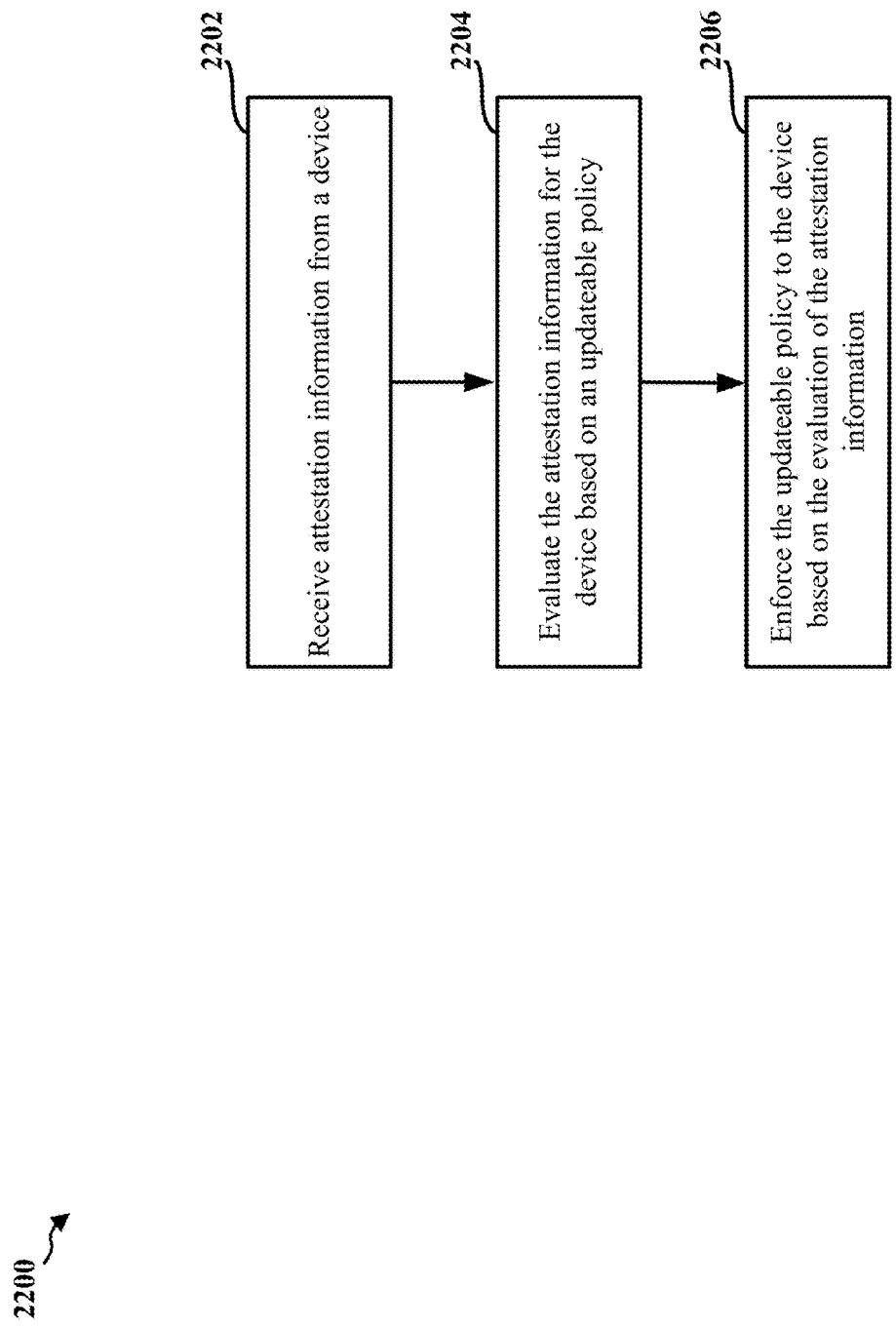
FIG. 22 is a flowchart of a method of performing access management at a first device, in accordance with the teachings disclosed herein.

FIG. 22 is a flowchart 2200 of a method of access management. The method may be performed by a trust agent (e.g., the UE 104, the agent 1306, and/or the agent 1406; the apparatus 2602). The method may facilitate improving access management of services or resources based on attestation results.

At 2202, the trust agent receives attestation information from a device requesting access to services or resources provided by a service managing entity, as described in connection with the attestation information 1412 of FIG. 14. The receiving of the attestation information, at 2202, may be performed by an attestation receiving component 2640 of the apparatus 2602 of FIG. 26. In some examples, the attestation information may include at least one of user attestable information, device attestable information, or network attestable information.

In some examples, the attestation information may include first attestable information that is associated with or managed by a first verification entity and second attestable information that is associated with or managed by a second verification entity. In some examples, the first verification entity and the second verification entity may be the same verification entity. In some examples, the first verification entity may be different than the second verification entity.

In some examples, the first verification entity may include the trust agent. In some examples, the trust agent may determine a verification result associated with the first attestable information based on reference information. In some examples, the trust agent may determine a verification result associated with the first attestable information based on a measurement.

In some examples, the first verification entity may include a trusted third party different than the trust agent. In some examples, the trust agent may receive a verification result associated with the first attestable information from the trusted third party. In some examples, the trust agent may provide the first attestable information to the trusted third party, and the trust agent may receive a verification result associated with the first attestable information from the trusted third party.

At 2204, the trust agent evaluates the attestation information for the device based on an updateable policy, as described in connection with 1424 of FIG. 14. The evaluating of the attestation information, at 2204, may be performed by an evaluation component 2642 of the apparatus 2602 of FIG. 26.

In some examples, the trust agent may evaluate the attestation information for the device based on one or more verification results associated with respective attestable information of the attestation information and the updateable policy. In some examples, the trust agent may evaluate the attestation information for the device based on one or more verification results associated with a subset of attestable information of the attestation information and the updateable policy. In some examples, the subset of attestable information may include information relevant to a situation, such as one or more of an operational purpose associated with the device, a trust level associated with the device, and/or a life-cycle state associated with the device. For example, after enrollment, the network manager may use device manufacturer information to verify that the device is not cloned and may forego using real-time attestation information (e.g., does the device have a root of trust, how long since the last boot-up, etc.) until a later time. In some examples, the evaluation of the verification results may be based on attestable parameters provided by the service managing entity via the updateable policy.

In some examples, the trust agent may evaluate the attestation information for the device periodically. In some examples, the trust agent may evaluate the attestation information for the device in response to an occurrence of a triggering event.

At 2206, the trust agent enforces the updateable policy to the device for the services or resources provided by the service managing entity based on the evaluation of the attestation information, as described in connection with 1428 of FIG. 14. The enforcing of the policy to the device, at 2206, may be performed by a policy enforcement component 2644 of the apparatus 2602 of FIG. 26. In some examples, enforcing the policy to the device may include enforcing a set of actions. In some examples, the set of actions may include one or more actions of the updateable policy selected based on a device trust score and a trust score threshold. In some examples, the device trust score may be based on an evaluation of verification results associated with the attestation information. In some examples, the device trust score may be based on an evaluation of the updateable policy to the verification results.

In some examples, the trust agent may enforce the set of actions to the device or the trust agent may cause the device to enforce the set of actions to the device. In some examples, the trust agent may enforce a first subset of actions of the set of actions to the device and the trust agent may cause the device to enforce a second subset of actions of the set of actions to the device. In some examples, the trust agent may cause one or more trusted third parties to enforce at least one action of the set of actions to the device.

In some examples, the set of actions may be associated with a first level of access to the services when the device trust score for the device is greater than or equal to the trust score threshold, and the set of actions may be associated with a second level of access to the services when the device trust score is less than the trust score threshold. In some such examples, second level of access may be different than the first level of access.

In some examples, the set of actions may be associated with a first level of priority to the services when the device trust score for the device is greater than or equal to the trust score threshold, and the set of actions is may be associated with a second level of priority to the services when the device trust score for the device is less than the trust score threshold. In some such examples, the second level of priority may be less than the first level of priority.

Figure 23:
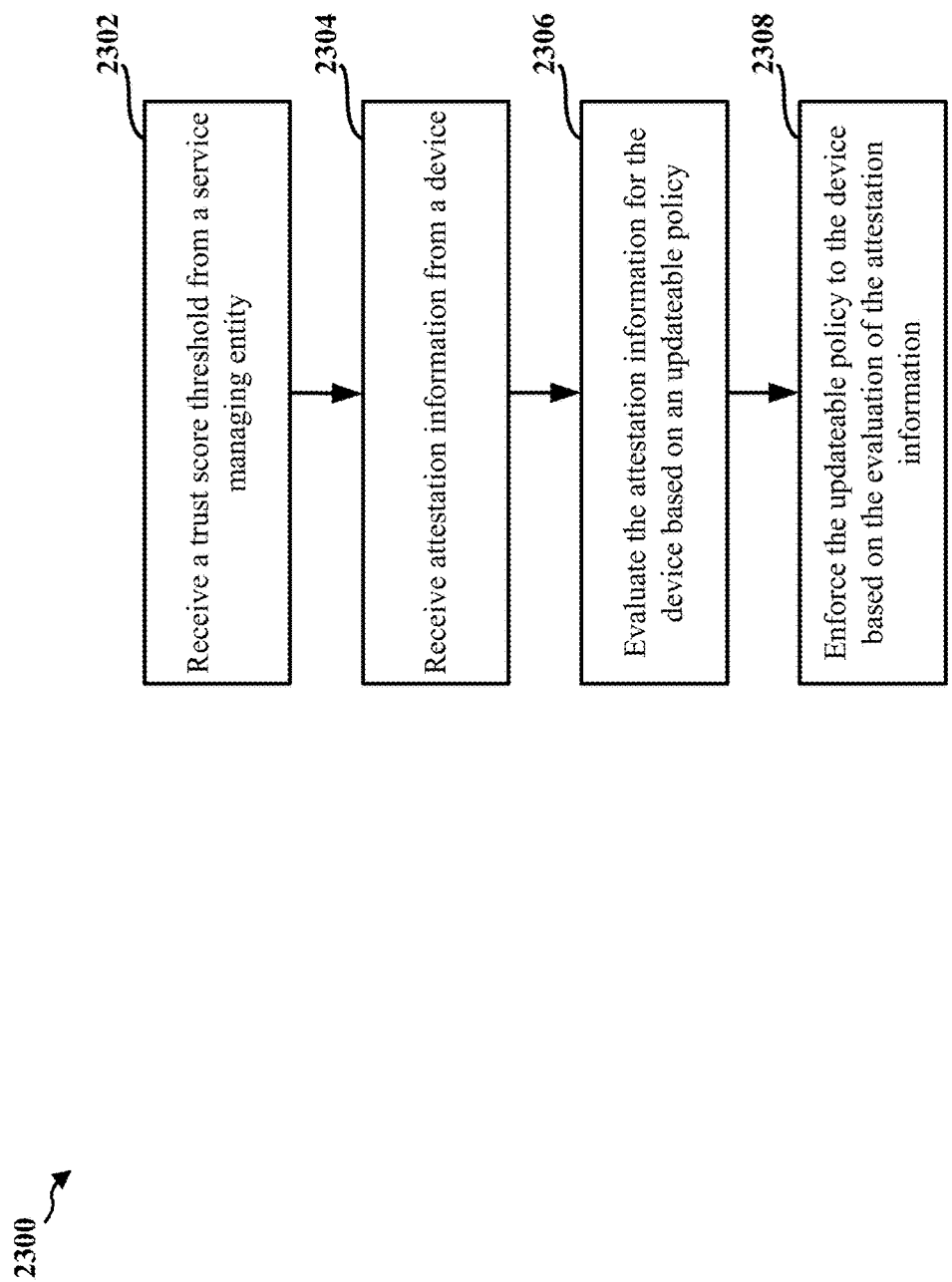
FIG. 23 is a flowchart of a method of performing access management at a first device, in accordance with the teachings disclosed herein.

FIG. 23 is a flowchart 2300 of a method of access management. The method may be performed by a trust agent (e.g., the UE 104, the agent 1306, and/or the agent 1406; the apparatus 2602). The method may facilitate improving access management of services or resources based on attestation results.

At 2302, the trust agent may receive a trust score threshold from a service managing entity via the updatable policy, as described in connection with the policy 1410 of FIG. 14. The receiving of the trust score threshold, at 2302, may be performed by a policy receiving component 2646 of the apparatus 2602 of FIG. 26.

At 2304, the trust agent receives attestation information from a device requesting access to services or resources provided by a service managing entity, as described in connection with the attestation information 1412 of FIG. 14. The receiving of the attestation information, at 2304, may be performed by an attestation receiving component 2640 of the apparatus 2602 of FIG. 26. In some examples, the attestation information may include at least one of user attestable information, device attestable information, or network attestable information.

In some examples, the attestation information may include first attestable information that is associated with or managed by a first verification entity and second attestable information that is associated with or managed by a second verification entity. In some examples, the first verification entity and the second verification entity may be the same verification entity. In some examples, the first verification entity may be different than the second verification entity.

In some examples, the first verification entity may include the trust agent. In some examples, the trust agent may determine a verification result associated with the first attestable information based on reference information. In some examples, the trust agent may determine a verification result associated with the first attestable information based on a measurement.

In some examples, the first verification entity may include a trusted third party different than the trust agent. In some examples, the trust agent may receive a verification result associated with the first attestable information from the trusted third party. In some examples, the trust agent may provide the first attestable information to the trusted third party, and the trust agent may receive a verification result associated with the first attestable information from the trusted third party.

At 2306, the trust agent evaluates the attestation information for the device based on an updateable policy, as described in connection with 1424 of FIG. 14. The evaluating of the attestation information, at 2306, may be performed by an evaluation component 2642 of the apparatus 2602 of FIG. 26.

In some examples, the trust agent may evaluate the attestation information for the device based on one or more verification results associated with respective attestable information of the attestation information and the updateable policy. In some examples, the trust agent may evaluate the attestation information for the device based on one or more verification results associated with a subset of attestable information of the attestation information and the updateable policy. In some examples, the evaluation of the verification results may be based on attestable parameters provided by the service managing entity via the updateable policy.

In some examples, the trust agent may evaluate the attestation information for the device periodically. In some examples, the trust agent may evaluate the attestation information for the device in response to an occurrence of a triggering event.

At 2308, the trust agent enforces the updateable policy to the device for the services or resources provided by the service managing entity based on the evaluation of the attestation information, as described in connection with 1428 of FIG. 14. The enforcing of the policy to the device, at 2308, may be performed by a policy enforcement component 2644 of the apparatus 2602 of FIG. 26. In some examples, enforcing the policy to the device may include enforcing a set of actions. In some examples, the set of actions may include one or more actions of the updateable policy selected based on a device trust score and a trust score threshold. In some examples, the device trust score may be based on an evaluation of verification results associated with the attestation information. In some examples, the device trust score may be based on an evaluation of the updateable policy to the verification results.

In some examples, the trust agent may enforce the set of actions to the device or the trust agent may cause the device to enforce the set of actions to the device. In some examples, the trust agent may enforce a first subset of actions of the set of actions to the device and the trust agent may cause the device to enforce a second subset of actions of the set of actions to the device. In some examples, the trust agent may cause one or more trusted third parties to enforce at least one action of the set of actions to the device.

In some examples, the set of actions may be associated with a first level of access to the services when the device trust score for the device is greater than or equal to the trust score threshold, and the set of actions may be associated with a second level of access to the services when the device trust score is less than the trust score threshold. In some such examples, second level of access may be different than the first level of access.

In some examples, the set of actions may be associated with a first level of priority to the services when the device trust score for the device is greater than or equal to the trust score threshold, and the set of actions is may be associated with a second level of priority to the services when the device trust score for the device is less than the trust score threshold. In some such examples, the second level of priority may be less than the first level of priority.

Figure 24:
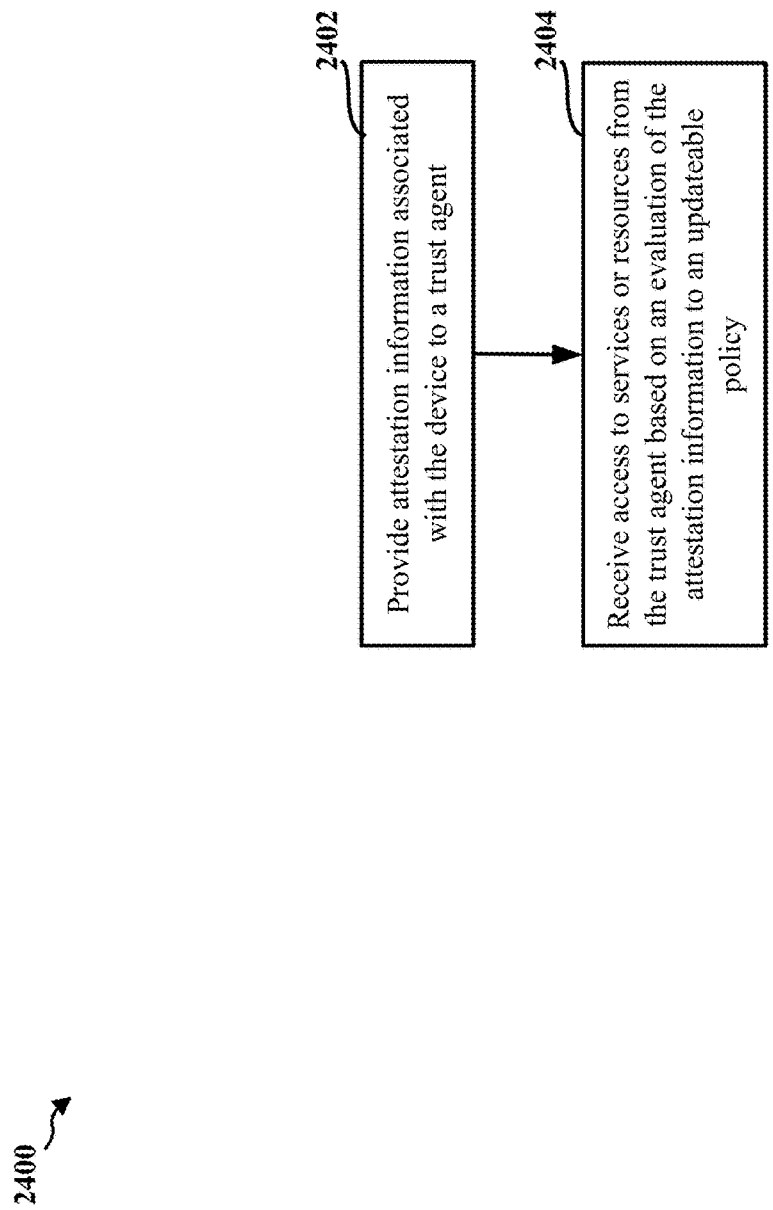
FIG. 24 is a flowchart of a method of access management at a device, in accordance with the teachings disclosed herein.

FIG. 24 is a flowchart 2400 of a method of access management. The method may be performed by a device (e.g., the user device 103, the UE 104, the device 1302, and/or the device 1402; the apparatus 2602). The method may facilitate improving access management of services or resources based on attestation results.

At 2402, the device provides attestation information associated with the device to a trust agent when requesting access to services or resources provided by a service managing entity, as described in connection with the attestation information 1412 of FIG. 14. The providing of the attestation information, at 2402, may be performed by an attestation providing component 2648 of the apparatus 2602 of FIG. 26.

In some examples, the attestation information may include at least one of user attestable information, device attestable information, or network attestable information. In some examples, the attestation information may include first attestable information that is associated with or managed by a first verification entity and second attestable information that is associated with or managed by a second verification entity.

At 2404, the device receives access to the services or resources provided by the service managing entity from the trust agent based on an evaluation of the attestation information to an updateable policy, as described in connection with 1428 of FIG. 14. The receiving of access to the services or resources, at 2404, may be performed by an access handling component 2650 of the apparatus 2602 of FIG. 26.

Figure 25:
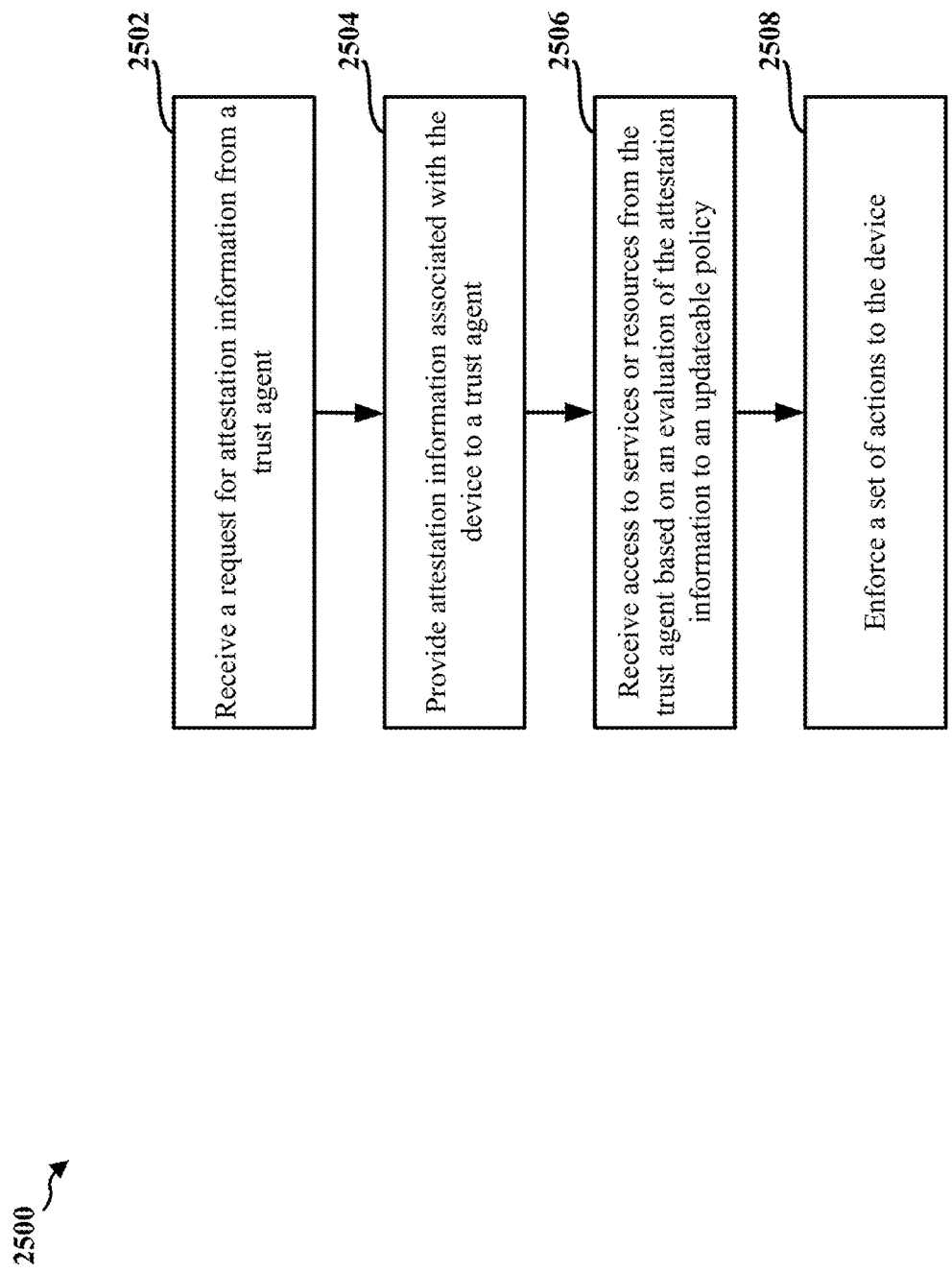
FIG. 25 is a flowchart of a method of access management at a device, in accordance with the teachings disclosed herein.

FIG. 25 is a flowchart 2500 of a method of access management. The method may be performed by a device (e.g., the user device 103, the UE 104, the device 1302, and/or the device 1402; the apparatus 2602). The method may facilitate improving access management of services or resources based on attestation results.

At 2504, the device provides attestation information associated with the device to a trust agent when requesting access to services or resources provided by a service managing entity, as described in connection with the attestation information 1412 of FIG. 14. The providing of the attestation information, at 2504, may be performed by an attestation providing component 2648 of the apparatus 2602 of FIG. 26.

In some examples, the attestation information may include at least one of user attestable information, device attestable information, or network attestable information. In some examples, the attestation information may include first attestable information that is associated with or managed by a first verification entity and second attestable information that is associated with or managed by a second verification entity.

In some examples, the device may, at 2502, receive a request for the attestation information, as described in connection with 1430 of FIG. 14. In some examples, the device may receive the request for the attestation information from the trust agent periodically. In some examples, the device may receive the request for the attestation information from the trust agent in response to an occurrence of a triggering event. The receiving of the request for the attestation information, at 2502, may be performed by the attestation providing component 2648 of the apparatus 2602 of FIG. 26.

At 2506, the device receives access to the services or resources provided by the service managing entity from the trust agent based on an evaluation of the attestation information to an updateable policy, as described in connection with 1428 of FIG. 14. The receiving of access to the services or resources, at 2506, may be performed by an access handling component 2650 of the apparatus 2602 of FIG. 26.

At 2508, the device may enforce a set of actions to the device, as described in connection with 1428 of FIG. 14. In some such examples, the set of actions may be based on the evaluation of the attestation information to the updateable policy. In some examples, the trust agent may cause the device to enforce the set of actions to the device. The enforcing of the set of actions to the device, at 2508, may be performed by a policy enforcement component 2644 of the apparatus 2602 of FIG. 26.

Figure 26:
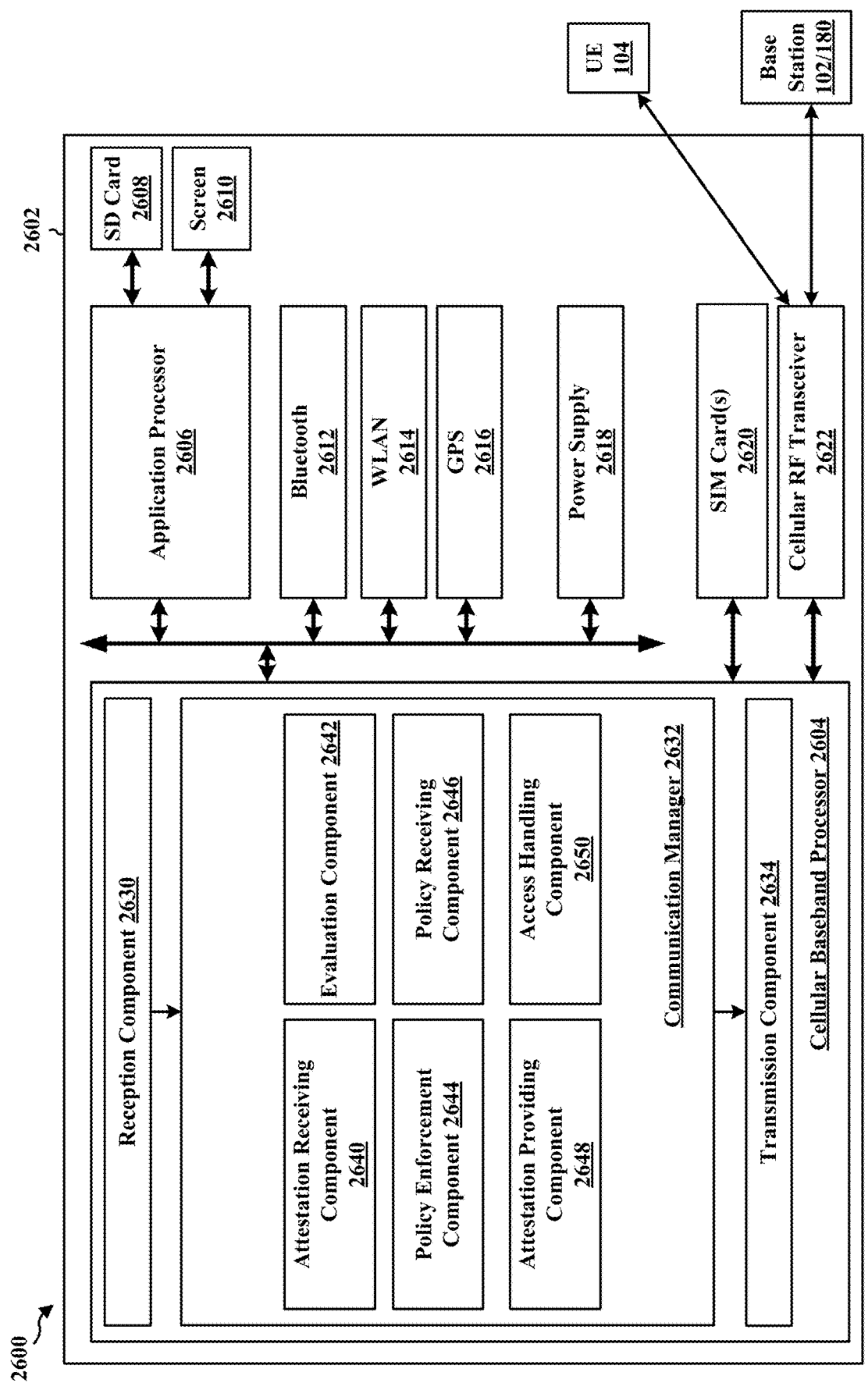
FIG. 26 is a diagram illustrating an example of a hardware implementation for an example apparatus, in accordance with the teachings disclosed herein.

FIG. 26 is a diagram 2600 illustrating an example of a hardware implementation for an apparatus 2602. The apparatus 2602 may be a UE, a component of a UE, or may implement UE functionality. In some aspects, the apparatus 2602 may include a cellular baseband processor 2604 (also referred to as a modem) coupled to a cellular RF transceiver 2622. In some aspects, the apparatus 2602 may further include one or more subscriber identity modules (SIM) cards 2620, an application processor 2606 coupled to a secure digital (SD) card 2608 and a screen 2610, a Bluetooth module 2612, a wireless local area network (WLAN) module 2614, a Global Positioning System (GPS) module 2616, or a power supply 2618. The cellular baseband processor 2604 communicates through the cellular RF transceiver 2622 with the UE 104 and/or base station 102/180. The cellular baseband processor 2604 may include a computer-readable medium/memory. The computer-readable medium/memory may be non-transitory. The cellular baseband processor 2604 is responsible for general processing, including the execution of software stored on the computer-readable medium/memory. The software, when executed by the cellular baseband processor 2604, causes the cellular baseband processor 2604 to perform the various functions described supra. The computer-readable medium/memory may also be used for storing data that is manipulated by the cellular baseband processor 2604 when executing software. The cellular baseband processor 2604 further includes a reception component 2630, a communication manager 2632, and a transmission component 2634. The communication manager 2632 includes the one or more illustrated components. The components within the communication manager 2632 may be stored in the computer-readable medium/memory and/or configured as hardware within the cellular baseband processor 2604. The cellular baseband processor 2604 may be a component of the UE 350 and may include the memory 360 and/or at least one of the TX processor 368, the RX processor 356, and the controller/processor 359. In one configuration, the apparatus 2602 may be a modem chip and include just the cellular baseband processor 2604, and in another configuration, the apparatus 2602 may be the entire UE (e.g., see the UE 350 of FIG. 3) and include the additional modules of the apparatus 2602.

The communication manager 2632 includes an attestation receiving component 2640 that is configured to receive attestation information from a device, for example, as described in connection with 2202 of FIGS. 22 and/or 2304 of FIG. 23.

The communication manager 2632 also includes an evaluation component 2642 that is configured to evaluate the attestation information for the device based on an updateable policy, for example, as described in connection with 2204 of FIGS. 22 and/or 2306 of FIG. 23.

The communication manager 2632 also includes a policy enforcement component 2644 that is configured to enforce the updateable policy to the device based on the evaluation of the attestation information, for example, as described in connection with 2206 of FIGS. 22 and/or 2308 of FIG. 23. The example policy enforcement component 2644 may also be configured to enforce a set of actions to the device, for example, as described in connection with 2508 of FIG. 25.

The communication manager 2632 also includes a policy receiving component 2646 that is configured to receive a trust score threshold from a service managing entity, for example, as described in connection with 2302 of FIG. 23.

The communication manager 2632 also includes an attestation providing component 2648 that is configured to provide attestation information associated with the device to a trust agent, for example, as described in connection with 2402 of FIGS. 24 and/or 2504 of FIG. 25. The example attestation providing component 2648 may also be configured to receive a request for attestation information from a trust agent, for example, as described in connection with 2502 of FIG. 25.

The communication manager 2632 also includes an access handling component 2650 that is configured to receive access to services or resources from the trust agent based on an evaluation of the attestation information to an updateable policy, for example, as described in connection with 2404 of FIGS. 24 and/or 2506 of FIG. 25.

The apparatus may include additional components that perform each of the blocks of the algorithm in the flowcharts of FIGS. 22 to 25. As such, each block in the flowcharts of FIGS. 22 to 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2602 may include a variety of components configured for various functions. In one configuration, the apparatus 2602, and in particular the cellular baseband processor 2604, includes means for receiving attestation information from a device requesting access to services or resources provided by a service managing entity. The example apparatus 2602 also includes means for evaluating the attestation information for the device based on an updateable policy. The example apparatus 2602 also includes means for enforcing the updateable policy to the device for the services or the resources provided by the service managing entity based on evaluation of the attestation information.

In another configuration, the example apparatus 2602 also includes means for evaluating the attestation information for the device based on one or more verification results associated with respective attestable information of the attestation information and the updateable policy.

In another configuration, the example apparatus 2602 also includes means for evaluating the attestation information for the device based on one or more verification results associated with a subset of attestable information of the attestation information and the updateable policy.

In another configuration, the example apparatus 2602 also includes means for evaluating the one or more verification results based on attestable parameters provided by the service managing entity via the updateable policy.

In another configuration, the example apparatus 2602 also includes means for enforcing a set of actions, wherein the set of actions comprises one or more actions of the updateable policy selected based on a device trust score and a trust score threshold.

In another configuration, the example apparatus 2602 also includes means for receiving the trust score threshold from the service managing entity via the updateable policy.

In another configuration, the example apparatus 2602 also includes means for enforcing the set of actions to the device.

In another configuration, the example apparatus 2602 also includes means for enforcing a first subset of actions of the set of actions to the device. The example apparatus 2602 also includes means for causing the device to enforce a second subset of actions of the set of actions to the device.

In another configuration, the example apparatus 2602 also includes means for causing one or more trusted third parties to enforce at least one action of the set of actions to the device.

The means may be one or more of the components of the apparatus 2602 configured to perform the functions recited by the means. As described supra, the apparatus 2602 may include the TX processor 368, the RX processor 356, and the controller/processor 359. As such, in one configuration, the means may be the TX processor 368, the RX processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for trust management at a network manager including at least one processor coupled to a memory and configured to enroll a network endpoint with a network managed by the network manager; receive trusted reference information for the network endpoint based on enrolling the network endpoint; perform verification of the network endpoint based on at least one of the trusted reference information, or an attestation received from the network endpoint; and enforce policies to the network endpoint based on a result of the verification.

Aspect 2 is the apparatus of aspect 1, further including that to perform the verification of the network endpoint, the memory and the at least one processor configured to: receive the attestation for the network endpoint; and determine a verification result based on the attestation and the trusted reference information.

Aspect 3 is the apparatus of any of aspects 1 and 2, further including that the memory and the at least one processor are configured to receive the trusted reference information per network endpoint in communication with the network manager.

Aspect 4 is the apparatus of any of aspects 1 to 3, further including that the memory and the at least one processor are configured to receive the trusted reference information for a set of network endpoints in communication with the network manager.

Aspect 5 is the apparatus of any of aspects 1 to 4, further including that the memory and the at least one processor are configured to perform the verification of the network endpoint periodically, on-demand, or in response to an occurrence of a triggering event.

Aspect 6 is the apparatus of any of aspects 1 to 5, further including that the memory and the at least one processor are further configured to: report a verification result to at least one trusted third party.

Aspect 7 is the apparatus of any of aspects 1 to 6, further including that to enforce the policies to the network endpoint, the memory and the at least one processor are configured to: monitor connection health for the network endpoint; and monitor device health of the network endpoint.

Aspect 8 is the apparatus of any of aspects 1 to 7, further including that the policies include trust event remedies, and to enforce the trust event remedies, the memory and the at least one processor are configured to: modify network access controls of the network endpoint, limit functional capabilities of the network endpoint, adjust QoS levels of the network endpoint, or force a software update of the network endpoint.

Aspect 9 is the apparatus of any of aspects 1 to 8, further including that the memory and the at least one processor are further configured to: receive a software update from a trusted third party for the network endpoint; provide the software update to the network endpoint based on the verification for the network endpoint; and verify that the software update completed successfully on the network endpoint based on a second attestation from the network endpoint.

Aspect 10 is the apparatus of any of aspects 1 to 9, further including that the memory and the at least one processor are configured to: perform user verification of a user of the network endpoint; and control user access to a service or resource based on the user verification.

Aspect 11 is the apparatus of any of aspects 1 to 10, further including that to perform the user verification, the memory and the at least one processor are configured to: receive device attestation including a user verification result from the network endpoint.

Aspect 12 is the apparatus of any of aspects 1 to 11, further including that the memory and the at least one processor are further configured to: transmit a credential request to the network endpoint after performing the verification of the network endpoint; receive a credential response from the network endpoint; and transmit a credential enrollment response to the network endpoint when a device identifier is enrolled with the network manager, where the network manager receives the trusted reference information for the network endpoint from one or more trusted third parties after enrolling the device identifier of the network endpoint.

Aspect 13 is the apparatus of any of aspects 1 to 12, further including that the memory and the at least one processor are configured to: retrieve a policy from one or more trusted third parties for managing the network endpoint using an attestation verifier associated with the network endpoint, wherein managing the network endpoint is based in part on the policy, a trust level associated with the network endpoint, and an operational purpose associated with the network endpoint.

Aspect 14 is the apparatus of any of aspects 1 to 13, further including a transceiver coupled to the at least one processor.

Aspect 15 is a method of wireless communication for implementing any of aspects 1 to 14.

Aspect 16 is an apparatus for wireless communication including means for implementing any of aspects 1 to 14.

Aspect 17 is a non-transitory computer-readable storage medium storing computer executable code, where the code, when executed, causes a processor to implement any of aspects 1 to 14.

Aspect 18 is an apparatus for access management at a trust agent including at least one processor coupled to a memory and configured to receive attestation information from a device requesting access to services or resources provided by a service managing entity; evaluate the attestation information for the device based on an updateable policy; and enforce the updateable policy to the device for the services or the resources provided by the service managing entity based on evaluation of the attestation information.

Aspect 19 is the apparatus of aspect 18, further including that the attestation information includes first attestable information that is associated with or managed by a first verification entity and second attestable information that is associated with or managed by a second verification entity.

Aspect 20 is the apparatus of any of aspects 18 and 19, further including that the first verification entity includes the trust agent.

Aspect 21 is the apparatus of any of aspects 18 to 19, further including that the first verification entity includes a trusted third party different than the trust agent.

Aspect 22 is the apparatus of any of aspects 18 to 21, further including that the memory and the at least one processor are configured to evaluate the attestation information for the device based on one or more verification results associated with respective attestable information of the attestation information and the updateable policy.

Aspect 23 is the apparatus of any of aspects 18 to 22, further including that the memory and the at least one processor are configured to evaluate the attestation information for the device based on one or more verification results associated with a subset of attestable information of the attestation information and the updateable policy.

Aspect 24 is the apparatus of any of aspects 18 to 23, further including that the memory and the at least one processor are configured to evaluate the one or more verification results based on attestable parameters provided by the service managing entity via the updateable policy.

Aspect 25 is the apparatus of any of aspects 18 to 24, further including that to enforce the updateable policy to the device, the memory and the at least one processor are configured to: enforce a set of actions, where the set of actions comprises one or more actions of the updateable policy selected based on a device trust score and a trust score threshold.

Aspect 26 is the apparatus of any of aspects 18 to 25, further including that the memory and the at least one processor are further configured to: receive the trust score threshold from the service managing entity via the updateable policy.

Aspect 27 is the apparatus of any of aspects 18 to 26, further including that the device trust score is based on an evaluation of verification results associated with the attestation information.

Aspect 28 is the apparatus of any of aspects 18 to 27, further including that the memory and the at least one processor are configured to enforce the set of actions to the device.

Aspect 29 is the apparatus of any of aspects 18 to 28, further including that the memory and the at least one processor are configured to: enforce a first subset of actions of the set of actions to the device; and cause the device to enforce a second subset of actions of the set of actions to the device.

Aspect 30 is the apparatus of any of aspects 18 to 29, further including that the memory and the at least one processor are configured to: cause one or more trusted third parties to enforce at least one action of the set of actions to the device.

Aspect 31 is the apparatus of any of aspects 18 to 30, further including a transceiver coupled to the at least one processor.

Aspect 32 is a method of wireless communication for implementing any of aspects 18 to 31.

Aspect 33 is an apparatus for wireless communication including means for implementing any of aspects 18 to 31.

Aspect 34 is a non-transitory computer-readable storage medium storing computer executable code, where the code, when executed, causes a processor to implement any of aspects 18 to 31.

Aspect 35 is an apparatus for trust management at a network manager including at least one processor coupled to a memory and configured to enroll a network endpoint with a network managed by the network manager; receive trusted reference information for the network endpoint from one or more trusted third parties based on enrolling the network endpoint; perform verification of the network endpoint based on at least one of the trusted reference information received from the one or more trusted third parties, or an attestation received from the network endpoint; and enforce policies to the network endpoint based on a result of the verification.

Aspect 36 is the apparatus of aspect 35, further including that the policies include at least one of network access levels or configurations, service access or authorization levels or configurations, QoS levels or configurations, resource access levels or configurations, trust levels or configurations, and trust event remedies.

Aspect 37 is the apparatus of any of aspects 35 and 36, further including that to perform the verification of the network endpoint, the memory and the at least one processor are configured to: receive the attestation for the network endpoint; and determine a verification result based on the attestation and the trusted reference information.

Aspect 38 is the apparatus of any of aspects 35 to 37, further including that the attestation is based on one or more of a device identifier of the network endpoint, a permanent credential of the network endpoint, or device state information of the network endpoint.

Aspect 39 is the apparatus of any of aspects 35 to 38, further including that the memory and the at least one processor are further configured to: store at least one of the device identifier and the permanent credential in a trusted environment of the network endpoint, where information stored in the trusted environment is unalterable.

Aspect 40 is the apparatus of any of aspects 35 to 39, further including that the memory and the at least one processor are further configured to: receive the trusted reference information per network endpoint in communication with the network manager.

Aspect 41 is the apparatus of any of aspects 35 to 40, further including that the memory and the at least one processor are further configured to: receive the trusted reference information for a set of network endpoints in communication with the network manager.

Aspect 42 is the apparatus of any of aspects 35 to 41, further including that the memory and the at least one processor are further configured to: receive the trusted reference information from a verification information service associated with the network endpoint.

Aspect 43 is the apparatus of any of aspects 35 to 42, further including that the memory and the at least one processor are further configured to: perform the verification of the network endpoint periodically, on-demand, or in response to an occurrence of a triggering event.

Aspect 44 is the apparatus of any of aspects 35 to 43, further including that the memory and the at least one processor are further configured to: report a verification result to at least one trusted third party of the one or more trusted third parties.

Aspect 45 is the apparatus of any of aspects 35 to 44, further including that to enforce the policies to the network endpoint, the memory and the at least one processor are configured to: monitor connection health for the network endpoint; and monitor device health of the network endpoint.

Aspect 46 is the apparatus of any of aspects 35 to 45, further including that the policies include trust event remedies comprising one or more of: modifying network access controls of the network endpoint, limiting functional capabilities of the network endpoint, adjusting QoS levels of the network endpoint, or forcing a software update of the network endpoint.

Aspect 47 is the apparatus of any of aspects 35 to 46, further including that the memory and the at least one processor are further configured to: receive a software update from a first trusted third party of the one or more trusted third parties for the network endpoint; provide the software update to the network endpoint based on the verification for the network endpoint; and verify that the software update completed successfully on the network endpoint based on an attestation from the network endpoint.

Aspect 48 is the apparatus of any of aspects 35 to 47, further including that the memory and the at least one processor are further configured to: receive a temporary credential from the network endpoint; and determine validity of the temporary credential based on a permanent credential of the network endpoint known by the network manager.

Aspect 49 is the apparatus of any of aspects 35 to 48, further including that the temporary credential is based on at least one of: a public-private key pair, a public key, a hash of the public key, or an identifier associated with the temporary credential.

Aspect 50 is the apparatus of any of aspects 35 to 49, further including that the memory and the at least one processor are further configured to: receive the software update in response to at least one of: a periodic attestation report, a notification based on a subscription for the network endpoint, or a request from the network manager that includes a temporary credential for the network endpoint.

Aspect 51 is the apparatus of any of aspects 35 to 50, further including that the memory and the at least one processor are further configured to: provide the software update to the network endpoint further based on a verification of a signature of the software update provided by the first trusted third party.

Aspect 52 is the apparatus of any of aspects 35 to 51, further including that the memory and the at least one processor are further configured to: receive an attestation from the network endpoint; provide an indication of the attestation to the first trusted third party; receive a software activation code from the first trusted third party in response to the indication of the attestation; and provide the software activation code to the network endpoint.

Aspect 53 is the apparatus of any of aspects 35 to 52, further including that the memory and the at least one processor are further configured to: perform user verification of a user of the network endpoint; and control user access to a service or resource based on the user verification.

Aspect 54 is the apparatus of any of aspects 35 to 53, further including that to perform user verification, the memory and the at least one processor are configured to: receive device attestation including a user verification result from the network endpoint.

Aspect 55 is the apparatus of any of aspects 35 to 54, further including that the memory and the at least one processor are further configured to: transmit a credential request to the network endpoint after performing the verification of the network endpoint; receive a credential response from the network endpoint; transmit a credential enrollment response to the network endpoint when the device identifier is enrolled with the network manager, and where the network manager receives trusted reference information for the network endpoint from the one or more trusted third parties after enrolling the device identifier of the network endpoint.

Aspect 56 is the apparatus of any of aspects 35 to 55, further including that the memory and the at least one processor are further configured to: use an attestation verifier associated with the network endpoint to retrieve a policy from the one or more trusted third parties for enforcing against the network endpoint.

Aspect 57 is the apparatus of any of aspects 35 to 56, further including that the memory and the at least one processor are further configured to: retrieve, via a policy locator, the policy from the one or more trusted third parties.

Aspect 58 is the apparatus of any of aspects 35 to 57, further including that the memory and the at least one processor are further configured to: query the network endpoint for a device state in accordance with the policy.

Aspect 59 is the apparatus of any of aspects 35 to 58, further including that the memory and the at least one processor are further configured to: determine an occurrence of a trust event based on the device state of the network endpoint; resolve the trust event in accordance with the policy by applying one or more trust event remedies; and verify that the trust event resolved successfully on the network endpoint based on an attestation from the network endpoint.

Aspect 60 is the apparatus of any of aspects 35 to 59, further including that to resolve the trust event, the memory and the at least one processor are configured to, one or more of: disable user access via the network endpoint, force a software update for the network endpoint, cause the network endpoint to reboot, cause a reset of the network endpoint, or disconnect network access for the network endpoint.

Aspect 61 is the apparatus of any of aspects 35 to 60, further including that the memory and the at least one processor are further configured to: provide a trust event report to a network system or an edge component for analysis of the trust event, where the trust event report includes at least one of one or more trust event indications or one or more trust event remedies.

Aspect 62 is the apparatus of any of aspects 35 to 61, further including that to resolve the trust event, the memory and the at least one processor are configured to: provide a trust event report to a third party device manager based on a determination that the network manager is unable to resolve the trust event, where the trust event report includes at least one of one or more trust event indications or one or more trust event remedies.

Aspect 63 is the apparatus of any of aspects 35 to 62, further including that the network endpoint is connected to the network manager.

Aspect 64 is the apparatus of any of aspects 35 to 63, further including that the network manager comprises a router, a network controller, a gateway, a base station, or an edge node.

Aspect 65 is the apparatus of any of aspects 35 to 64, further including that the memory and the at least one processor are further configured to: receive the policies for enforcement to the network endpoint from a network owner.

Aspect 66 is the apparatus of any of aspects 35 to 65, further including that the policies are updateable policies.

Aspect 67 is the apparatus of any of aspects 35 to 66, further including that to communicate with the network endpoint, the memory and the at least one processor are configured to: use a credential to authenticate a message before transmitting the authenticated message to the network endpoint, and use the credential to decrypt a message received from the network endpoint.

Aspect 68 is a method of wireless communication for implementing any of aspects 35 to 67.

Aspect 69 is an apparatus for wireless communication including means for implementing any of aspects 35 to 67.

Aspect 70 is a non-transitory computer-readable storage medium storing computer executable code, where the code, when executed, causes a processor to implement any of aspects 35 to 67.

Aspect 71 is an apparatus for trust management at a network manager including at least one processor coupled to a memory and configured to enroll a network endpoint with a network managed by the network manager; receive trusted reference information for the network endpoint from one or more trusted third parties based on enrollment of the network endpoint with the network; query the network endpoint for device information in accordance with a network manager policy enforced by the network manager; and perform one or more trust event remedies in accordance with the network manager policy when a trust event occurs, the occurrence of the trust event based on a comparison of the device information and the trusted reference information for the network endpoint.

Aspect 72 is a method of wireless communication for implementing aspect 71.

Aspect 73 is an apparatus for wireless communication including means for implementing aspect 71.

Aspect 74 is a non-transitory computer-readable storage medium storing computer executable code, where the code, when executed, causes a processor to implement aspect 71.

Aspect 75 is an apparatus for trust management at a network endpoint including at least one processor coupled to a memory and configured to provide a temporary credential for the network endpoint to a network manager, where the temporary credential is based on a permanent credential for the network endpoint; and receive, from the network manager, access or authorization for services or resources, the access or authorization based on a device verification based on the temporary credential of the network endpoint.

Aspect 76 is the apparatus of aspect 75, further including that the temporary credential is based on at least one of: a public-private key pair, a public key, a hash of the public key, or an identifier associated with the temporary credential.

Aspect 77 is the apparatus of any of aspects 75 and 76, further including that the memory and the at least one processor are further configured to: receive a software update from a trusted third party via the network manager based on the device verification based on the temporary credential of the network endpoint.

Aspect 78 is the apparatus of any of aspects 75 to 77, further including that the memory and the at least one processor are further configured to: provide an attestation to the network manager; and receive, via the network manager, a software activation code from the trusted third party in response to the attestation.

Aspect 79 is the apparatus of any of aspects 75 to 78, further including that the memory and the at least one processor are further configured to: perform user verification of a user of the network endpoint; and provide an attestation to the network manager, the attestation including a result of the user verification.

Aspect 80 is the apparatus of any of aspects 75 to 79, further including that the memory and the at least one processor are configured to perform user verification based on one or more of: a password, a biometric, a trusted location, a multi-factor verification, or a continuous authentication.

Aspect 81 is a method of wireless communication for implementing any of aspects 75 to 80.

Aspect 82 is an apparatus for wireless communication including means for implementing any of aspects 75 to 80.

Aspect 83 is a non-transitory computer-readable storage medium storing computer executable code, where the code, when executed, causes a processor to implement any of aspects 75 to 80.

Aspect 84 is an apparatus for access management at a trust agent including at least one processor coupled to a memory and configured to receive attestation information from a user device requesting access to services or resources provided by a service managing entity; evaluate the attestation information for the user device based on an updateable policy; and enforce the updateable policy to the user device for the services or resources provided by the service managing entity based on the evaluation of the attestation information.

Aspect 85 is the apparatus of aspect 84, further including that the attestation information includes at least one of user attestable information, device attestable information, or network attestable information.

Aspect 86 is the apparatus of any of aspects 84 and 85, further including that the attestation information includes first attestable information that is associated with or managed by a first verification entity and second attestable information that is associated with or managed by a second verification entity.

Aspect 87 is the apparatus of any of aspects 84 to 86, further including that the first verification entity and the second verification entity are a same verification entity.

Aspect 88 is the apparatus of any of aspects 84 to 86, further including that the first verification entity is different than the second verification entity.

Aspect 89 is the apparatus of any of aspects 84 to 88, further including that the first verification entity includes the trust agent.

Aspect 90 is the apparatus of any of aspects 84 to 89, further including that the memory and the at least one processor are configured to: determine a verification result associated with the first attestable information based on reference information.

Aspect 91 is the apparatus of any of aspects 84 to 90, further including that the memory and the at least one processor are configured to: determine a verification result associated with the first attestable information based on a measurement.

Aspect 92 is the apparatus of any of aspects 84 to 91, further including that the first verification entity includes a trusted third party different than the trust agent.

Aspect 93 is the apparatus of any of aspects 84 to 92, further including that the memory and the at least one processor are configured to: receive a verification result associated with the first attestable information from the trusted third party.

Aspect 94 is the apparatus of any of aspects 84 to 93, further including that the memory and the at least one processor are configured to: provide the first attestable information to the trusted third party, and receive a verification result associated with the first attestable information from the trusted third party.

Aspect 95 is the apparatus of any of aspects 84 to 94, further including that the memory and the at least one processor are configured to evaluate the attestation information for the user device based on one or more verification results associated with respective attestable information of the attestation information and the updateable policy.

Aspect 96 is the apparatus of any of aspects 84 to 95, further including that the memory and the at least one processor are configured to evaluate the attestation information for the user device based on one or more verification results associated with a subset of attestable information of the attestation information and the updateable policy.

Aspect 97 is the apparatus of any of aspects 84 to 96, further including that the memory and the at least one processor are configured to evaluate the verification results based on attestable parameters provided by the service managing entity via the updateable policy.

Aspect 98 is the apparatus of any of aspects 84 to 97, further including that the memory and the at least one processor are configured to evaluate the attestation information for the user device periodically.

Aspect 99 is the apparatus of any of aspects 84 to 98, further including that the memory and the at least one processor are configured to evaluate the attestation information for the user device in response to an occurrence of a triggering event.

Aspect 100 is the apparatus of any of aspects 84 to 99, further including that the memory and the at least one processor are configured to: enforce a set of actions to enforce the updateable policy to the user device includes, and where the set of actions comprises one or more actions of the updateable policy selected based on a device trust score and a trust score threshold.

Aspect 101 is the apparatus of any of aspects 84 to 100, further including that the memory and the at least one processor are further configured to: receive the trust score threshold from the service managing entity via the updateable policy.

Aspect 102 is the apparatus of any of aspects 84 to 101, further including that the device trust score is based on an evaluation of verification results associated with the attestation information.

Aspect 103 is the apparatus of any of aspects 84 to 102, further including that the device trust score is based on an evaluation of the updateable policy to the verification results.

Aspect 104 is the apparatus of any of aspects 84 to 103, further including that the memory and the at least one processor are further configured to: enforce the set of actions to the user device or the trust agent via causing the user device to enforce the set of actions to the user device.

Aspect 105 is the apparatus of any of aspects 84 to 104, further including that the memory and the at least one processor are further configured to: enforce a first subset of actions of the set of actions to the user device, and cause the user device to enforce a second subset of actions of the set of actions to the user device.

Aspect 106 is the apparatus of any of aspects 84 to 105, further including that the memory and the at least one processor are further configured to: cause one or more trusted third parties to enforce at least one action of the set of actions to the user device.

Aspect 107 is a method of wireless communication for implementing any of aspects 84 to 8406.

Aspect 108 is an apparatus for wireless communication including means for implementing any of aspects 84 to 106.

Aspect 109 is a non-transitory computer-readable storage medium storing computer executable code, where the code, when executed, causes a processor to implement any of aspects 84 to 106.

Aspect 110 is an apparatus for access management at a user device including at least one processor coupled to a memory and configured to provide attestation information associated with the user device to a trust agent when requesting access to services or resources provided by a service managing entity; and receive access to the services or resources provided by the service managing entity from the trust agent based on an evaluation of the attestation information to an updateable policy.

Aspect 111 is the apparatus of aspect 110, further including that the attestation information includes at least one of user attestable information, device attestable information, or network attestable information.

Aspect 112 is the apparatus of any of aspects 110 and 111, further including that the attestation information includes first attestable information that is associated with or managed by a first verification entity and second attestable information that is associated with or managed by a second verification entity.

Aspect 113 is the apparatus of any of aspects 110 to 112, further including that the memory and the at least one processor are configured to: receive a request for attestation information from the trust agent periodically.

Aspect 114 is the apparatus of any of aspects 110 to 113, further including that the memory and the at least one processor are configured to: receive a request for attestation information from the trust agent in response to an occurrence of a triggering event.

Aspect 115 is the apparatus of any of aspects 110 to 114, further including that the memory and the at least one processor are configured to: enforce a set of actions to the user device, the set of actions based on the evaluation of the attestation information to the updateable policy.

Aspect 116 is a method of wireless communication for implementing any of aspects 110 to 115.

Aspect 117 is an apparatus for wireless communication including means for implementing any of aspects 110 to 115.

Aspect 118 is a non-transitory computer-readable storage medium storing computer executable code, where the code, when executed, causes a processor to implement any of aspects 110 to 115.

What is claimed is:

1. An apparatus for trust management at a network manager, comprising:
   a memory; and
   at least one processor coupled to the memory, the at least one processor configured to:
   enroll a network endpoint with a network managed by the network manager;
   receive trusted reference information for the network endpoint based on enrolling the network endpoint;
   perform verification of the network endpoint based on at least one of the trusted reference information, or an attestation received from the network endpoint;
   enforce policies to the network endpoint based on a result of the verification;
   perform user verification of a user of the network endpoint, wherein, to perform the user verification, the at least one processor is configured to receive device attestation including a user verification result from the network endpoint; and
   control user access to a service or resource based on the user verification.

2. The apparatus of claim 1, wherein to perform the verification of the network endpoint, the at least one processor is configured to:
   receive the attestation for the network endpoint; and
   determine a verification result based on the attestation and the trusted reference information,
   wherein the apparatus further includes a transceiver coupled to the at least one processor.

3. The apparatus of claim 1, wherein the at least one processor is configured to receive the trusted reference information per network endpoint in communication with the network manager.

4. The apparatus of claim 1, wherein the at least one processor is configured to receive the trusted reference information for a set of network endpoints in communication with the network manager.

5. The apparatus of claim 1, wherein the at least one processor is configured to perform the verification of the network endpoint periodically, on-demand, or in response to an occurrence of a triggering event.

6. The apparatus of claim 1, wherein the at least one processor is further configured to:
   report a verification result to at least one trusted third party.

7. The apparatus of claim 1, wherein to enforce the policies to the network endpoint, the at least one processor is configured to:
   monitor connection health for the network endpoint; and
   monitor device health of the network endpoint.

8. The apparatus of claim 1, wherein the policies include trust event remedies, and to enforce the trust event remedies, the at least one processor is configured to:
   modify network access controls of the network endpoint,
   limit functional capabilities of the network endpoint,
   adjust Quality of Service (QOS) levels of the network endpoint, or
   force a software update of the network endpoint.

9. The apparatus of claim 1, wherein the at least one processor is further configured to:
   receive a software update from a trusted third party for the network endpoint;
   provide the software update to the network endpoint based on the verification for the network endpoint; and
   verify that the software update completed successfully on the network endpoint based on a second attestation from the network endpoint.

10. The apparatus of claim 1, wherein the at least one processor is further configured to:
    transmit a credential request to the network endpoint after performing the verification of the network endpoint;
    receive a credential response from the network endpoint; and transmit a credential enrollment response to the network endpoint.

11. The apparatus of claim 1, wherein the at least one processor is further configured to:
retrieve a policy from one or more trusted third parties for managing the network endpoint using an attestation verifier associated with the network endpoint, wherein managing the network endpoint is based in part on the policy, a trust level associated with the network endpoint, and an operational purpose associated with the network endpoint.

12. The apparatus of claim 1, wherein the at least one processor is further configured to:
provide a trust event report to a network system or an edge component for analysis of a trust event, wherein the trust event report includes at least one of one or more trust event indications or one or more trust event remedies.

13. The apparatus of claim 1, wherein the at least one processor is further configured to:
provide a trust event report to a third party device manager based on a determination that the network manager is unable to resolve a trust event, wherein the trust event report includes at least one of one or more trust event indications or one or more trust event remedies.

14. A method of trust management at a network manager, comprising:
enrolling a network endpoint with a network managed by the network manager;
receiving trusted reference information for the network endpoint based on enrolling the network endpoint;
performing verification of the network endpoint based on at least one of the trusted reference information, or an attestation received from the network endpoint;
enforcing policies to the network endpoint based on a result of the verification;
performing user verification of a user of the network endpoint, wherein performing the user verification comprises receiving device attestation including a user verification result from the network endpoint; and
controlling user access to a service or resource based on the user verification.

15. The method of claim 14, wherein performing the verification of the network endpoint, comprises:
receiving the attestation for the network endpoint; and
determining a verification result based on the attestation and the trusted reference information.

16. The method of claim 14, further comprising receiving the trusted reference information per network endpoint in communication with the network manager.

17. The method of claim 14, further comprising receiving the trusted reference information for a set of network endpoints in communication with the network manager.

18. The method of claim 14, further comprising performing the verification of the network endpoint periodically, on-demand, or in response to an occurrence of a triggering event.

19. The method of claim 14, further comprising reporting a verification result to at least one trusted third party.

20. The method of claim 14, wherein enforcing the policies to the network endpoint comprises:
monitoring connection health for the network endpoint; and
monitoring device health of the network endpoint.

21. The method of claim 14, wherein the policies include trust event remedies, and enforcing the trust event remedies, comprises:
modifying network access controls of the network endpoint,
limiting functional capabilities of the network endpoint,
adjusting Quality of Service (QOS) levels of the network endpoint, or
forcing a software update of the network endpoint.

22. The method of claim 14, further comprising:
receiving a software update from a trusted third party for the network endpoint;
providing the software update to the network endpoint based on the verification for the network endpoint; and
verifying that the software update completed successfully on the network endpoint based on a second attestation from the network endpoint.

23. The method of claim 14, further comprising:
transmitting a credential request to the network endpoint after performing the verification of the network endpoint;
receiving a credential response from the network endpoint; and
transmitting a credential enrollment response to the network endpoint.

24. The method of claim 14, further comprising retrieving a policy from one or more trusted third parties for managing the network endpoint using an attestation verifier associated with the network endpoint, wherein managing the network endpoint is based in part on the policy, a trust level associated with the network endpoint, and an operational purpose associated with the network endpoint.

25. The method of claim 14, further comprising providing a trust event report to a network system or an edge component for analysis of a trust event, wherein the trust event report includes at least one of one or more trust event indications or one or more trust event remedies.

26. The method of claim 14, further comprising providing a trust event report to a third party device manager based on a determination that the network manager is unable to resolve a trust event, wherein the trust event report includes at least one of one or more trust event indications or one or more trust event remedies.

* * * * *